United States Patent [19]
Tatsuya

[11] Patent Number: 5,532,692
[45] Date of Patent: Jul. 2, 1996

[54] COMMUNICATION SYSTEM

[75] Inventor: Hirata Tatsuya, Ichinomiya, Japan

[73] Assignee: Nippondenso Co., Ltd., Japan

[21] Appl. No.: 116,991

[22] Filed: Sep. 7, 1993

[30] Foreign Application Priority Data

| Sep. 7, 1992 | [JP] | Japan | 4-238517 |
| Sep. 28, 1992 | [JP] | Japan | 4-258624 |
| Sep. 30, 1992 | [JP] | Japan | 4-261398 |
| Oct. 5, 1992 | [JP] | Japan | 4-266124 |
| Oct. 27, 1992 | [JP] | Japan | 4-288764 |
| Nov. 6, 1992 | [JP] | Japan | 4-297291 |
| Nov. 25, 1992 | [JP] | Japan | 4-315064 |
| Jul. 30, 1993 | [JP] | Japan | 5-189628 |

[51] Int. Cl.$^6$ ............................................. H04Q 9/00
[52] U.S. Cl. .................... 340/825.540; 340/825.200; 375/359
[58] Field of Search ............... 340/825.54, 825.20, 340/825.14; 371/42.1, 61; 375/105, 110

[56] References Cited

U.S. PATENT DOCUMENTS

| 4,327,441 | 4/1982 | Bradshaw . |
| 4,337,463 | 6/1982 | Vangen ............................. 340/825.54 |
| 4,353,064 | 10/1992 | Stamm . |
| 5,021,777 | 6/1991 | Gross et al. ...................... 340/825.54 |

FOREIGN PATENT DOCUMENTS

| 0068977 | 1/1983 | European Pat. Off. |
| 0350235 | 1/1990 | European Pat. Off. |
| 0438250 | 7/1991 | European Pat. Off. |
| 0462013 | 12/1991 | European Pat. Off. |
| 61-203021 | 9/1986 | Japan . |
| 293882 | 4/1990 | Japan . |
| 2257648 | 10/1990 | Japan . |
| 2231983 | 11/1990 | United Kingdom . |
| 9113499 | 9/1991 | WIPO . |

*Primary Examiner*—Michael Horabik
*Attorney, Agent, or Firm*—Cushman Darby & Cushman

[57] ABSTRACT

A communication system includes an interrogator for transmitting an interrogation signal generated on the basis of a communication reference time length. A responder is operative for decoding the interrogation signal from the interrogator at a given reception timing. The interrogator transmits a communication reference signal before a transmission of a communication signal. The communication reference signal represents the communication reference time length. The responder measures the communication reference time length represented by the communication reference signal transmitted from the interrogator. The responder sets the reception timing in accordance with the measured communication reference time length.

7 Claims, 51 Drawing Sheets

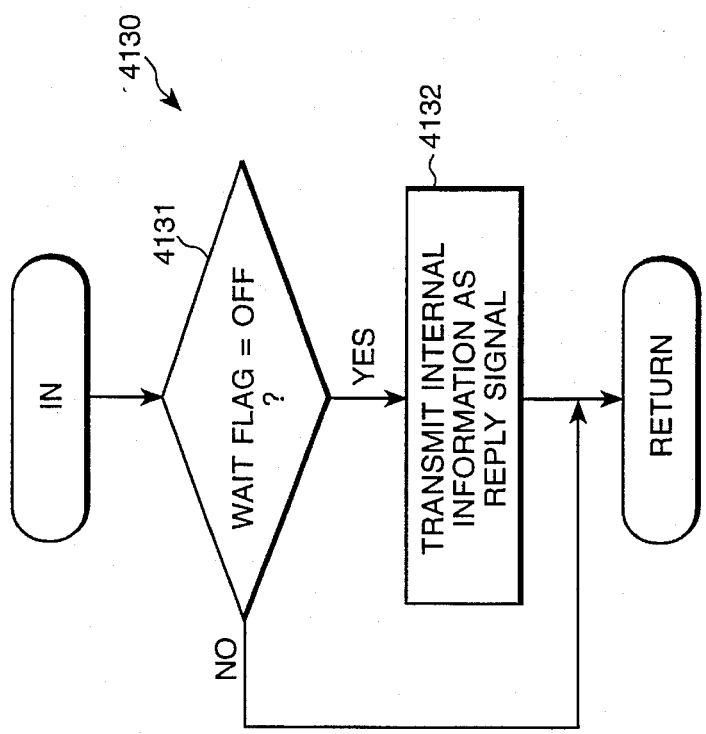
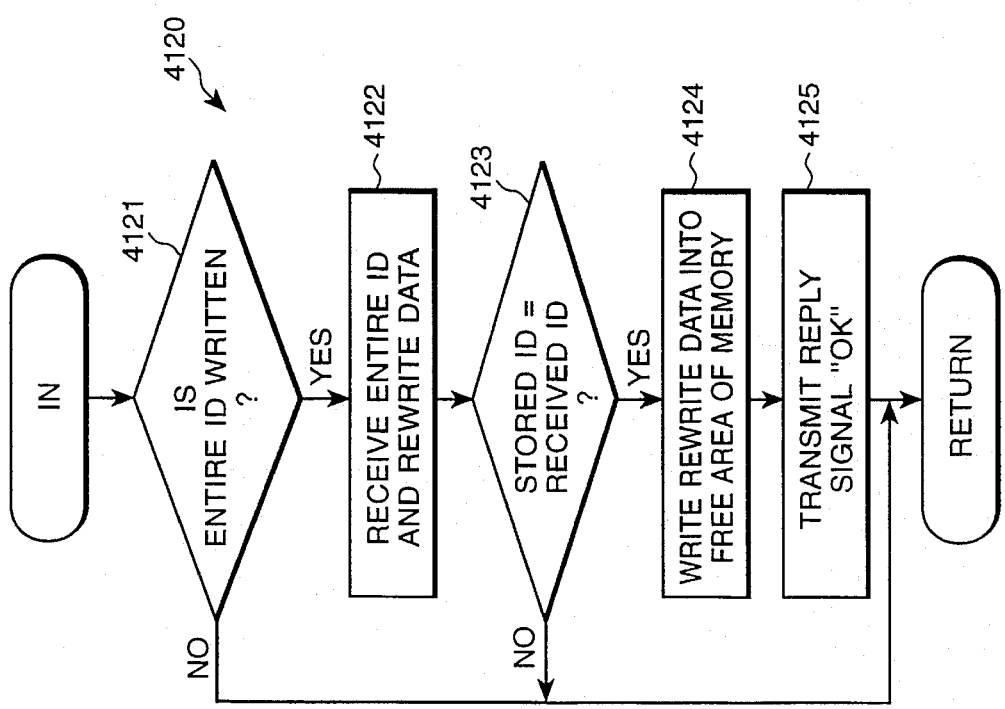

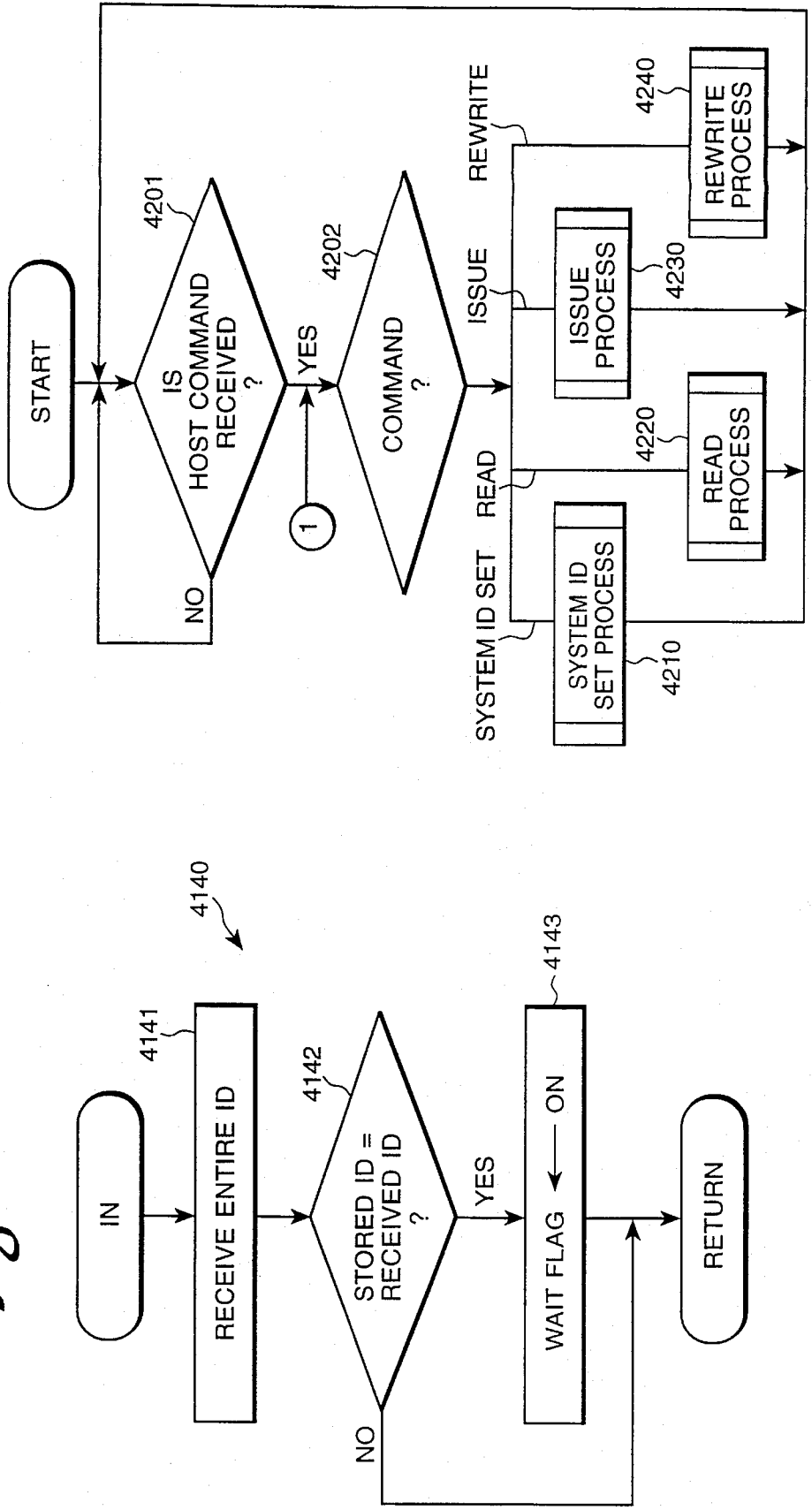

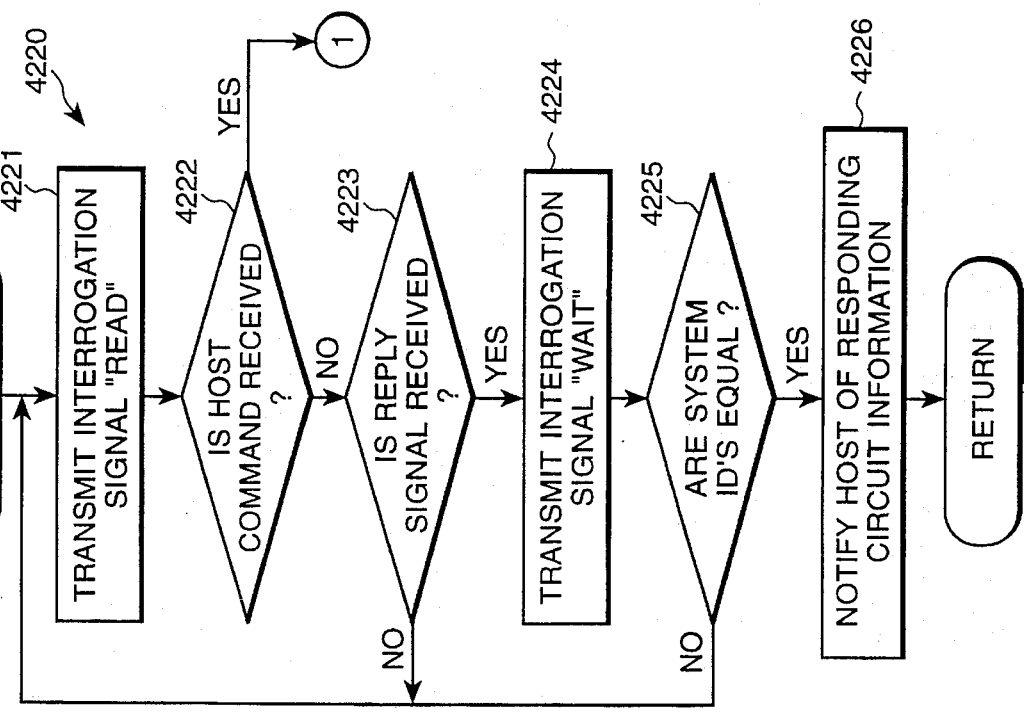
Fig. 56
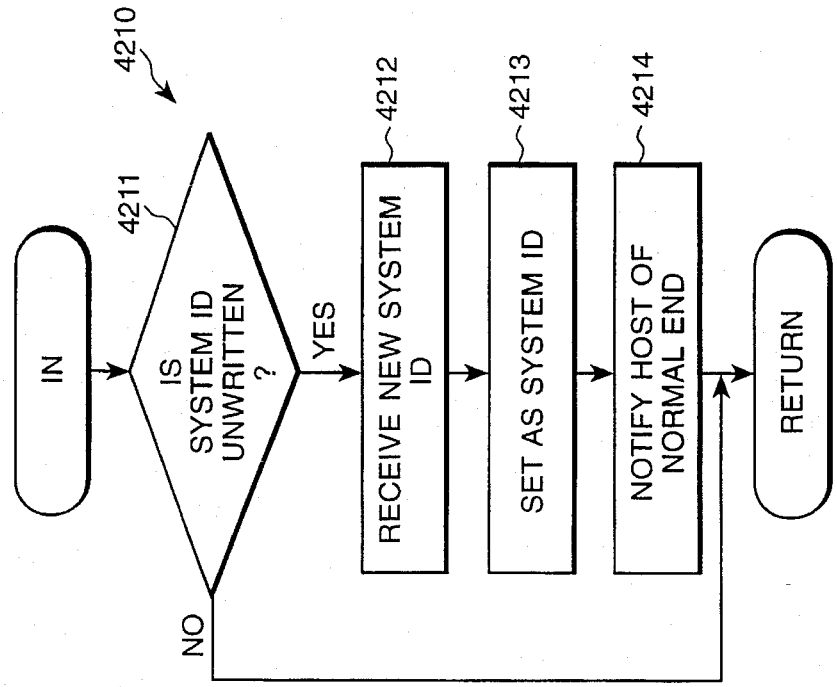
Fig. 55

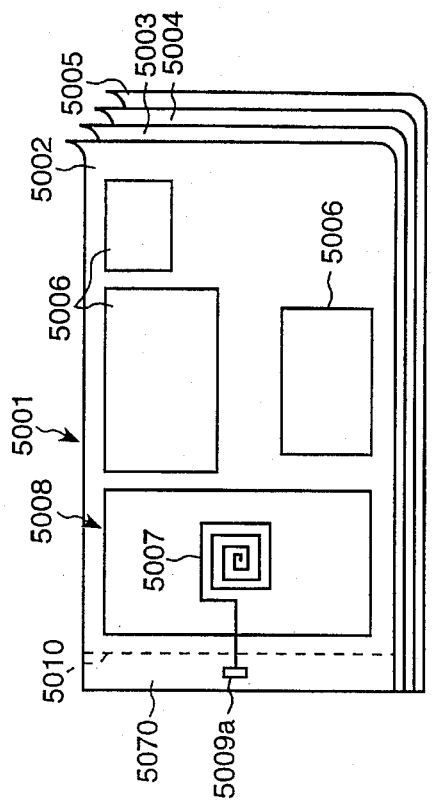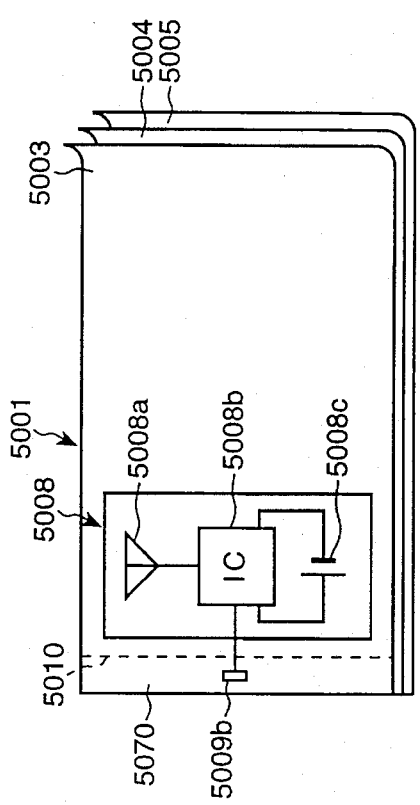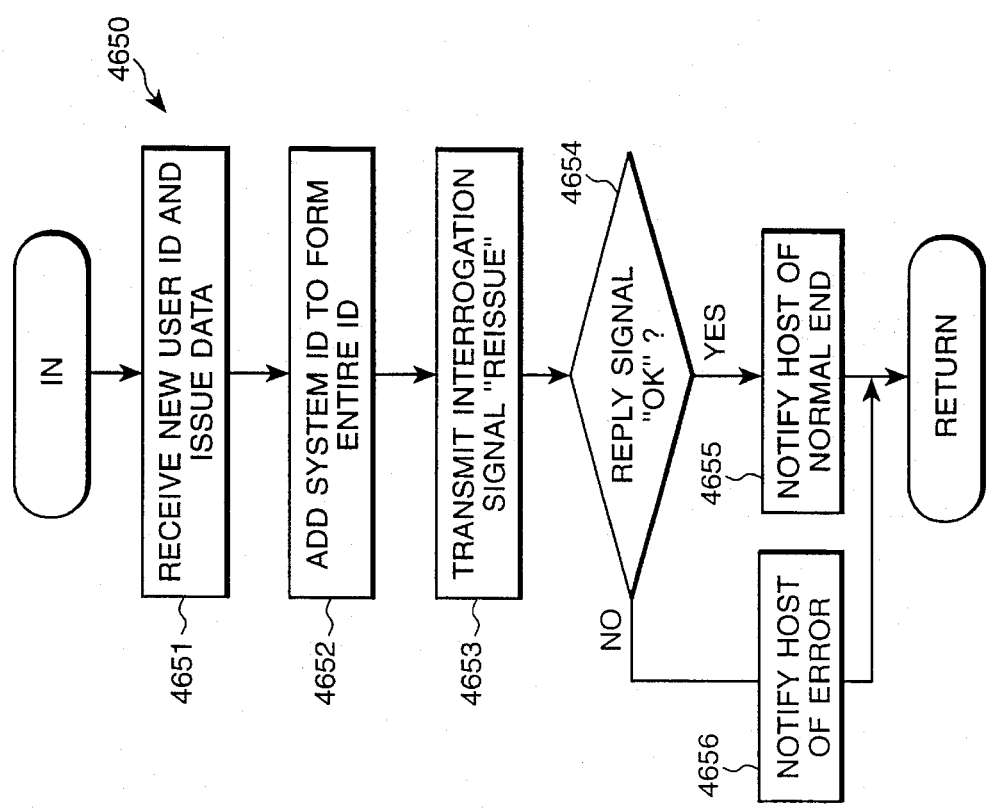

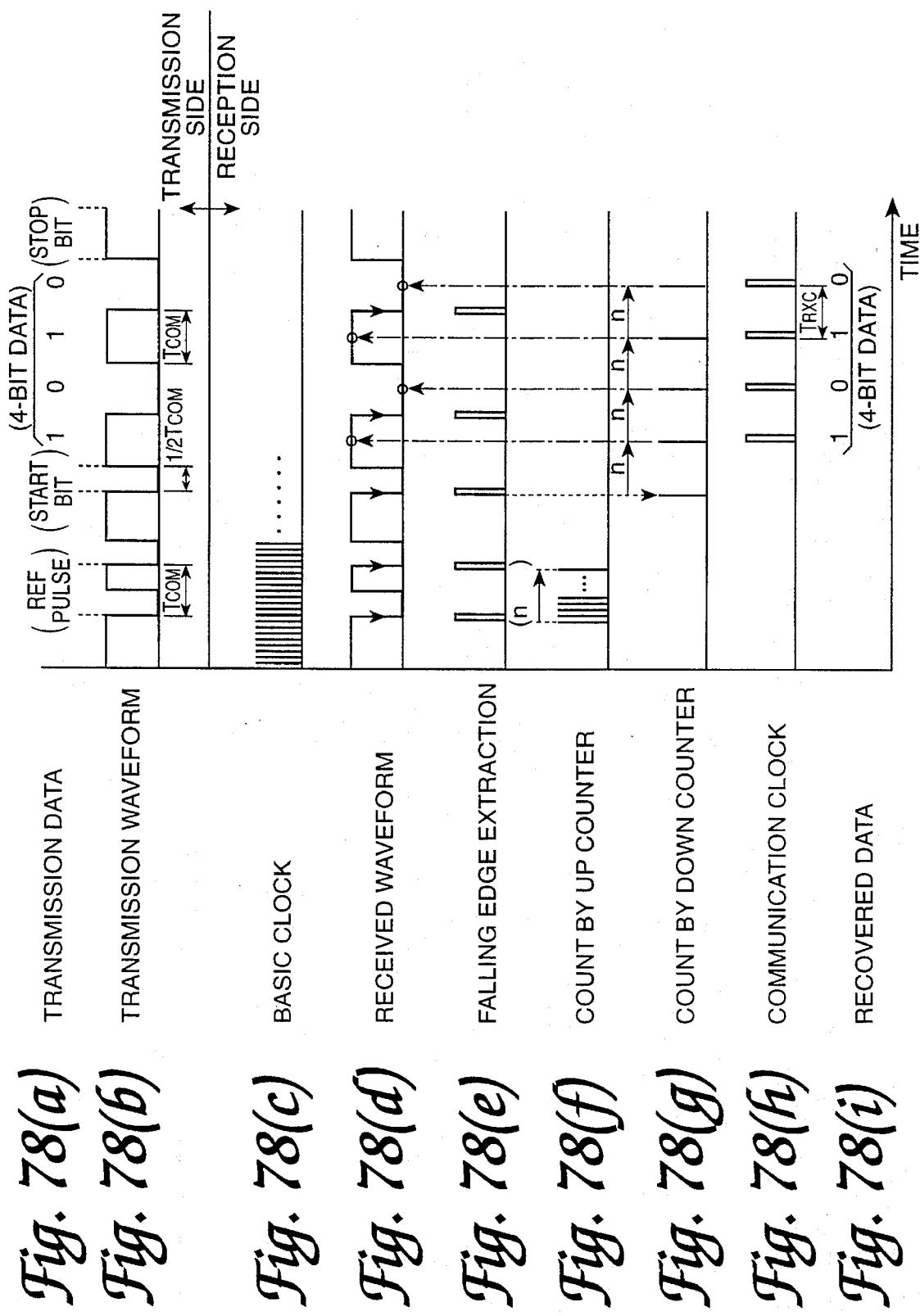

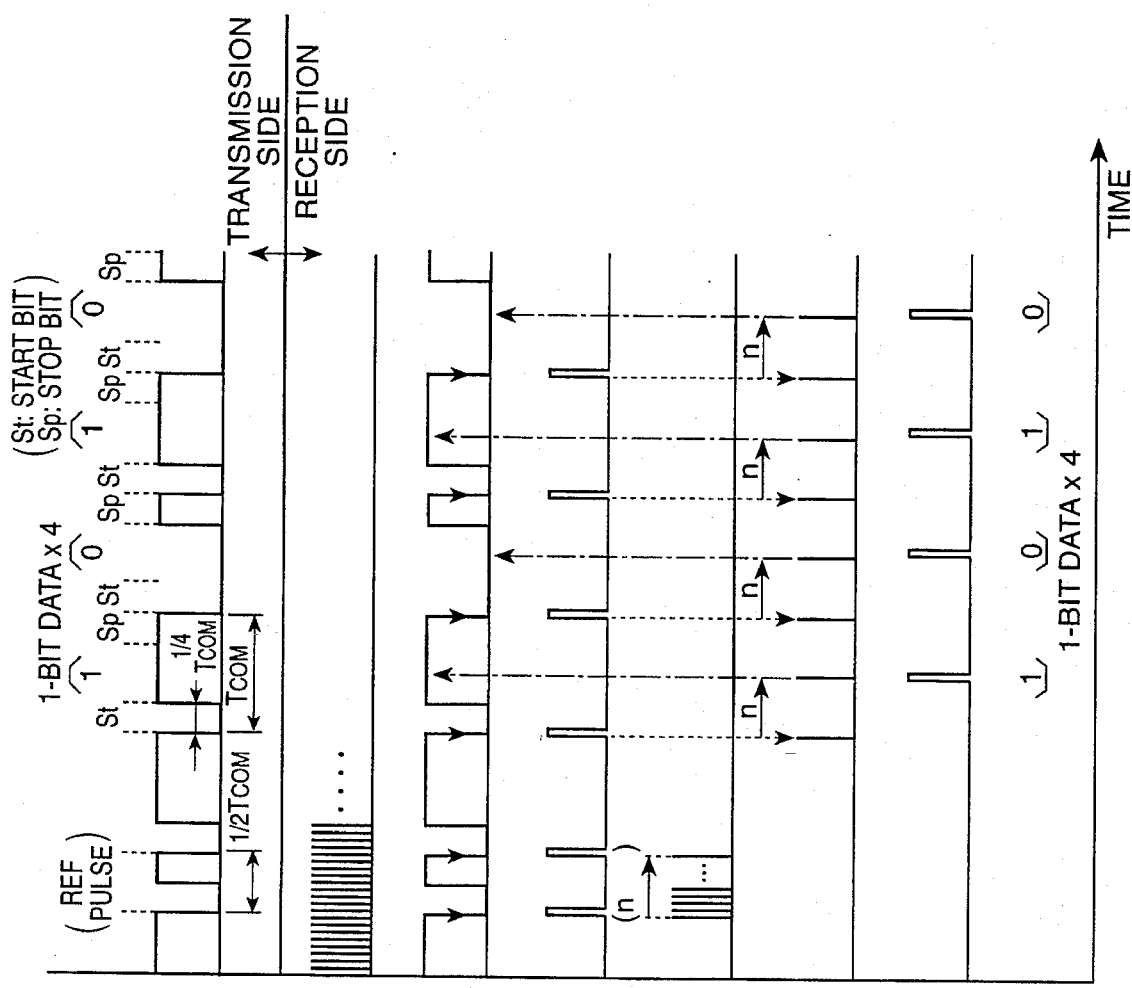

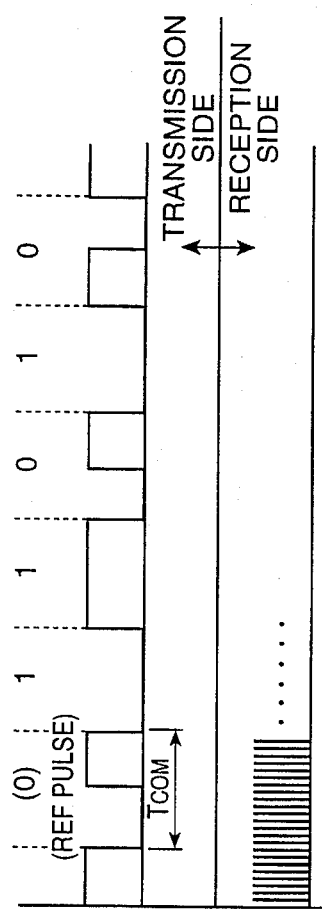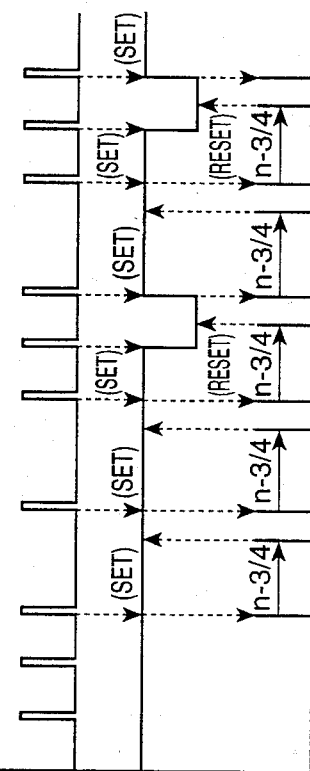
Fig. 80(a) TRANSMISSION DATA
Fig. 80(b) TRANSMISSION WAVEFORM
Fig. 80(c) BASIC CLOCK
Fig. 80(d) RECEIVED WAVEFORM
Fig. 80(e) FALLING EDGE EXTRACTION
Fig. 80(f) COUNT BY UP COUNTER
Fig. 80(g) EDGE EXTRACTION
Fig. 80(h) EDGE HOLD
Fig. 80(i) COUNT BY DOWN COUNTER
Fig. 80(j) COMMUNICATION CLOCK

COMMUNICATION SYSTEM

BACKGROUND OF THE INVENTION

1. Field of the Invention

This invention relates to a communication system including an interrogator and a responder (a transponder).

2. Description of the Prior Art

There are movable-object identification systems in which a responder (a transponder) mounted on a movable object can communicate with a fixed interrogator by radio. When the responder receives an interrogation signal (a challenge signal) from the interrogator, the responder automatically transmits a reply signal including identification information related to the movable object. The movable-object identification systems can be used as noncontact card systems in which a reader communicates with an information card by radio to read out information therefrom.

Responders in the movable-object identification systems are of two types having and lacking a data writing function respectively. The responder lacking the data writing function merely transmits internal data in response to an interrogation signal from an interrogator. The responder having the data writing function includes a device for decoding data transmitted from an interrogator, and a device for storing the decoded data.

Typical data transmission between an interrogator and a responder is of a serial communication format. According to such serial communication, data is modulated with a transmission clock signal before being transmitted from the interrogator. In the responder, the data transmitted from the interrogator is recovered by a demodulating process responsive to a reception clock signal. For accurate and reliable data transmission, it is necessary to equalize the periods of the transmission clock signal and the reception clock signal. When the period of the reception clock signal differs from the period of the transmission clock signal, the timing of the demodulating process goes out of order and the recovery of the data is unstabilized so that errors tend to occur in the communication.

A general way of generating the reception clock signal is as follows. The transmission speed in serial communication is preset. A reception clock signal is generated on the basis of the frequency of oscillation of an oscillator provided in the responder, and the period of the reception clock signal is accorded with the period of the transmission clock signal.

When the frequency of oscillation of the oscillator in the responder has an error, the period of the reception clock signal goes out of order so that a reception error tends to occur. Accordingly, the oscillator in the responder is required to be highly accurate in oscillation frequency.

It is known to use a crystal or ceramic oscillator as an oscillator in a responder. In this case, the oscillator tends to be expensive and large in size. Another type of the oscillator in the responder includes a CR (capacitor-resistor) oscillator and a circuit for stabilizing the frequency of oscillation of the CR oscillator. This type of the oscillator tends to be sensitive to a temperature variation. In addition, stabilizing the frequency of oscillation of the CR oscillator tends to be troublesome.

SUMMARY OF THE INVENTION

It is an object of this invention to provide an improved communication system.

A first aspect of this invention provides a communication system comprising an interrogator for transmitting an interrogation signal generated on the basis of a communication reference time length; and a responder for decoding the interrogation signal from the interrogator at a given reception timing; wherein the interrogator transmits a communication reference signal before a transmission of a communication signal, and the communication reference signal represents the communication reference time length; and wherein the responder measures the communication reference time length represented by the communication reference signal transmitted from the interrogator, and the responder sets the reception timing in accordance with the measured communication reference time length.

A second aspect of this invention provides a communication system comprising an interrogator for transmitting an interrogation signal representative of a reference time length and communication serial data having a period corresponding to the reference time length; and a responder including receiving means for receiving the interrogation signal from the interrogator, first detecting means for detecting the reference time length represented by the received interrogation signal, timing generating means for generating a timing signal in response to the reference time length detected by the first detecting means, and second detecting means for detecting the communication serial data represented by the received interrogation signal in response to the timing signal generated by the timing signal generator.

BRIEF DESCRIPTION OF THE DRAWINGS

FIGS. 50–53 are flowcharts of details of blocks in FIG. 49.

FIG. 54 is a flowchart of a program for controlling a CPU in the interrogator in the thirteenth embodiment.

FIGS. 55–58 are flowcharts of details of blocks in FIG. 54.

FIGS. 66 and 67 are flowcharts of details of blocks in FIG. 65.

FIGS. 68 and 69 are diagrams of a home-delivery slip in a fifteenth embodiment of this invention.

FIG. 78 is a time-domain diagram of the states of various signals in the seventeenth embodiment.

FIG. 79 is a time-domain diagram of the states of various signals in a modification of the seventeenth embodiment.

FIG. 80 is a time-domain diagram of the states of various signals in an eighteenth embodiment of this invention.

DESCRIPTION OF THE FIRST PREFERRED EMBODIMENT

Figure 1:
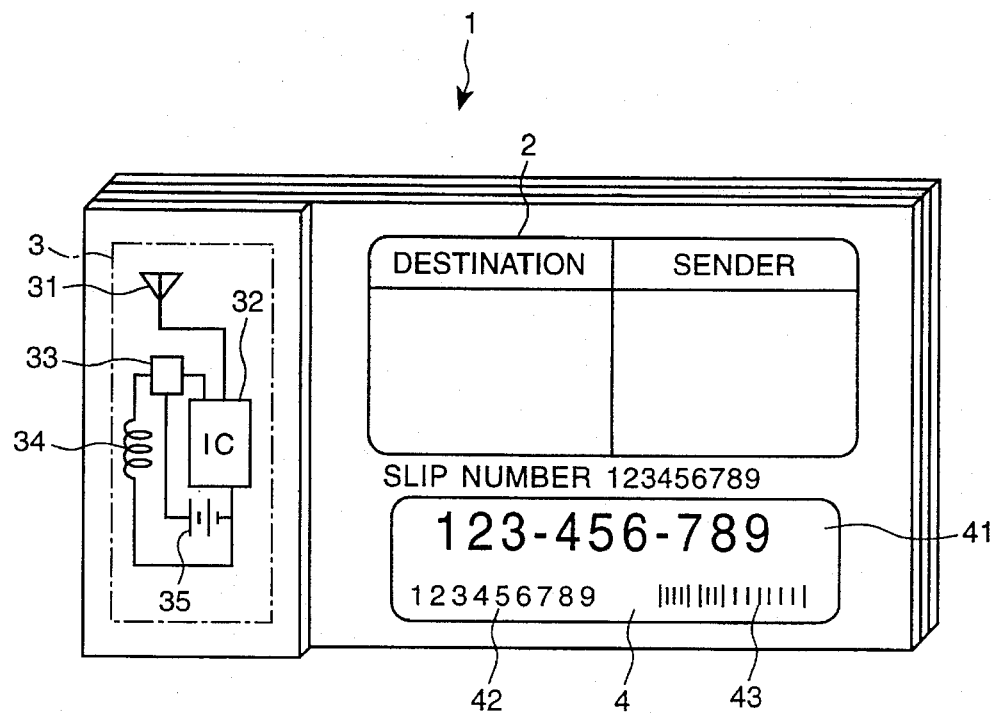
FIG. 1 is a diagram of a home-delivery slip in a first embodiment of this invention.

With reference to FIG. 1, a composite home-delivery slip 1 being an information storage medium (an electronic tag) includes a plurality of slip pieces of various types. The home-delivery slip 1 has both a delivery slip function and an electronic tag function. The home-delivery slip 1 is mainly divided into an entry blank 2, a responding circuit 3, and a code display 4.

Information is to be hand-written into the entry blank 2. Specifically, delivery information such as the names and addresses of a destination and a sender (the person requesting parcel delivery) is to be hand-written into the entry blank 2 by the sender. Also, information of a freight or fee and information of an assortment code (a sorting code) for identifying a destination region are to be hand-written into the entry blank 2 by the parcel handling agent.

The code display 4 indicates information of a slip number which can be optically or magnetically read out. Specifically, OCR characters 41, MICR characters 42, and a bar code 43 representative of the slip number are written into the code display 4 during the fabrication of the home-delivery slip 1.

Figure 2:
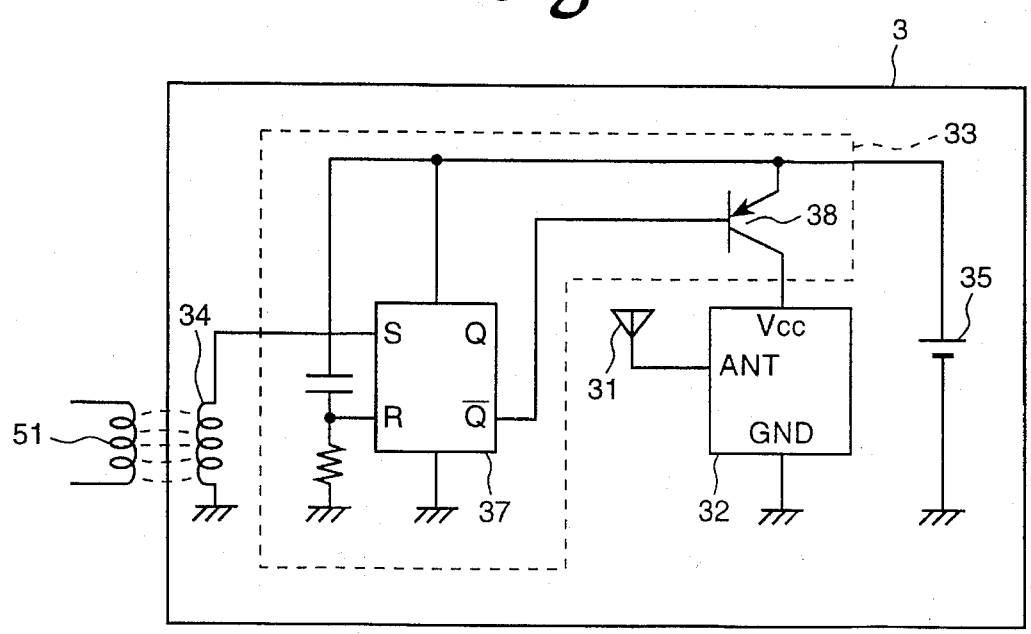
FIG. 2 is a diagram of a responding circuit in the first embodiment.

As shown in FIGS. 1 and 2, the responding circuit 3 includes an antenna 31, an integrated circuit (IC) 32, and a battery (power supply) 35. The antenna 31 is used in radiating and catching radio waves carrying data. The IC 32 serves to control various circuits and store parcel information (parcel delivery information). The battery 35 supplies electric power to the IC 32. The responding circuit 3 also includes a winding (coil) 34 and a switching element 33. The winding 34 can be electromagnetically coupled with a starting winding (coil) 51 of a slip issuing device. Electric power can be induced in the winding 34 through the coupling with the starting winding 51 of the slip issuing device. The switching element 33 is made into an ON state by the electric power induced in the winding 34. The switching element 33 remains in the ON state thereafter. The switching element 33 includes a flip-flop 37 and a transistor 38.

When the responding circuit 3 is significantly separate from the starting winding 51 of the slip issuing device, electric power is not induced in the winding 34 so that an S terminal of the flip-flop 37 remains subjected to a low level potential. Since an R terminal of the flip-flop 37 is grounded via a resistor (no reference number), the R terminal of the flip-flop 37 remains subjected to a low level potential. Thus, in this case, an inverted output terminal $\overline{Q}$ of the flip-flop 37 outputs a high-level signal. The high-level signal is fed from the flip-flop 37 to the base of the transistor 38 so that the emitter-collector path of the transistor 38 is nonconductive. As a result, the feed of electric power from the battery 35 to the IC 32 is interrupted by the transistor 38.

When the responding circuit 3 is used, the winding 34 is made close to the starting winding 51 of the slip issuing device so that effective electric power is induced in the winding 34 through the electromagnetic coupling with the winding 51. The induced electric power causes a high-level potential applied to the S terminal of the flip-flop 37. Since the R terminal of the flip-flop 37 remains subjected to the low level potential, the inverted output terminal $\overline{Q}$ of the flip-flop 37 outputs a low-level signal in response to the high-level potential at the S terminal thereof. The low-level signal is fed from the flip-flop 37 to the base of the transistor 38 so that the emitter-collector path of the transistor 38 is made conductive. As a result, the feed of electric power from the battery 35 to the IC 32 is enabled by the transistor 38. The IC 32 continues to be fed with electric power from the battery 35 even when and after the winding 34 is again separated from the starting winding 51 of the slip issuing device.

Figure 3:
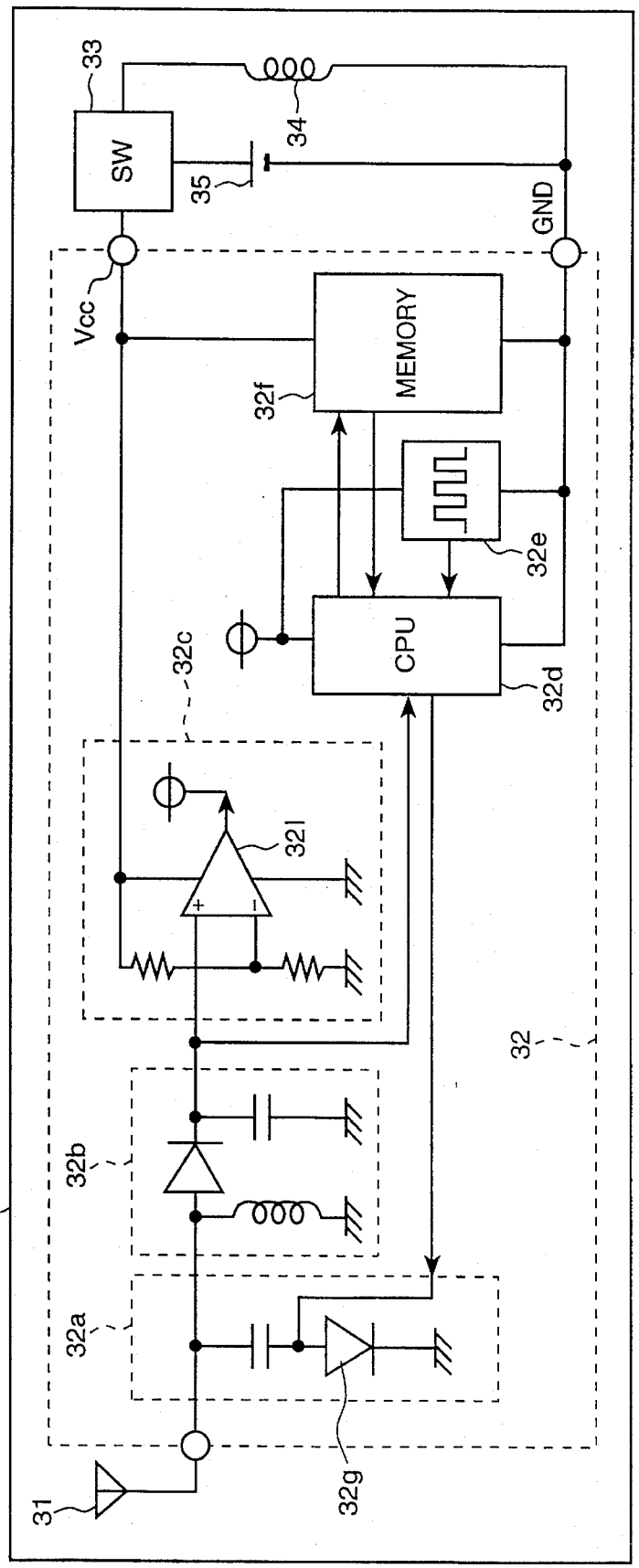
FIG. 3 is a diagram of the responding circuit in the first embodiment.

As shown in FIG. 3, the IC 32 includes a modulator 32a, a detector 32b, a level comparator 32c, a CPU 32d, a clock signal generator 32e, and a memory 32f. When the switching element 33 is made conductive, electric power is supplied from the battery 35 to the level comparator 32c and the memory 32f via the switching element 33. In the case where the IC 32 is fed with electric power from the battery 35 via the switching element 33, an operational amplifier 321 within the level comparator 32c is activated to compare the voltage of the output signal of the detector 32b with a reference voltage determined by a series combination of voltage dividing resistors (no reference numerals). When the voltage of the output signal of the detector 32b exceeds the reference voltage, the operational amplifier 321 connects the battery 35 to the CPU 32d and the clock signal generator 32e. Otherwise, the operational amplifier 321 disconnects the battery 35 from the CPU 32d and the clock signal generator 32e. The memory 32f stores a program. The CPU 32d operates in accordance with the program stored in the memory 32f. The memory 32f also serves to store recovered data.

The responding circuit 3 is formed on a substrate (base sheet) made of hard material. The substrate may also be made of flexible material such as polyester, polyimide, or paper. The winding 34 is made of a printed pattern. The winding 34 may also be formed by screen printing.

Figure 4:
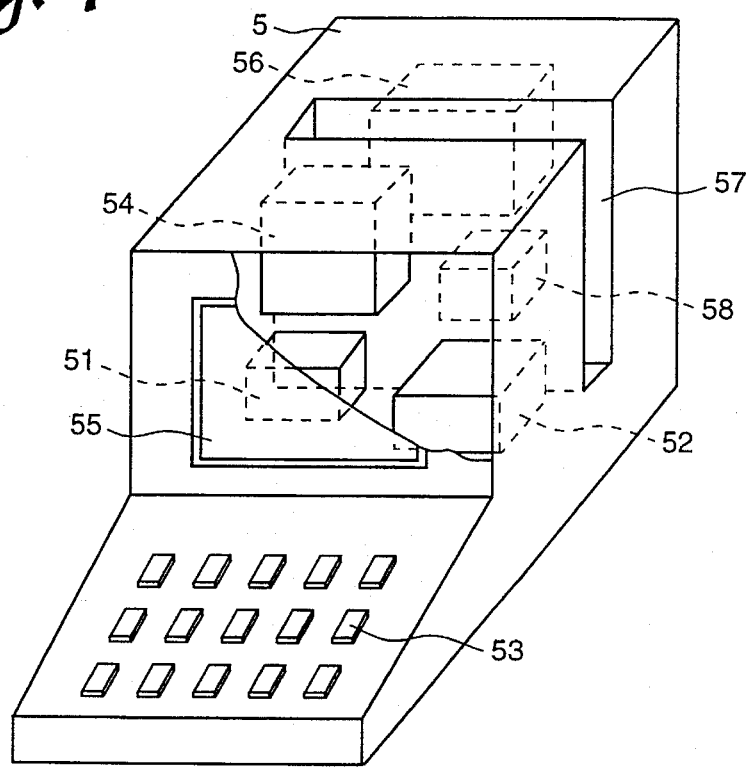
FIG. 4 is a perspective diagram of an issuing device in the first embodiment.

As shown in FIG. 4, the slip issuing device 5 has a body formed with a setting slit 57 for accommodating a home-delivery slip 1. The slip issuing device 5 includes the starting winding 51, a bar code reader 52, a keyboard 53, a writer 54, a display 55, a computer 56, and a printer 58. As previously described, the starting winding 51 can be electromagnetically coupled with the winding 34 of the responding circuit 3 on the home-delivery slip 1 to supply electric power thereto. The bar code reader 52 functions to read a bar code 43 representative of a slip number which is previously provided in the code display 4 on the home-delivery slip 1. The keyboard 53 is used in entering information regarding a parcel. The writer 54 functions to write necessary information into the responding circuit 3. The display 55 serves to indicate written information. The computer 56 is programmed to process information and control various portions of the slip issuing device 5. The printer 58 functions to print necessary information onto predetermined positions on the home-delivery slip 1.

Figure 5:
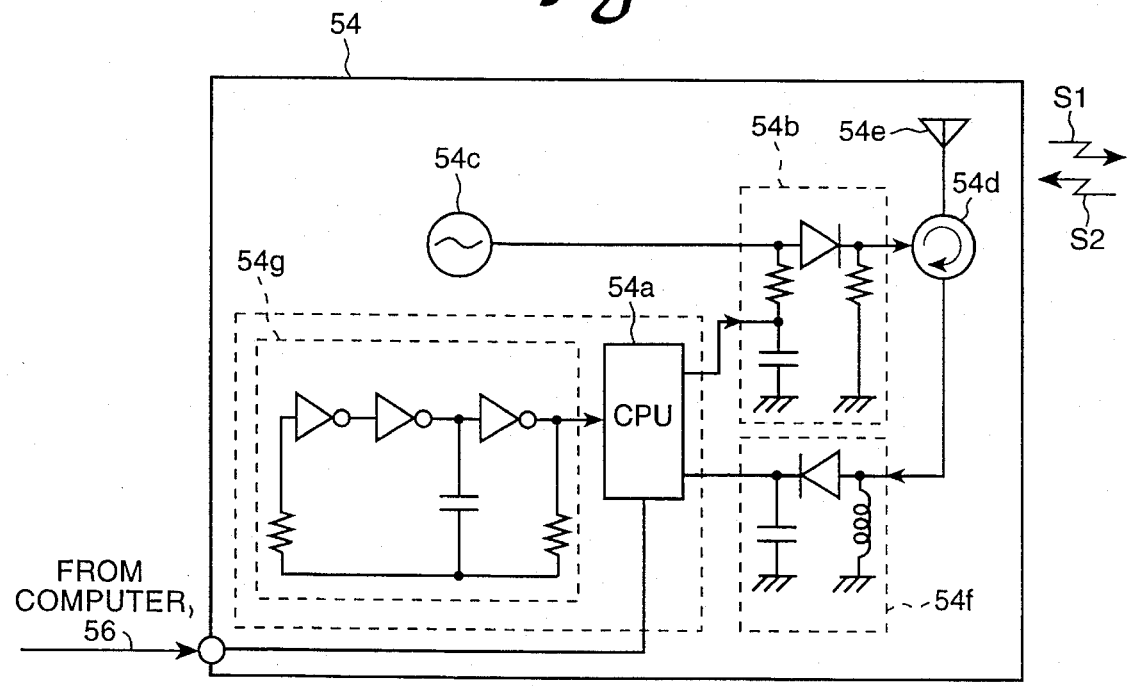
FIG. 5 is a diagram of a writer in the issuing device in the first embodiment.

As shown in FIG. 5, the writer 54 includes a CPU 54a, a clock oscillator 54g, a carrier oscillator 54c, a modulator 54b, an antenna 54e, a circulator 54d, and a demodulator 54f. The CPU 54a is programmed to control various portions of the writer 54. The clock oscillator 54g generates a clock signal for driving the CPU 54a. The carrier oscillator 54c generates a carrier. The modulator 54b functions to modulate the carrier generated by the carrier oscillator 54c. The antenna 54e radiates interrogation radio wave S1, and catches reply radio wave S2. The circulator 54d separates the interrogation radio wave S1 and the reply radio wave S2. The demodulator 54f recovers data from the reply radio wave S2.

In the case where a sender (requester) visits a private parcel receiving center to send a parcel, the requester fills the hand-written entry blank 2 of a home-delivery slip 1 with necessary items such as the address and the telephone number of a recipient. Then, a person in charge of parcel delivery at the private parcel receiving center verifies the hand-written items before entering parcel information (parcel delivery information) such as the phone number of the recipient, a freight, and the classification of the parcel into the slip issuing apparatus 5 via the keyboard 53. As the operation to enter the parcel information has been completed, the person in charge of parcel delivery places the home-delivery slip 1 into the setting slit 57 of the slip issuing device 5 in a manner such that its front side (the side on which the hand-written entry blank 2 is located) faces the user. Subsequently, the slip issuing device 5 operates on the home-delivery slip 1 as will be described later. When the operation on the home-delivery slip 1 has been completed, the home-delivery slip 1 is removed from the slip issuing device 5 and is affixed to the parcel given by the requester. A copy of the home-delivery slip 1 is handed to the requester, and remaining copies thereof are kept at the private parcel receiving center as archival copies. As an alternative, delivery data (delivery information) may be stored into a memory either internal or external to the slip issuing device 5 instead of keeping the slip copies as archival copies. In the case where the slip issuing device 5 is online-connected to a computer of a delivery center, the input data can be immediately transmitted to the delivery center so that centralized management of home-delivery information can be realized.

Figure 6:
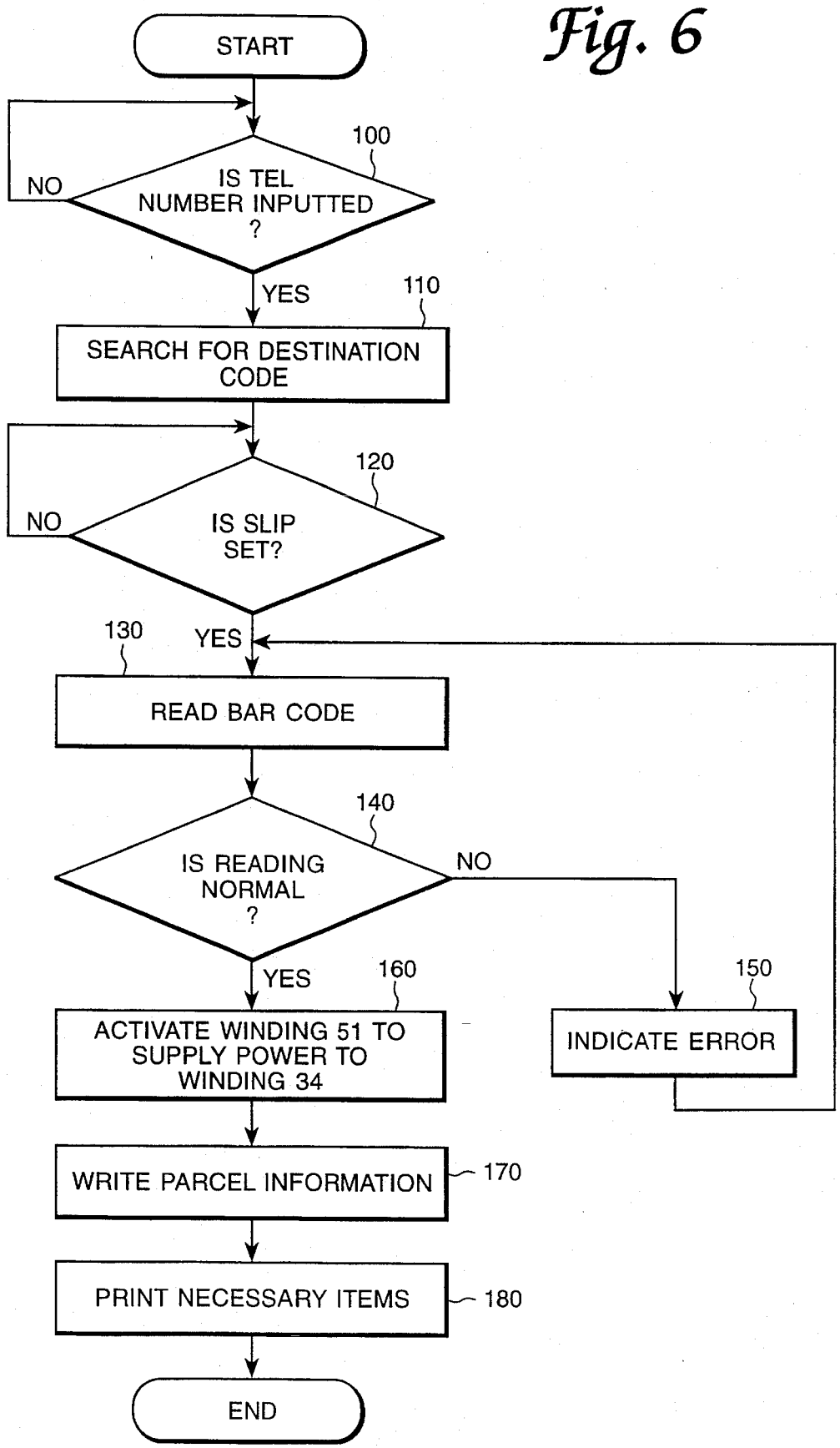
FIG. 6 is a flowchart of a program for controlling a computer in the issuing device in the first embodiment.

The computer 56 operates in accordance with a program stored in an internal ROM. FIG. 6 is a flowchart of this program. As shown in FIG. 6, a first step 100 of the program determines whether or not a telephone number is inputted. When a telephone number is inputted, the program advances from the step 100 to a step 110. Otherwise, the step 100 is repeated. The step 110 searches a memory within the computer 56 for an assortment code in accordance with the input telephone number. After the step 110, the program advances to a step 120.

The step 120 determines whether or not a home-delivery slip 1 is placed in the setting slit 57. When a home-delivery slip 1 is placed in the setting slit 57, the program advances from the step 120 to a step 130. Otherwise, the step 120 is repeated. The step 130 outputs a read command signal to the bar code reader 52 so that the bar code reader 52 reads out information represented by a bar code 43 on the code display 4 of the home-delivery slip 1. The step 130 detects an identification (ID) number of the home-delivery slip 1 from the information read out by the bar code reader 52. A step 140 following the step 130 determines whether or not conditions of the reading of the bar code 43 are normal. When the conditions of the reading of the bar code 43 are normal, the program advances from the step 140 to a step 160. Otherwise, the program advances from the step 140 to a step 150. The step 150 outputs an indication command signal to the display 55 so that the display 55 indicates the presence of an error. After the step 150, the program returns to the step 130.

In the case where the home-delivery slip 1 is not properly placed in the setting slit 57, the step 140 detects that the conditions of the reading of the bar code 43 are abnormal. Thus, in this case, the display 55 indicates the presence of an error by the function of the step 150 so that the user is urged to reset the home-delivery slip 1 into the setting slit 57.

The step 160 outputs a start command signal to the starting winding 51 to energize the starting winding 51 and transmit electric power to the winding 34 of the responding circuit 3 on the home-delivery slip 1. Thus, electric power is induced in the winding 34 of the responding circuit 3 via the electromagnetic coupling between the windings 34 and 51. A step 170 following the step 160 successively outputs a write command signal and the parcel information to the writer 54 to execute a process of writing the parcel information into the responding circuit 3 on the home-delivery slip 1. A step 180 following the step 170 outputs a print command signal to the printer 58 so that the printer 58 prints out necessary data or items. After the step 180, the current execution cycle of the program ends.

The CPU 54a within the writer 54 is programmed to sequentially execute the following processes. When the CPU 54a successively receives the write command signal and the parcel information by the function of the step 170 of FIG. 6, the CPU 54a transfers the parcel information to the modulator 54b. As a result, the carrier generated by the carrier oscillator 54c is modulated by the modulator 54b in accordance with the parcel information. The modulation resultant signal, that is, the output signal of the modulator 54b, is fed to the antenna 54e via the circulator 54d as interrogation radio wave S1. The interrogation radio wave S1 is radiated from the antenna 54e, being transmitted to the responding circuit 3 on the home-delivery slip 1. The responding circuit 3 receives the interrogation radio wave S1, and recovers the parcel information therefrom. The recovered parcel information is stored into the memory 32f. In this way, the parcel information, such as the ID number of the home-delivery slip 1, the assortment code, the freight, and the classification of the parcel, is written into the responding circuit 3. After the process of storing the parcel information into the memory 32f has been completed, the responding circuit 3 transmits reply radio wave S2 representing a signal for confirmation of the contents of the stored parcel information. The reply radio wave S2 is caught by the antenna 54e of the writer 54, and is then fed to the demodulator 54f via the circulator 54d. The demodulator 54f recovers the confirmation signal from the reply radio wave S2, and outputs the recovered confirmation signal to the CPU 54a. The CPU 54a accepts and detects the confirmation signal, and informs the computer 56 of the result of the detection. The program in the computer 56 advances from the step 170 to the step 180 when the computer 56 is informed of the result of the detection.

Figure 7:
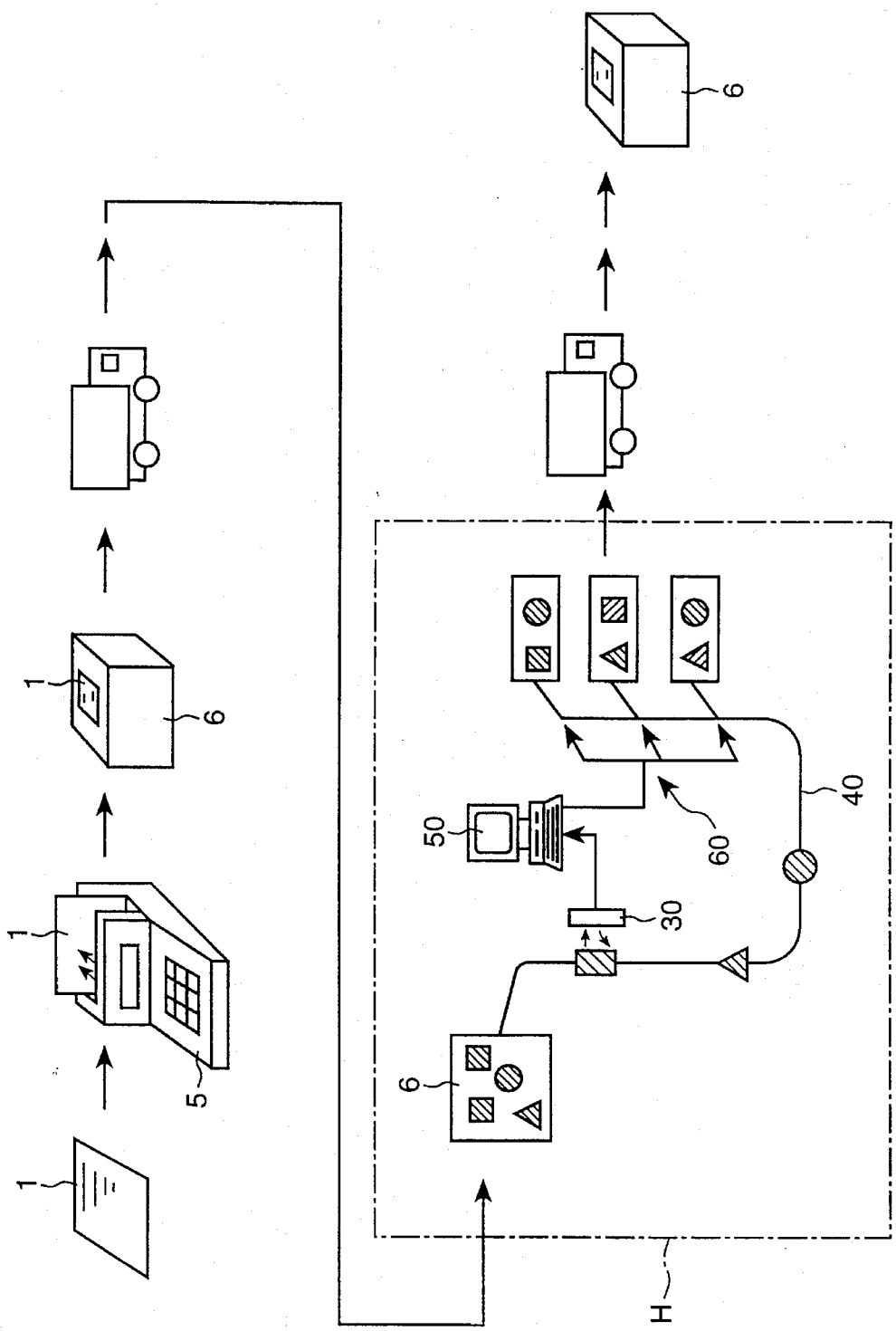
FIG. 7 is a diagram of a home-delivery system in the first embodiment.

As shown in FIG. 7, a home-delivery slip 1 and the slip issuing device 5 are used in a delivery system. With reference to FIG. 7, in the case where a sender (requester) visits a private parcel receiving center to send a parcel 6, the requester fills the hand-written entry blank 2 of a home-delivery slip 1 with necessary items such as the address and the telephone number of a recipient. Then, a person in charge of parcel delivery at the private parcel receiving center verifies the hand-written items before entering parcel information (parcel delivery information) such as the phone number of the recipient, a freight, and the classification of the parcel 6 into the slip issuing apparatus 5. As the operation to enter the parcel information has been completed, the person in charge of parcel delivery places the home-delivery slip 1 into the slip issuing device 5. Subsequently, the slip issuing device 5 starts the responding circuit 3 on the home-delivery slip 1, and writes the parcel information into the responding circuit 3 and executes the printing process. When these processes have been completed, the home-delivery slip 1 is removed from the slip issuing device 5 and is affixed to the parcel 6. The parcel 6 with the home-delivery slip 1 is loaded into a truck, and is carried to a delivery center H where the parcel 6 undergoes automatic sorting. Specifically, in the delivery center H, the parcel 6 is placed on a belt conveyor 40, and is carried thereby. An interrogator 30 located near a portion of the belt conveyor 40 transmits interrogation radio wave which is received by the responding circuit 3 of the home-delivery slip 1 on the parcel 6. The interrogator 30 is similar in circuit design to the previously-mentioned writer 54.

The responding circuit 3 of the home-delivery slip 1 on the parcel 6 operates as follows. With reference to FIG. 3, the interrogation radio wave is caught by the antenna 31 and is then fed to the detector 32b. The detector 32b extracts an interrogation signal from the interrogation radio wave. The detector 32b outputs the extracted interrogation signal to both the level comparator 32c and the CPU 32d. The level comparator 32c compares the voltage of the output signal of the detector 32b with the reference voltage. When the voltage of the output signal of the detector 32b exceeds the reference voltage, the level comparator 32c connects the battery 35 to the CPU 32d and the clock signal generator 32e. As a result, the CPU 32d and the clock signal generator 32e start to operate. The CPU 32d operates in accordance with the program stored in the memory 32f. The CPU 32d is subjected to timing control responsive to the clock signal generated by the clock signal generator 32e. According to the program, the CPU 32d operates as follows. The CPU 32d determines whether or not the received data (the interrogation signal) outputted from the detector 32b is required to be stored. When the received data is required to be stored, the CPU 32d writes the received data into the memory 32f. The CPU 32d also determines whether or not the received data (the interrogation signal) outputted from the detector 32b instructs the reading of previously-stored data from the memory 32f. When the received data instructs the reading of previously-stored data (parcel information) from the memory 32f, the CPU 32d actually reads out previously-stored data from the memory 32f and generates a modulating signal corresponding to the readout data. The CPU 32d outputs the modulating signal to the modulator 32a. Conductive/unconductive conditions of a diode 32g within the modulator 32a vary in accordance with the modulating signal, causing an impedance change and modulating the currently-received radio wave with the modulating signal. Thus, the currently-received radio wave is modulated into reply radio wave representing the parcel information read out from the memory 32f. The reply radio wave is radiated back from the antenna 31.

With reference back to FIG. 7, the interrogator 30 receives the reply radio wave from the responding circuit 3 of the home-delivery slip 1 on the parcel 6. The interrogator 30 derives the parcel information from the received reply radio wave, and outputs the parcel information to a computer 50. As previously described, the parcel information includes the assortment code. The computer 50 controls an automatic sorting device 60 in response to the parcel information, thereby sorting parcels 6 according to areas of the destinations of delivery thereof. Then, the parcels 6 are transported from the delivery center H to delivery bases in the corresponding areas. The parcels 6 are delivered from the delivery bases to the respective destinations. During certain stages of the transportation of a parcel 6, copies of a home-delivery slip 1 on the parcel 6 are removed. Since each of the copies of the home-delivery slip 1 has information represented by a bar code 43, normally-executed slip processing is enabled by using the information. The removal of the copies of the home-delivery slip 1 may be replaced with reading out parcel information via an interrogator (similar in design to the interrogator 30) and using the parcel information in slip processing.

As previously described, the responding circuit 3 on the home-delivery slip 1 starts to practically operate when the slip issuing device 5 energizes the starting winding 51 and thereby feeds electric power to the winding 34 of the responding circuit 3. Thus, the consumption of electric power of the battery 35 in the responding circuit 3 can be suppressed while the home-delivery slip 1 remains unused.

The printer 58 may be omitted from the slip issuing device 5. In this case, information to be printed is indicated on the display 55, and the person in charge of parcel delivery at the private parcel receiving center hand-writes the information.

DESCRIPTION OF THE SECOND PREFERRED EMBODIMENT

Figure 8:
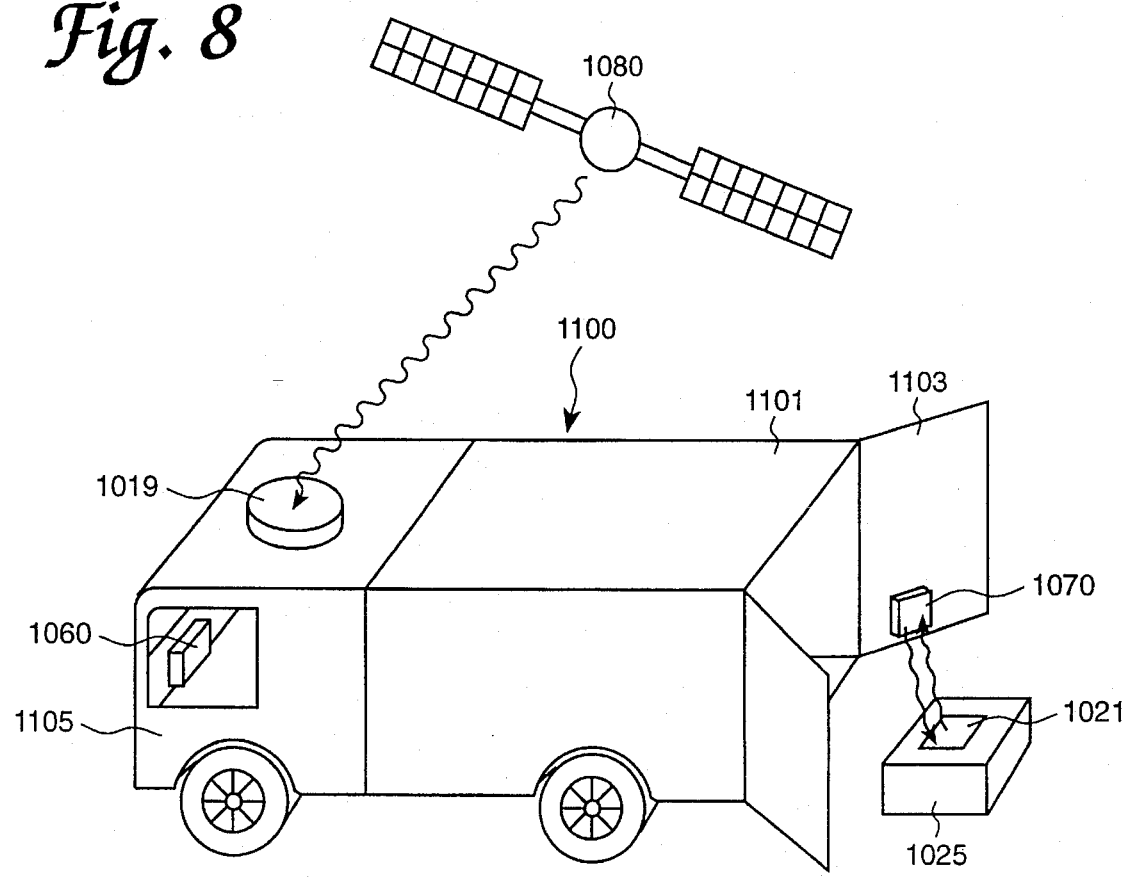
FIG. 8 is a perspective diagram of a home-delivery vehicle in a home-delivery navigation system in a second embodiment of this invention.
Figure 9:
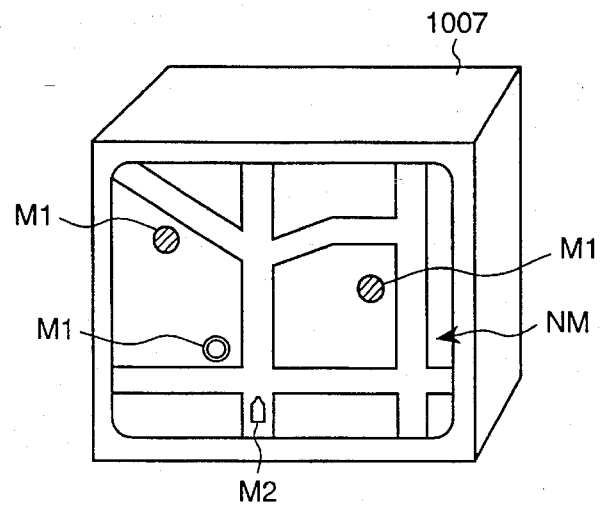
FIG. 9 is a perspective diagram of a display of a navigation device in the second embodiment.

With reference to FIGS. 8 and 9, a home-delivery vehicle 1100 used in a home-delivery navigation system is equipped with a navigation device 1060 having a display 1007. The vehicle 1100 is also equipped with an interrogator 1070.

Figure 10:
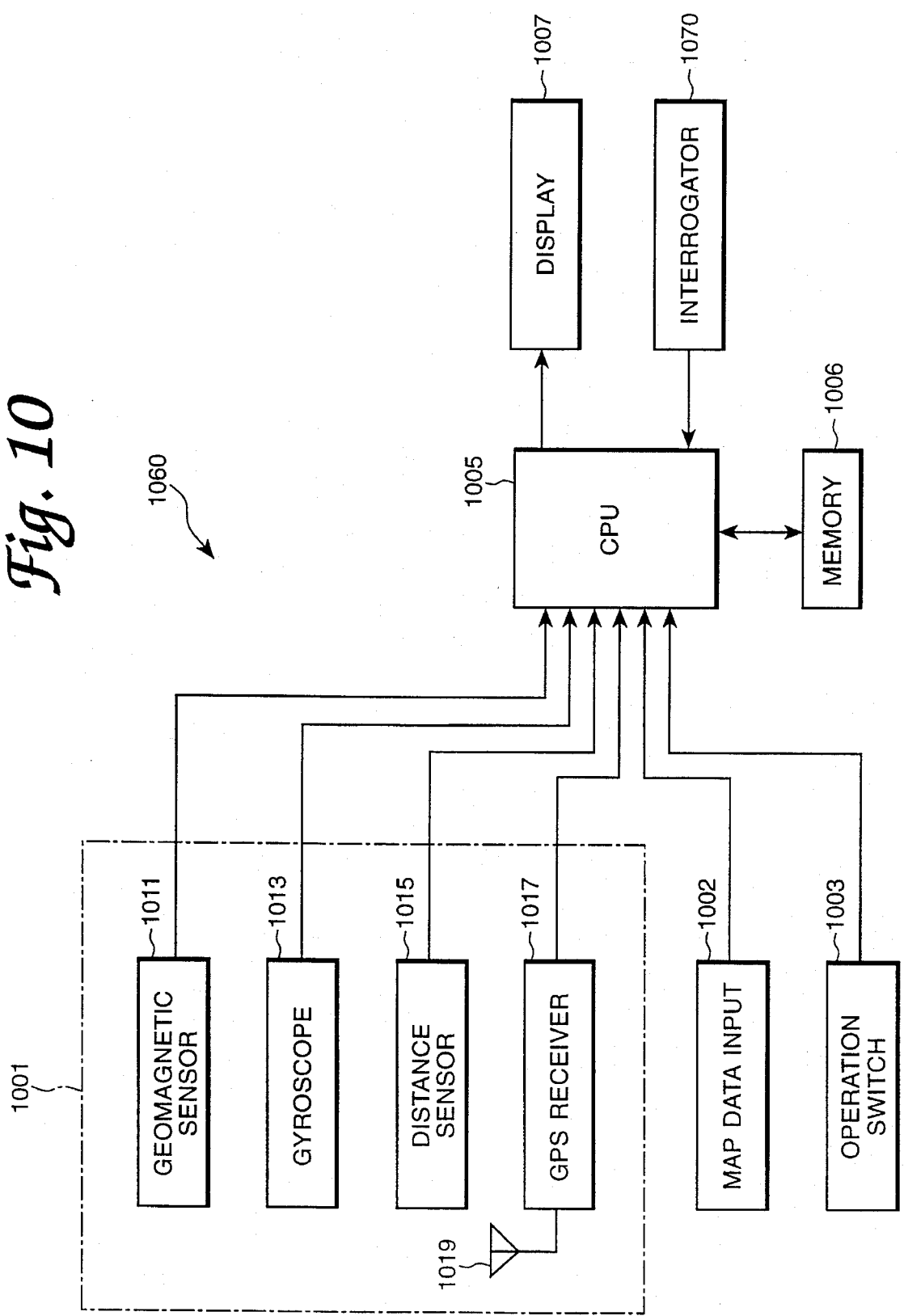
FIG. 10 is a block diagram of the navigation device in the second embodiment.

As shown in FIG. 10, the navigation device 1060 includes a position detector 1001, a map data input unit 1002, an operation switch 1003, a CPU 1005, a memory 1006, and the display 1007. The position detector 1001, the map data input device 1002, the operation switch 1003, the memory 1006, and the display 1007 are connected to the CPU 1005.

The position detector 1001 includes a geomagnetism sensor 1011, a gyroscope 1013, a distance sensor 1015, and a GPS (Global Positioning System) receiver 1017. The GPS receiver 1017 has a GPS antenna 1019 for catching a radio wave signal transmitted from a GPS transmitter on a GPS satellite 1080 (see FIG. 8). The GPS receiver 1017 receives the radio wave signal from the satellite 1080, and detects the position of the vehicle 1100 by referring to the received radio wave signal. The output signals of the sensing devices 1011, 1013, 1015, and 1017 have errors of different characteristics respectively. Accordingly, the sensing devices 1011, 1013, 1015, and 1017 are used in a manner such that they can complement each other. Some of the sensing devices 1011, 1013, 1015, and 1017 may be omitted from the position detector 1001. The position detector 1001 may include other sensors such as a sensor for detecting rotation of a vehicle steering wheel and sensors for detecting rotations of vehicle driving and driven wheels.

The map data input unit 1002 is used in inputting various data into the navigation device 1060. The input data includes map matching data, map data, and data representative of route guidance. The input data is used to enhance the accuracy of detection of the position. For example, the input data is transferred into the navigation device 1060 from a CDROM or a memory card via the map data input unit 1002.

The display 1007 faces driver's seat 1105 of the vehicle 1100. As shown in FIG. 9, the display 1007 can indicate both vehicle position information inputted via the position detector 1001 and a navigation map NM inputted via the map data input unit 1002 in an overlap manner. The navigation device 1060 has a route guidance function. Specifically, when information of a destination is inputted into the navigation device 1060 via the operation switch 1003, a typical route from the current vehicle position to the destination is indicated on the display 1007. The operation switch 1003 uses a mechanical switch or a touch switch mounted on the display 1007. The operation switch 1003 is used in inputting various information into the navigation device 1060.

As shown in FIG. 8, the interrogator 1070 is attached to a door 1103 defining a rear part of a cargo compartment (loading compartment) 1101 of the vehicle 1100. The interrogator 1070 transmits an interrogation radio wave signal to a home-delivery slip (an electronic tag) 1021 affixed to a parcel 1025. The home-delivery slip 1021 stores delivery information related to the parcel 1025. When the home-delivery slip 1021 receives the interrogation signal, the home-delivery slip 1021 transmits a reply radio wave signal representative of the delivery information to the interrogator 1070.

Figure 11:
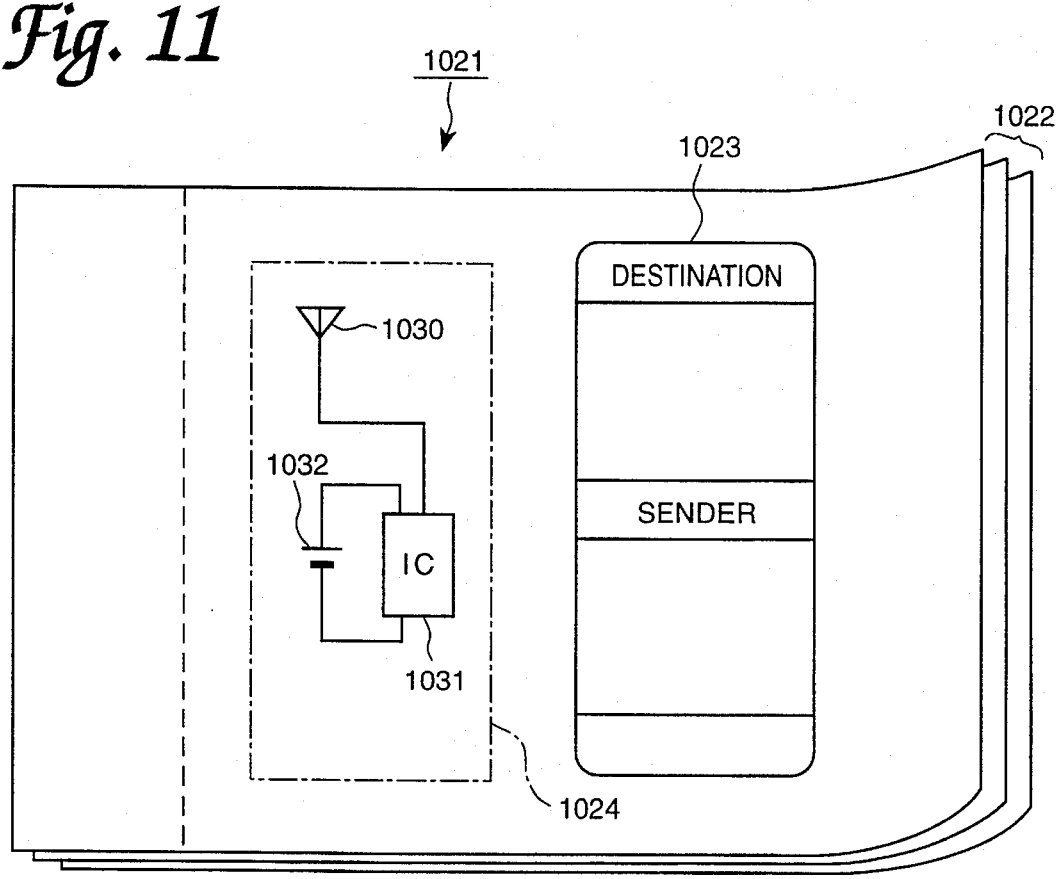
FIG. 11 is a diagram of a home-delivery slip in the second embodiment.

As shown in FIG. 11, the home-delivery slip 1021 includes slip pieces 1022, such as a sender copy, a delivery slip copy, and a recipient copy, which have ends bonded together to form a bundled configuration. The pieces 1022 of the home-delivery slip 1021 which are affixed to the parcel 1025 (see FIG. 8) have an entry blank 1023 and a responding circuit 1024.

Information is to be hand-written into the entry blank 1023. Specifically, delivery information such as the names and addresses of a destination and a sender (the person requesting parcel delivery) is to be hand-written into the entry blank 1023 by the sender. Also, information of a fee and information of an assortment code (a sorting code) for identifying a destination region are to be hand-written into the entry blank 1023 by the parcel handling agent.

The responding circuit 1024 includes an antenna 1030, an integrated circuit (IC) 1031, and a battery (power supply) 1032. The antenna 1030 is used in radiating and catching radio waves carrying data. The IC 1031 serves to control various circuits and store parcel information (parcel delivery information). The battery 1031 supplies electric power to the IC 1031. Generally, at a private parcel receiving center which handles the parcel 1025, the assortment code for identifying the destination region related to the parcel 1025 is inputted into the responding circuit 1024.

Figure 12:
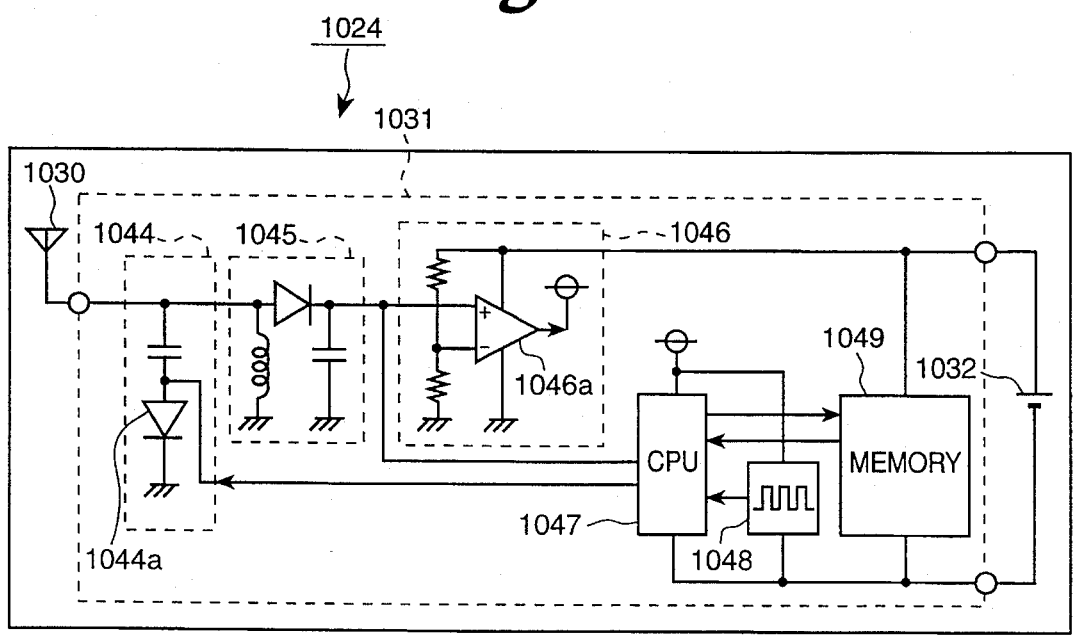
FIG. 12 is a diagram of a responding circuit in the second embodiment.

As shown in FIG. 12, the IC 1031 includes a modulator 1044, a detector 1045, a level comparator 1046, a CPU 1047, a clock signal generator 1048, and a memory 1049. The level comparator 1046 includes an operational amplifier 1046a which compares the voltage of the output signal of the detector 1045 with a reference voltage determined by a series combination of voltage dividing resistors (no reference numerals). When the voltage of the output signal of the detector 1045 exceeds the reference voltage, the operational amplifier 1046a connects the battery 1032 to the CPU 1047 and the clock signal generator 1048. Otherwise, the operational amplifier 1046a disconnects the battery 1032 from the CPU 1047 and the clock signal generator 1048. The memory 1049 stores a program. The CPU 1047 operates in accordance with the program stored in the memory 1049. The memory 1049 also serves to store recovered data.

The responding circuit 1024 operates as follows. Interrogation radio wave is caught by the antenna 1030 and is then fed to the detector 1045. The detector 1045 extracts an interrogation signal from the interrogation radio wave. The detector 1045 outputs the extracted interrogation signal to both the level comparator 1046 and the CPU 1047. The level comparator 1046 compares the voltage of the output signal of the detector 1045 with the reference voltage. When the voltage of the output signal of the detector 1045 exceeds the reference voltage, the level comparator 1046 connects the battery 1032 to the CPU 1047 and the clock signal generator 1048. As a result, the CPU 1047 and the clock signal generator 1048 start to operate. The CPU 1047 operates in accordance with the program stored in the memory 1049. The CPU 1047 is subjected to timing control responsive to the clock signal generated by the clock signal generator 1048. According to the program, the CPU 1047 operates as follows. The CPU 1047 determines whether or not the received data (the interrogation signal) outputted from the detector 1045 is required to be stored. When the received data is required to be stored, the CPU 1047 writes the received data into the memory 1047. The CPU 1047 also determines whether or not the received data (the interrogation signal) outputted from the detector 1045 instructs the reading of previously-stored data from the memory 1049. When the received data instructs the reading of previously-stored data (parcel information) from the memory 1049, the CPU 1047 actually reads out previously-stored data from the memory 1049 and generates a modulating signal corresponding to the readout data. The CPU 1047 outputs the modulating signal to the modulator 1044. Conductive/unconductive conditions of a diode 1044a within the modulator 1044 vary in accordance with the modulating signal, causing an impedance change and modulating the currently-received radio wave with the modulating signal. Thus, the currently-received radio wave is modulated into reply radio wave representing the parcel information read out from the memory 1049. The reply radio wave is radiated back from the antenna 1030.

Figure 13:
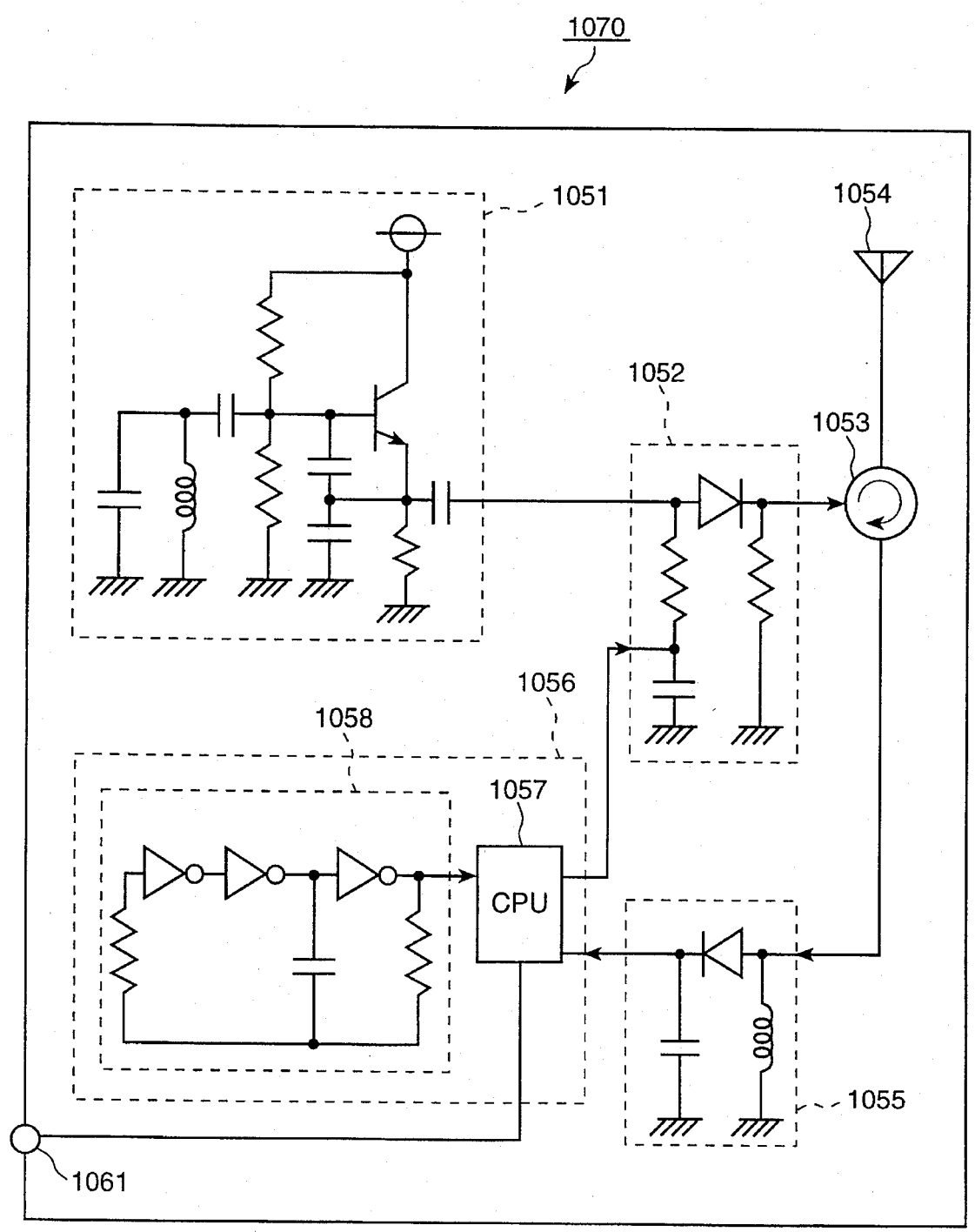
FIG. 13 is a diagram of an interrogator in the second embodiment.

As shown in FIG. 13, the interrogator 1070 includes a carrier oscillator 1051, a modulator 1052, a circulator 1053, an antenna 1054, a demodulator 1055, and a signal processor 1056. The carrier oscillator 1051 generates a carrier of transmission radio wave. The modulator 1052 superimpose information on the carrier generated by the carrier oscillator 1051. The circulator 1053 separates transmitted radio wave and received radio wave. The antenna 1054 radiates and catches radio waves. The demodulator 1055 recovers information from the received radio wave. The signal processor 1056 functions to process information and to control the modulator 1052 and the demodulator 1055. The signal processor 1056 includes a CPU 1057 and a clock signal generator 1058. The clock signal generator 1058 produces a clock signal and feeds the clock signal to the CPU 1057. The interrogator 1070 is connected to the navigation device 1060 (see FIG. 8). Specifically, the CPU 1057 is connected to the navigation device 1060 via an interface or a terminal 1061.

The signal processor 1056 feeds information data to the modulator 1052. The carrier oscillator 1051 feeds the carrier to the modulator 1052. The modulator 1052 modulates the carrier with the information data, thereby superimposing the information data on the carrier. The output radio wave signal from the modulator 1052 which carries the information data is fed via the circulator 1053 to the antenna 1054, and is then radiated from the antenna 1054. A reply radio wave signal from the responding circuit 1024 on the home-delivery slip 1021 is caught by the antenna 1054, being fed via the circulator 1053 to the demodulator 1055. The demodulator 1055 recovers information from the reply radio wave signal, and outputs the recovered information to the signal processor 1056. The recovered information is processed by the signal processor 1056.

The signal processor 1056 generates transmission data (information data) in response to a control signal and various information received via the interface 61. The signal processor 1056 outputs the transmission data. As previously described, the signal processor 1056 receives the recovered information from the demodulator 1055. The recovered information contains identification (ID) information. The signal processor 1056 transfers the recovered information to the CPU 1005 of the navigation device 1060 via the interface 1061.

Figure 14:
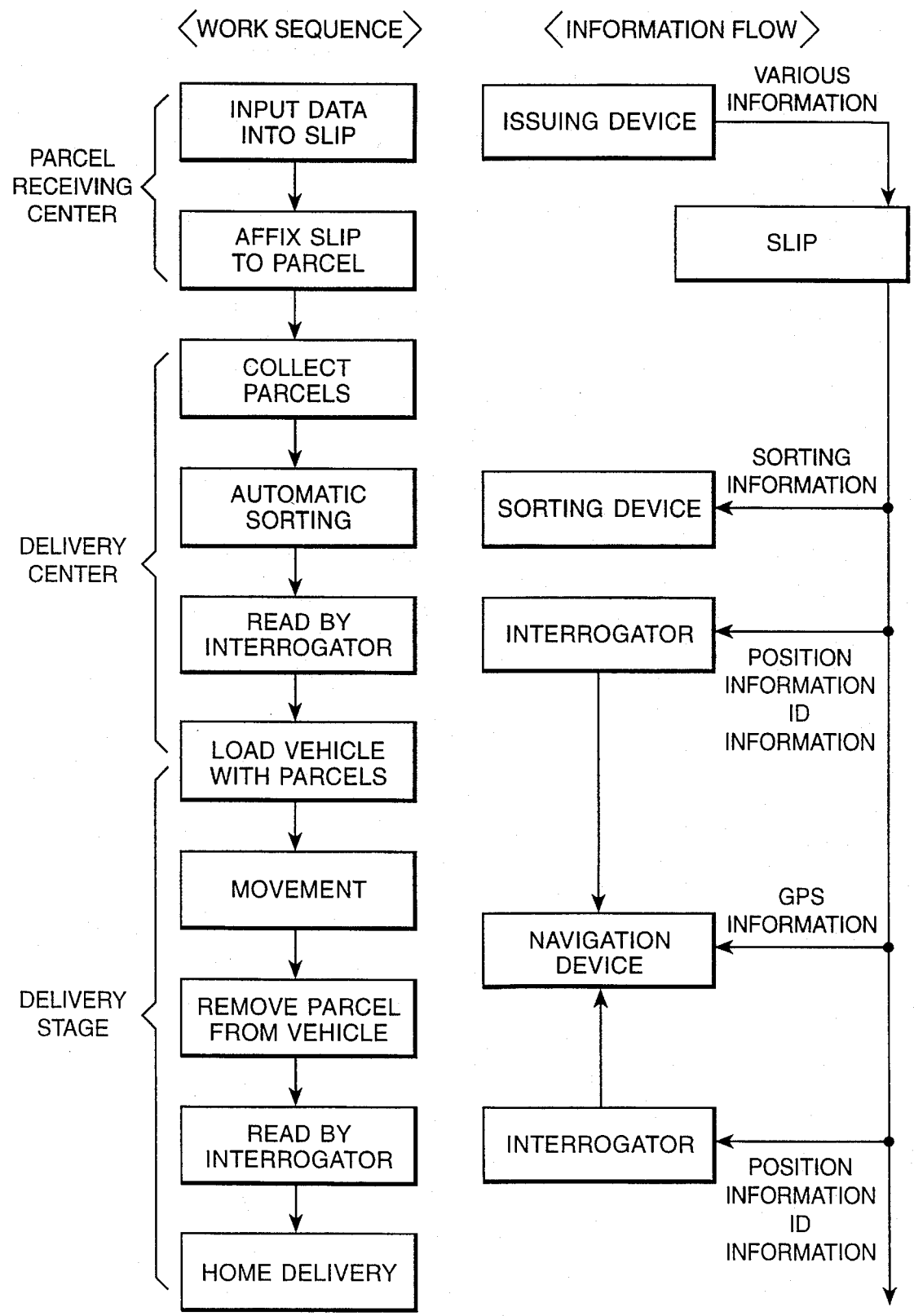
FIG. 14 is a diagram of a sequence of steps of home-delivery work and a flow of information in the second embodiment.

As shown in FIG. 14, at a private parcel receiving center, information data is inputted into a home-delivery slip 1021 via a slip issuing device. The input information data contains information data representative of the location or address of a destination which is expressed in latitude and longitude according to the format of GPS information. In addition, other information data such as sorting information data and ID information data is similarly inputted into the home-delivery slip 1021. The home-delivery slip 1021 loaded with the information data is affixed to a parcel 1025.

Parcels 1025 with home-delivery slips 1021 are transported from private parcel receiving centers to a delivery center. A sorting device in the delivery center automatically sorts the parcels 1025 according to the sorting information data in the home-delivery slips 1021. In the delivery center, when each parcel 1025 is loaded into a home-delivery vehicle 1100, an interrogator 1070 on a door 1103 of a vehicle cargo compartment 1101 reads out destination position information and other information (for example, ID information) from a home-delivery slip 1021 affixed to the parcel 1025. The readout information is transferred from the interrogator 1070 to a navigation device 1060 in the vehicle 1100, and is indicated on a navigation map NM at a navigation device display 1007 as a home-delivery destination position mark M1 (see FIG. 9). As shown in Fig. 9, the current position of the vehicle 1100 is indicated on the navigation map NM as a current vehicle position mark M2. The current position of the vehicle 1100 is measured by the navigation device 1060 in response to a GPS signal received from a GPS satellite 1080 via a GPS antenna 1019 (see FIG. 8). After given parcels 1025 are loaded into the vehicle 1100, a vehicle driver (delivery worker) starts the vehicle 1100 and leaves the delivery center.

The delivery worker drives the vehicle 1100 toward a destination while monitoring the navigation map NM on the display 1007. As shown in FIG. 9, in some cases, there are home-delivery destination position marks M1 on the navigation map NM. It is preferable that one of the home-delivery destination position marks M1 which is closest to the current vehicle position M2 can be distinguished from others. For example, the closest home-delivery destination mark M1 is different from others in shape, color, luminance, or time-domain characteristic. It is preferable that the parcel information such as the name of the destination which is related to the closest home-delivery destination mark M1 is indicated on the display 1007 when the operation switch 1003 of the navigation device 1060 is actuated. One of the home-delivery destination position marks M1 which is not closest to the current vehicle position M2 may be designated and distinguished from others. In this case, it is preferable that designated one can be sequentially changed among the home-delivery destination position marks M1 when the operation switch 1003 is actuated in a given way.

When the vehicle 1100 arrives at a destination, a corresponding parcel 1025 is removed from the vehicle 1100. At this time, the interrogator 1070 reads out destination position information and ID information from a home-delivery slip 102 1 on the parcel 1025. The interrogator 1070 transfers the readout information to the navigation device 1060. When the information transferred to the navigation device 1060 corresponds to designated one of the home-delivery destination position marks M1, the navigation device 1060 erases the designated mark or makes the designated mark distinguishable from others. Thus, the delivery worker is prevented from confusing marks M1 related to parcels which have been delivered and marks M1 related to parcels which should be delivered later. Designated one of the home-delivery destination position marks M1 may be defined as a mark corresponding to a parcel 1025 whose information is currently indicated on the display 1007. When the information transferred to the navigation device 1060 does not correspond to designated one of the home-delivery destination position marks M1, an alarm (not shown) is activated to generate a warning. Thus, the delivery worker is immediately informed of the removal of a wrong parcel 1025 from the vehicle 1100.

An IC card may be loaded with information of who removes each parcel 1025 from the vehicle 1100, and when and where each parcel 1025 is removed from the vehicle 1100. In this case, when the vehicle 1100 returns to the delivery center, the information is down-loaded from the IC card into a host computer in the delivery center. Thus, a given parcel can be easily traced by using the host computer in a later survey.

Figure 15:
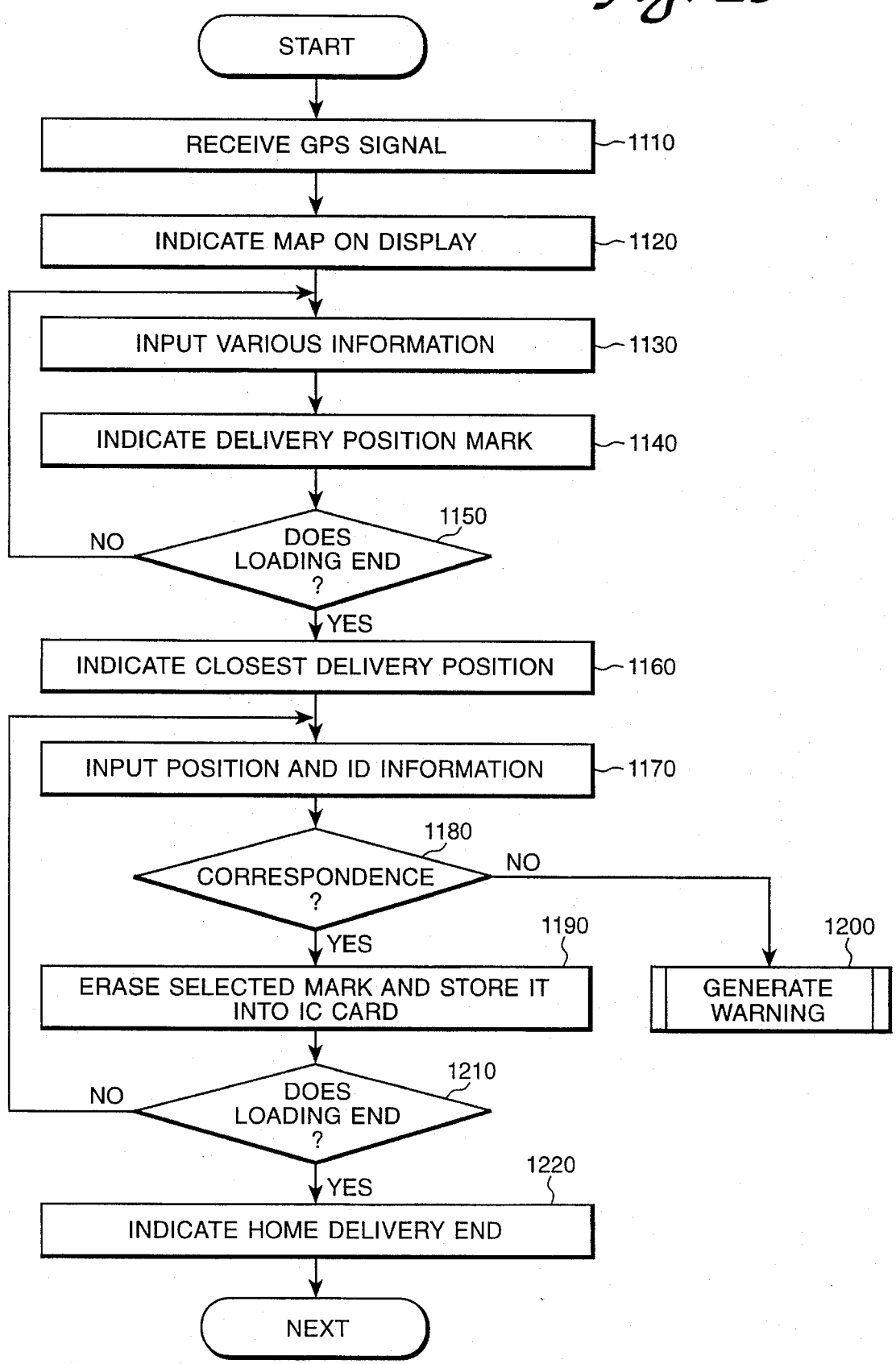
FIG. 15 is a flowchart of a program for controlling a CPU in the navigation device in the second embodiment.

The CPU 1005 of the navigation device 1060 (see FIG. 10) operates in accordance with a program stored in the memory 1006. The program starts when a power supply switch of the navigation device 1060 is turned to an ON position. FIG. 15 is a flowchart of this program.

As shown in FIG. 15, a first step 1110 of the program controls the GPS receiver 1017 to receive a GPS signal. The first step 1110 derives information of the current position of the vehicle 1100 by referring to the received GPS signal. A step 1120 following the step 1110 controls the display 1007 in response to the information of the current vehicle position to indicate a navigation map NM with the current vehicle position mark M2. After the step 1120, the program advances to a step 1130. The step 1130 derives destination position information and ID information related to a parcel 1025 loaded into the vehicle 1100. A step 1140 following the step 1130 controls the display 1007 in response to the information derived by the step 1130 so that a destination position mark M1 corresponding to the parcel 1025 will be indicated on the navigation map NM. A step 1150 following the step 1140 determines whether or not all parcels 1025 have been loaded into the vehicle 1100 by referring to the output signal of the switch 1003 or another switch (not shown). It should be noted that this switch is operated by a delivery worker when the loading of all parcels 1025 into the vehicle 1100 has been completed. When all parcels 1025 have not yet been loaded into the vehicle 1100, the program returns from the step 1150 to the step 1130. When all parcels 1025 have been loaded into the vehicle 1100, the program advances from the step 1150 to a step 1160. Thus, the steps 1130 and 1140 are periodically repeated until the loading of all parcels 1025 into the vehicle 1100 has been completed.

The step 1160 selects and designates one of destination position marks M1 which is closest to the current vehicle position mark M2. The step 1160 controls the display 1007 to make the selected mark M1 distinguishable from others. In addition, the step 1160 controls the display 1007 in response to information (destination name information and parcel information) of the parcel 1025 related to the selected destination position mark M1 so that the information of the parcel 1025 will be indicated on the display 1007. After the step 1160, the program advances to a step 1170. The step 1170 derives destination position information and ID information from the output signal of the interrogator 1070. It should be noted that the destination position information and the ID information are read out from a home-delivery slip 1021 on a parcel 1025 by the interrogator 1070 when the parcel 1025 is removed from the vehicle 1100. A step 1180 following the step 1170 determines whether or not the destination position information and the ID information correspond to the selected destination position mark M1. When the destination position information and the ID information correspond to the selected destination position mark M1, the program advances from the step 1180 to a step 1190. Otherwise, the program advances from the step 1180 to a step 1200. The step 1190 controls the display 1007 to erase the selected destination position mark M1 from the navigation map NM. In addition, the step 1190 loads an IC card with the information corresponding to the erased destination position mark Mi. The step 1200 activates an alarm to generate a warning. When the delivery worker places the wrong parcel 1025 back into the vehicle 1100 and removes a correct parcel 1025 from the vehicle 1100 in response to the warning, the program advances from the step 1180 to the step 1190 after the next execution of the step 1180. A step 1210 following the step 1190 determines whether or not all parcels 1025 have been removed from the vehicle 1100 by referring to the output signal of the switch 1003 or another switch (not shown). It should be noted that this switch is operated by the delivery worker when the removal of all parcels 1025 from the vehicle 1100 has been completed. When all parcels 1025 have not yet been removed from the vehicle 1100, the program returns from the step 1210 to the step 1170. When all parcels 1025 have been removed from the vehicle 1100, the program advances from the step 1210 to a step 1220. The step 1220 controls the display 1007 to indicate the termination of the delivery. After the step 1220, the execution of the program ends.

As previously described, the current vehicle position mark M2 and the destination position marks M1 are indicated on the navigation map NM. The indication of the destination position marks M1 prevents the delivery worker from forgetting the delivery of some parcel 1025.

While the interrogator 1070 reads out parcel delivery information and transfers it to the navigation device 1060 each time a parcel 1025 is loaded into the vehicle 1100 in this embodiment, collected parcel delivery information may be stored at once into an IC card or a magnetic floppy disk and be then inputted therefrom into the navigation device 1060 when parcels 1025 are sorted according to destinations or grouped for home-delivery vehicles 1100 in the delivery center.

While only parcel delivery information is inputted into the navigation device 1060 and information data related to the navigation map NM is provided in the navigation device 1060 in this embodiment, parcel delivery information and information data of the navigation map NM may be combined into composite information which is previously stored into an information storage medium such as a CD. In this case, the composite information is inputted into the navigation device 1060 from the information storage medium via the map data input unit 1002, and hence the navigation device 1060 can be simpler.

DESCRIPTION OF THE THIRD PREFERRED EMBODIMENT

Figure 16:
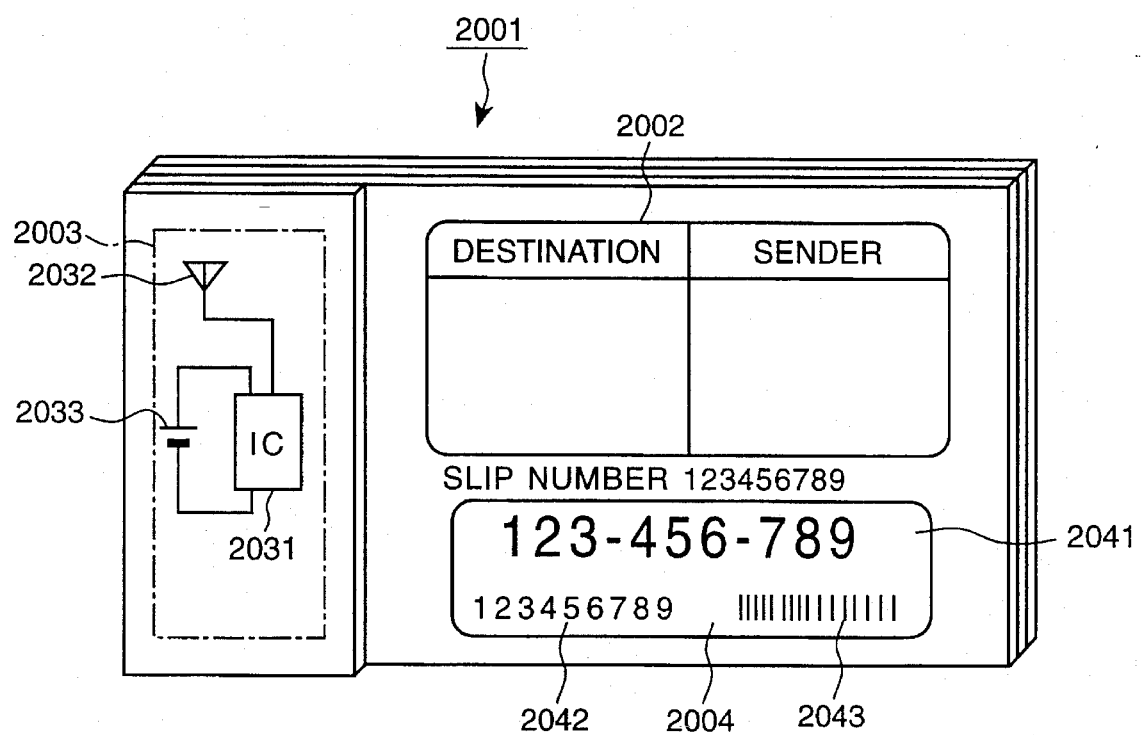
FIG. 16 is a diagram of a home-delivery slip in a third embodiment of this invention.

With reference to FIG. 16, a composite home-delivery slip 2001 being an information storage medium (an electronic tag) includes a plurality of slip pieces of various types. The home-delivery slip 2001 has both a delivery slip function and an electronic tag function. The home-delivery slip 2001 is mainly divided into an entry blank 2002, a responding circuit 2003, and a code display 2004.

Information is to be hand-written into the entry blank 2002. Specifically, delivery information such as the names and addresses of a destination and a sender (the person requesting parcel delivery) is to be hand-written into the entry blank 2002 by the sender. Also, information of a freight or fee and information of an assortment code (a sorting code) for identifying a destination region are to be hand-written into the entry blank 2002 by the parcel handling agent.

The code display 2004 indicates information of a slip number which can be optically or magnetically read out. Specifically, OCR characters 2041, MICR characters 2042, and a bar code 2043 representative of the slip number are written into the code display 2004 during the fabrication of the home-delivery slip 2001.

The responding circuit 2003 includes an antenna 2032, an integrated circuit (IC) 2031, and a battery (power supply) 2033. The antenna 2032 is used in radiating and catching radio waves carrying data. The IC 2031 serves to control various circuits and store parcel information (parcel delivery information). The battery 2033 supplies electric power to the IC 2031. Generally, a slip issuing device which can communicate with the responding circuit 2003 by radio is used in writing parcel delivery information into the IC 2031 of the responding circuit 2003. It should be noted that the slip issuing device will be described later. The parcel delivery information contains fixed data and variable data. The fixed data represents a slip number, that is, a character set, corresponding to a parcel identification (ID) code. The variable data represents an assortment code, a telephone number, and others. Generally, at a private parcel receiving center, the parcel delivery information is written into the responding circuit 2003 by using the slip issuing device.

Figure 17:
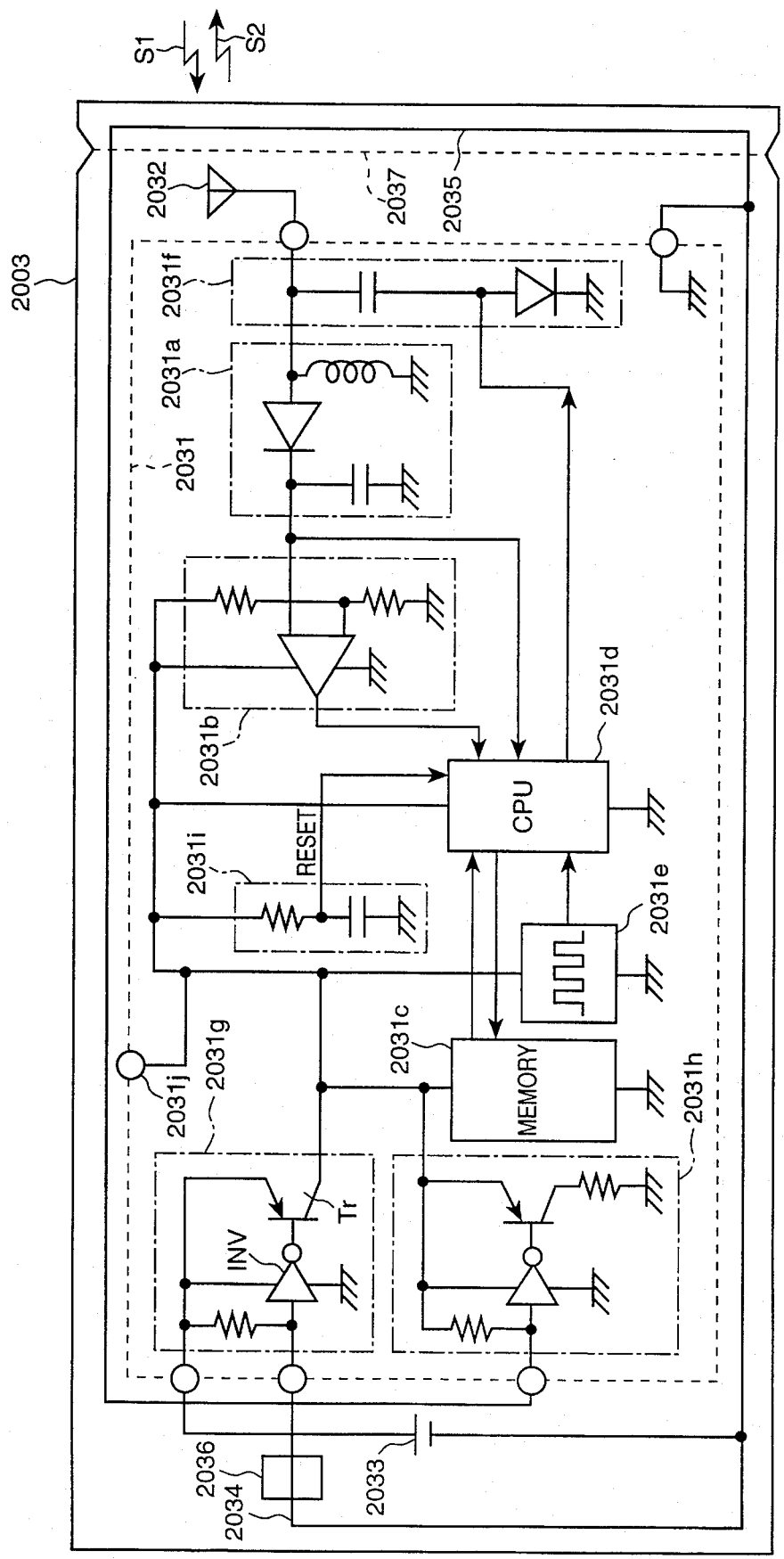
FIG. 17 is a diagram of a responding circuit in the third embodiment.

As shown in FIG. 17, the responding circuit 2003 includes the IC 2031, the antenna 2032, the battery 2033, an operation starting line 2034, and an operating ending line 2035. The IC 2031 executes signal processing. The antenna 2032 catches interrogation radio wave S1, and radiates reply radio wave S2. The battery 2033 powers the IC 2031. The operation starting line 2034 enables the responding circuit 2003 to remain inactive before the responding circuit 2003 is used. The operating ending line 2035 is mechanically actuated in terminating operation of the responding circuit 2003 after the responding circuit 2003 has been used.

The responding circuit 2003 is formed on a substrate (base sheet) which has a section 2036 to be punched out. The operation starting line 2034 extends across the punch section 2036. The substrate also has a perforated line 2037 which intersects with the operation ending line 2035 at two points. The substrate is made of material, such as polyester, polyimide, or paper, which allows easy removal of the punch section 2036 by a punching process.

The IC 203 1 includes a detector 2031a, a level comparator 2031b, a memory 2031c, a CPU 2031d, a clock signal generator 2031e, a modulator 2031f, a starting circuit 2031g, a discharging circuit 2031h, a reset circuit 2031i, and a test terminal 2031j. Interrogation radio wave S1 caught by the antenna 2032 is fed to the detector 2031a. The detector 2031a extracts information from the interrogation radio wave S1. The level comparator 2031b detects the reception of the interrogation radio wave S1 by referring to the level of the output signal of the detector 2031a. When the reception of the interrogation radio wave S1 is detected, the level comparator 2031b enables the CPU 2031d to start signal processing. The memory 2031c stores parcel delivery information. The CPU 2031d operates in accordance with a program stored in an internal ROM. The CPU 2031d is subjected to timing control responsive to a clock signal produced by the clock signal generator 2031e. The modulator 2031f modulates the interrogation radio wave S1 with an output signal of the CPU 2031d, thereby converting the interrogation radio wave S1 into reply radio wave S2 fed to the antenna 2032. The reset circuit 2031i outputs a reset signal to the CPU 2031d when the responding circuit 2003 is started to operate by a break of the operation starting line 2034. The test terminal 2031j is used in checking the operation of the IC 2031. The starting circuit 2031g includes a cascade combination of an inverter INV and a transistor Tr.

Figure 18:
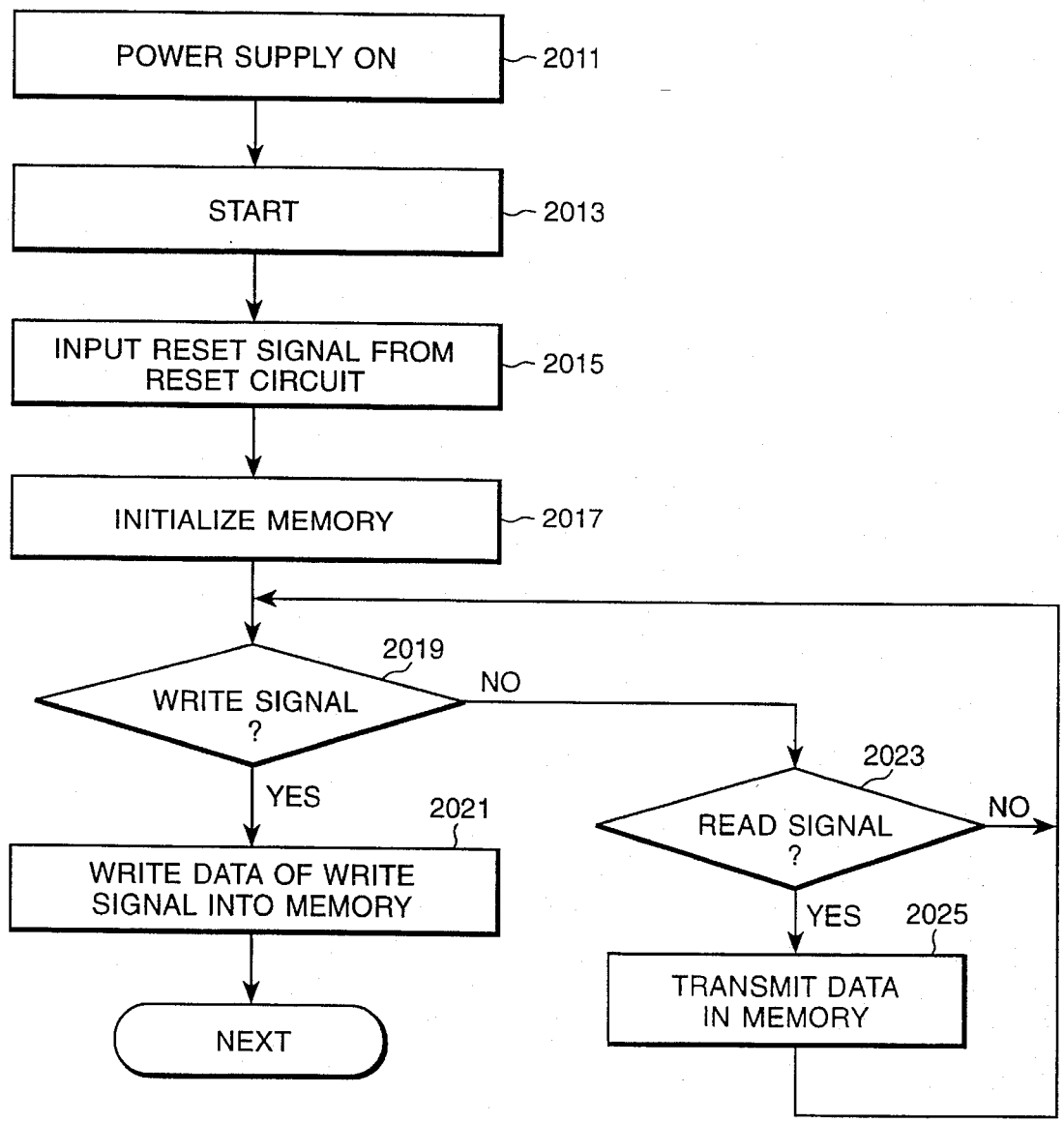
FIG. 18 is a flowchart of operation of the responding circuit in the third embodiment.

Before the responding circuit 2003 is used, the operation starting line 2034 allows the application of a low level potential to the inverter INV so that the transistor Tr remains unconductive. Under these conditions, an electric current consumed by the responding circuit 2003 is equal to only about 0.1 µA. When the responding circuit 2003 is required to be used, the punch section 2036 is removed from the sheet of the responding circuit 2003 by a manual punch device or a punch unit within the slip issuing device. As a result, the responding circuit 2003 starts to operate. FIG. 18 is a flowchart of operation of the responding circuit 2003, a part of which is executed according to the program for controlling the CPU 2031d.

Operation of the responding circuit 2003 will be described hereinafter with reference to FIG. 18. When the punch section 2036 is removed, a high level potential is applied to the inverter INV so that the transistor Tr is made conductive. This process corresponds to a first step 2011 of FIG. 18. Then, the responding circuit 2003 starts to execute its main operation at a step 2013. In addition, the reset circuit 2031i outputs a reset signal to the CPU 2031d. After the reset signal is inputted into the CPU 2031d at a step 2015, the CPU 2031d executes an initializing process and clears the memory 2031c at a step 2017. Then, the CPU 2031d waits an incoming signal. This process corresponds to a step 2019.

When the slip issuing device is required to write parcel delivery information into the responding circuit 2003, the slip issuing device transmits an interrogation radio wave signal S1 which represents a write command and parcel delivery information. The interrogation radio wave signal S1 is caught by the antenna 2032, and is then fed to the detector 2031a. The level comparator 2031b starts the supply of electric power to the CPU 2031d and the clock signal generator 2031e in response to the output signal of the detector 2031a which is caused by the reception of the interrogation radio wave signal S1. The detector 2031a extracts information from the received interrogation radio wave signal S1, and outputs the extracted information to the CPU 2031d. At a step 2019 of FIG. 18, the CPU 2031d determines whether or not the input information (the information from the detector 2031a) contains a write command signal. When the input information contains a write command signal, the CPU 2031d separates parcel delivery information from the input information and writes the parcel delivery information into the memory 2031c at a step 2021. It should be noted that the memory 2031c falls into an operable state immediately before the start of the information writing process.

At a step 2023 of FIG.18, the CPU 2031d determines whether or not the input information contains a read command signal. When the input information contains a read command signal, the CPU 2031d reads out information data from the memory 2031c and outputs the readout information data to the modulator 2031f as a modulating signal at a step 2025. The modulator 20321f modulates the currently-received interrogation radio wave signal S1 with the modulating signal, thereby converting the interrogation radio wave signal S1 into a reply radio wave signal S2 carrying the readout information. The reply radio wave signal S2 is fed to the antenna 2032, and is radiated from the antenna 2032. After the step 2025, the operation of the responding circuit 2003 returns to the step 2019.

In the case where the antenna 2032 catches an interrogation radio wave signal S1 again after parcel delivery information is written into the memory 2031c, the level comparator 2031b starts the supply of electric power to the CPU 2031d and the clock signal generator 2031e in response to the output signal of the detector 2031a which is caused by the reception of the interrogation radio wave signal S1. The detector 2031a extracts information from the received interrogation radio wave signal S1, and outputs the extracted information to the CPU 2031d. When the input information (the information from the detector 2031a) contains a read command signal, the CPU 2031d reads out the parcel delivery information from the memory 2031c and outputs the readout parcel delivery information to the modulator 2031f as a modulating signal. The modulator 2031f modulates the currently-received interrogation radio wave signal S1 with the modulating signal, thereby converting the interrogation radio wave signal S1 into a reply radio wave signal S2 carrying the readout parcel delivery information. The reply radio wave signal S2 is fed to the antenna 2032, and is radiated from the antenna 2032. To reduce the rate of errors in information transmission, the parcel delivery information carried on the reply radio wave signal S2 is preferably represented by a Manchester or F2F code which uses two states for the transmission of 1-bit information data.

When the use of the home-delivery slip 2001 has ended, the responding circuit 2003 is deactivated to prevent radio wave interference and unwanted operation. Specifically, the sheet of the responding circuit 2003 is separated into two pieces along the perforated line 2037, so that the operation ending line 2035 is broken. The break of the operation ending line 2035 activates the discharging circuit 2031h, thereby discharging the battery 2033 via the discharging circuit 203. Thus, the responding circuit 2003 is deactivated.

In the case where drive electric power is supplied to the responding circuit 2003 via the test terminal 2031j to check the responding circuit 2003 before the operation starting line 34 is broken, the CPU 2031d executes the initializing process and clears the memory 2031c. In addition, the responding circuit 2003 falls into a state capable of communication. After the check of the responding circuit 2003 has been finished, the test terminal 2031j is connected or short-circuited to the ground. Thus, a capacitor (no reference character) within the reset circuit 2031i is discharged, and the reset circuit 2031i outputs a reset signal to the CPU 2031d. The CPU 2031d is reset by the reset signal.

In the case where information data is required to be erased from the memory 2031c, drive electric power is supplied to the responding circuit 2003 via the test terminal 2031j. When the responding circuit 2003 is activated by the drive electric power, the CPU 2031d executes the initializing process and clears the memory 2031c.

Figure 19:
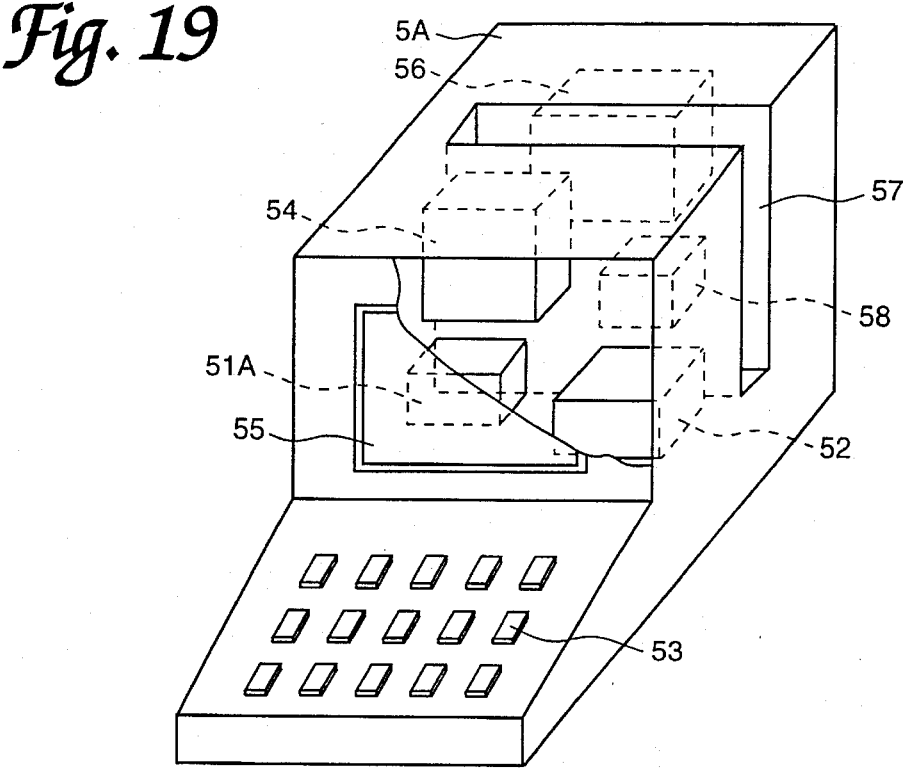
FIG. 19 is a perspective diagram of an issuing device in the third embodiment.

FIG.19 shows the slip issuing device 5A which is similar to the slip issuing device 5 of FIG. 4 except that a punch unit 51A replaces the starting winding 51. The punch unit 51A serves to remove the punch section 2036 from the sheet of the responding circuit 2003 on a home-delivery slip 2001.

In the case where a sender (requester) visits a private parcel receiving center to send a parcel, the requester fills the hand-written entry blank 2002 of a home-delivery slip 2001 with necessary items such as the address and the telephone number of a recipient. Then, a person in charge of parcel delivery at the private parcel receiving center verifies the hand-written items before entering parcel information (parcel delivery information) such as the phone number of the recipient, a freight, and the classification of the parcel into the slip issuing apparatus 5A via a keyboard 53. As the operation to enter the parcel information has been completed, the person in charge of parcel delivery places the home-delivery slip 2001 into a setting slit 57 of the slip issuing device 5A in a manner such that its front side (the side on which the hand-written entry blank 2002 is located) faces the user. Subsequently, the slip issuing device 5A operates on the home-delivery slip 2001. The punch unit 51A within the slip issuing device 5A removes the punch section 2036 from the sheet of the responding circuit 2003 on the home-delivery slip 2001, thereby activating the responding circuit 2003. When the operation on the home-delivery slip 2001 has been completed, the home-delivery slip 2001 is removed from the slip issuing device 5A and is affixed to the parcel given by the requester. A copy of the home-delivery slip 2001 is handed to the requester, and remaining copies thereof are kept at the private parcel receiving center as archival copies. As an alternative, delivery data may be stored into a memory either internal or external to the slip issuing device 5A instead of keeping the slip copies as archival copies. In the case where the slip issuing device 5A is online-connected to a computer of a delivery center, the input data can be immediately transmitted to the delivery center so that centralized management of home-delivery information can be realized.

Figure 20:
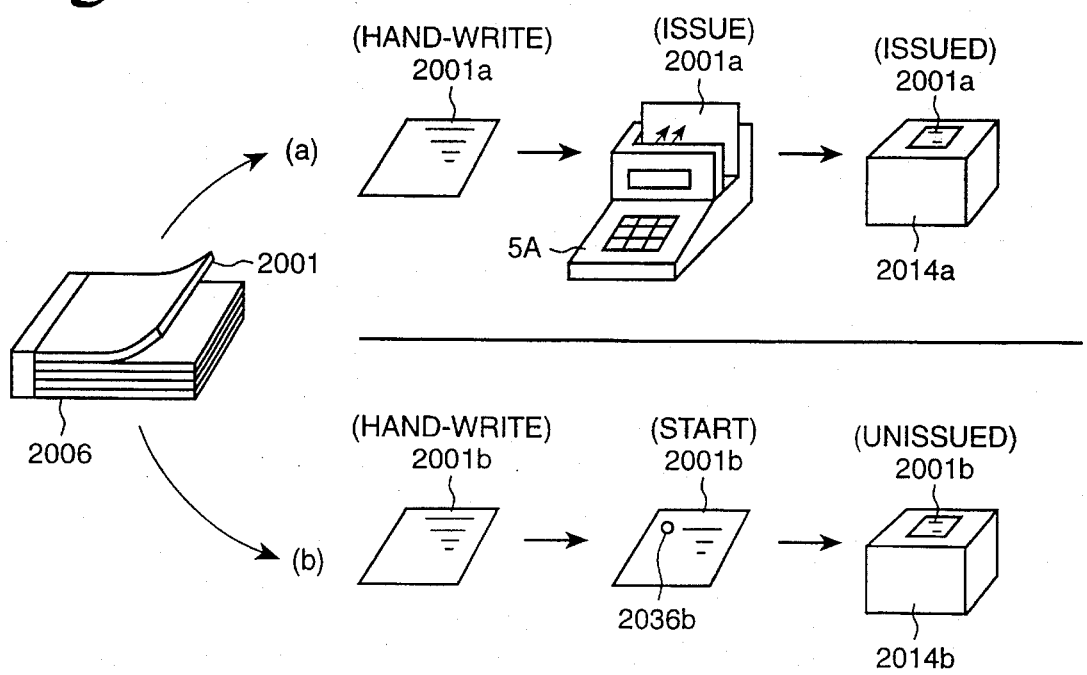
FIG. 20 is a diagram of a part of a home-delivery system in the third embodiment.

With reference to FIG. 20, a home-delivery slip 2001 separated from a bunch 2006 is processed along the course (a) or the course (b) according to whether or not a slip issuing device 5A is available. The course (a) corresponds to conditions where the slip issuing device 5A is available. The course (b) corresponds to conditions where the slip issuing device 5A is unavailable.

When a sender (requester) visits a private parcel receiving center having a slip issuing device 5A, a home-delivery slip 2001a is processed along the course (a) of FIG. 20. Specifically, the requester (sender) fills the hand-written entry blank 2002 of the home-delivery slip 2001a with necessary items such as the address and the telephone number of a recipient. Then, a person in charge of parcel delivery at the private parcel receiving center verifies the hand-written items, and operates the slip issuing device 5A and places the home-delivery slip 2001a into the slip issuing device 5A. The slip issuing device 5A starts the responding circuit 2003 on the home-delivery slip 2001a, and writes parcel delivery information into the responding circuit 2003 and prints the parcel delivery information. Thus, the memory 2031c within the responding circuit 2003 is loaded with the parcel delivery information. When the operation on the home-delivery slip 2001a has been completed, the home-delivery slip 2001a is removed from the slip issuing device 5A and is affixed to a parcel 2014a given by the requester.

When a parcel collecting vehicle which does not have a slip issuing device 5A visits a sender to receive a parcel 2014b therefrom, a home-delivery slip 2001b is processed along the course (b) of FIG. 20. Specifically, the requester (sender) fills the hand-written entry blank 2002 of the home-delivery slip 2001b with necessary items such as the address and the telephone number of a recipient. Then, a parcel collecting worker verifies the hand-written items, and removes the punch section 2036b from the sheet of the responding circuit 2003 on the home-delivery slip 2001b by using a manual punch device. The removal of the punch section 2036b starts the operation of the responding circuit 2003, and the memory 2031c within the responding circuit 2003 is cleared. Subsequently, the home-delivery slip 2001b is affixed to the parcel 2014b given by the requester. As understood from the previous description, the home-delivery slip 2001b differs from the home-delivery slip 2001a in contents of data (information) in the memory 2031c within the responding circuit 2003.

Figure 21:
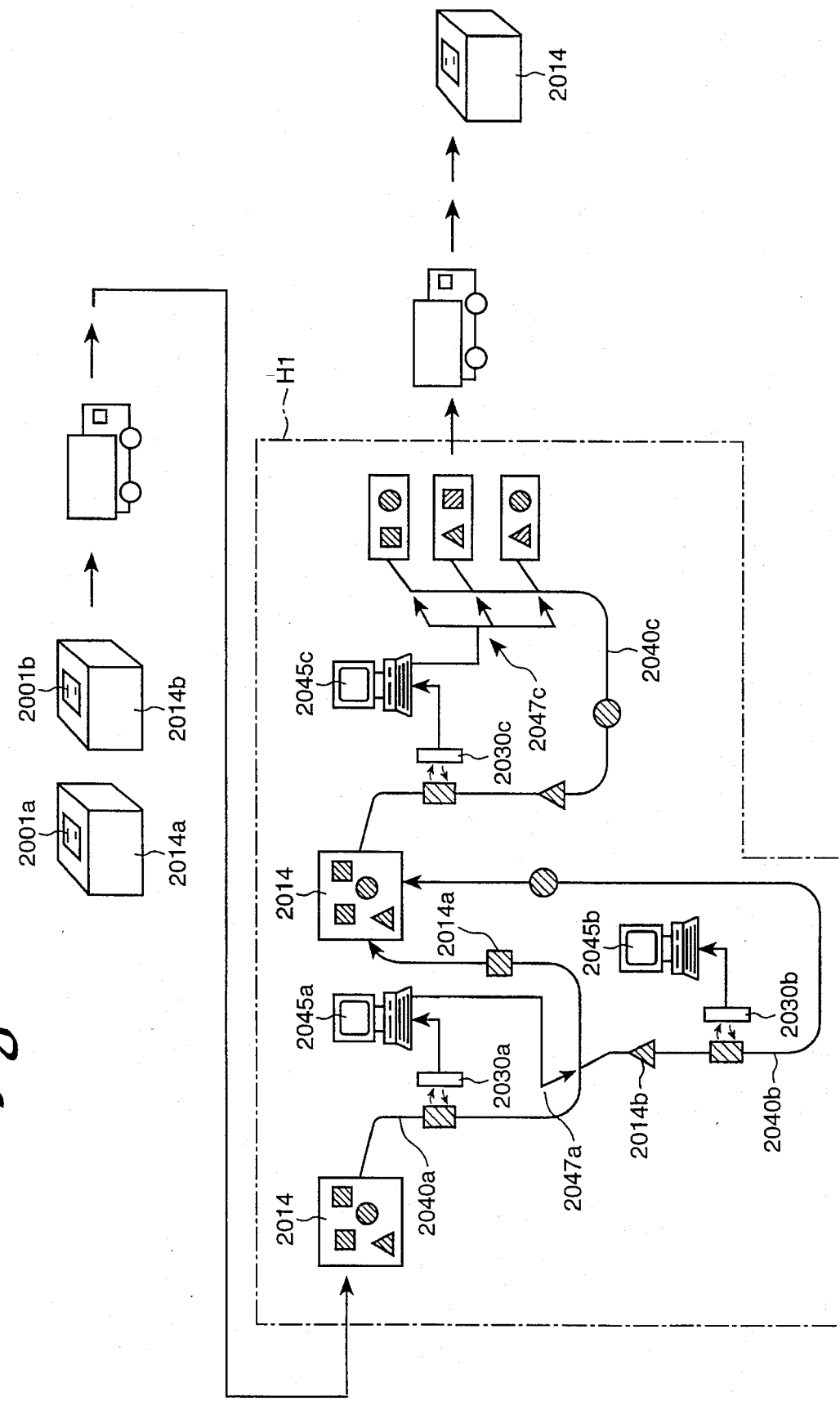
FIG. 21 is a diagram of the home-delivery system in the third embodiment.

As shown in FIG. 21, parcels 2014 with home-delivery slips 2001 are transported to a delivery center H1 where the parcels 2014 undergo automatic sorting. The parcels 2014 include parcels 2014a with home-delivery slips 2001a and parcels 2014b with home-delivery slips 2001b. In other words, home-delivery slips 2001 are of the type 2001a and the type 2001b, and parcels 2014 are of the type 2014a having the slips 2001a and the type 2014b having the slips 2001b. In the delivery center H1, the parcels 2014 are sequentially placed on a belt conveyor 2040a, and are carried thereby. An interrogator 2030a located near a portion of the belt conveyor 2040a transmits an interrogation radio wave signal which is received by the responding circuit 3 of the home-delivery slip 2001 on each parcel 2014. The interrogator 2030a is similar in circuit design to the previously-mentioned interrogator 30 or the previously-mentioned writer 54 of FIG. 5. The responding circuit 2003 of the home-delivery slip 2001 on each parcel 2014 transmits a reply radio wave signal which represents information stored therein. The reply radio wave signal is received by the interrogator 2030a, and the information is extracted from the reply radio wave signal by the interrogator 2030a. The interrogator 2030a outputs the extracted information to a computer 2045a. In this way, information is read out from the responding circuit 2003 of the home-delivery slip 2001 on each parcel 2014, and the readout information is fed to the computer 2045a.

The computer 2045a determines whether the information from the interrogator 2030a represents the cleared state (the initial state), that is, whether the related home-delivery slip 2001 is of the type 2001a or the type 2001b. When the home-delivery slip 2001 is of the type 2001b, the computer 2045a controls an automatic sorting device 2047a so that the related parcel 2014b will be moved from the belt conveyor 2040a to a belt conveyor 2040b. An interrogator 2030b located near a portion of the belt conveyor 2040b is electrically connected to a computer 2045b. The interrogator 2030b is similar in circuit design to the previously-mentioned interrogator 30 or the previously-mentioned writer 54 of FIG. 5. A delivery worker operates the computer 2045b and the interrogator 2030b, and writes parcel delivery information into the responding circuit 2003 of the home-delivery slip 2001b on the parcel 20141b by referring to the data indicated on the home-delivery slip 2001b. Then, the parcel 2014b joins parcels 2014a carried by the belt conveyor 2040a.

During a subsequent period, parcels 2014 (parcels 2014a and parcels 2014b) are sequentially placed on a belt conveyor 2040c, and are carried thereby. An interrogator 2030c located near a portion of the belt conveyor 2040c transmits an interrogation radio wave signal which is received by the responding circuit 3 of the home-delivery slip 2001 on each parcel 2014. The interrogator 2030c is similar in circuit design to the previously-mentioned interrogator 30 or the previously-mentioned writer 54 of FIG. 5. The responding circuit 2003 of the home-delivery slip 2001 on each parcel 2014 transmits a reply radio wave signal which represents information stored therein. The reply radio wave signal is received by the interrogator 2030c, and the parcel delivery information is extracted from the reply radio wave signal by the interrogator 2030c. The interrogator 2030c outputs the extracted parcel delivery information to a computer 2045c. In this way, parcel delivery information is read out from the responding circuit 2003 of the home-delivery slip 2001 on each parcel 2014, and the readout parcel delivery information is fed to the computer 2045c. The parcel delivery information includes the assortment code. The computer 2045c controls an automatic sorting device 2047c in response to the parcel delivery information, thereby sorting parcels 2014 according to areas of the destinations of delivery thereof. Then, the parcels 2014 are transported from the delivery center HI to delivery bases in the corresponding areas. The parcels 2014 are delivered from the delivery bases to the respective destinations. During certain stages of the transportation of a parcel 2014, copies of a home-delivery slip 2001 on the parcel 2014 are removed. Since each of the copies of the home-delivery slip 2001 has information represented by a bar code 2043, normally-executed slip processing is enabled by using the bar code information. The removal of the copies of the home-delivery slip 2001 may be replaced with reading out parcel information via an interrogator (similar in design to the interrogator 2030a, 2030b, or 2030c) and using the parcel information in slip processing.

As previously described, in the delivery center H1, parcels 2014b having home-delivery slips 2001b are automatically separated from parcels 2014a having home-delivery slips 2001a. Then, delivery information is written into the home-delivery slip 2001b on each parcel 2014b by the computer 2045b and the interrogator 2030b, and thus the home-delivery slip 2001 is changed into the type similar to the type of a home-delivery slip 2001a. Then, parcels 2014 including parcels 2014a and 2014b are automatically sorted according to areas of destinations of delivery thereof.

Figure 22:
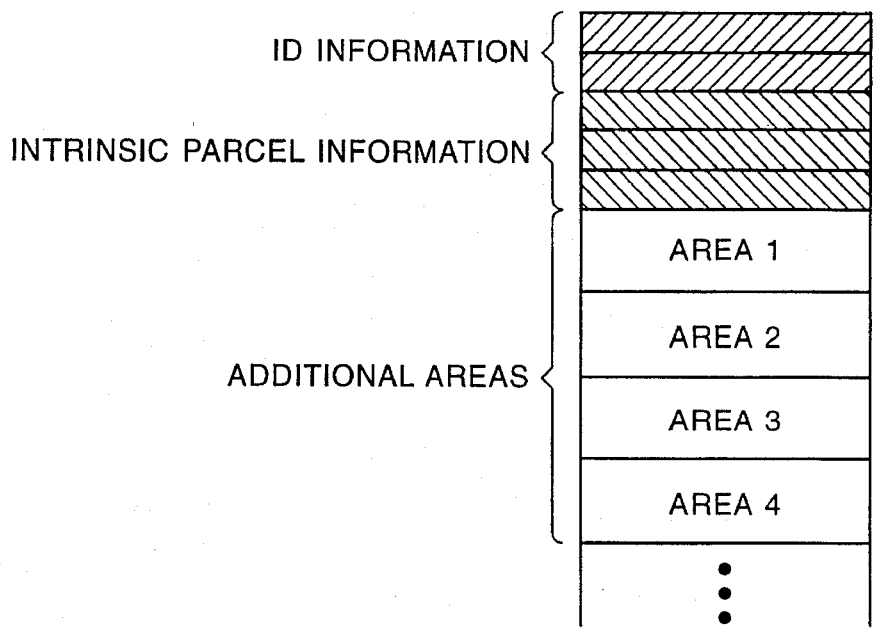
FIG. 22 is a diagram of storage areas in a memory in the third embodiment.

As shown in FIG. 22, the memory 2031c in the responding circuit 2003 is managed in a manner such that the storage area of the memory 2031c is divided into a plurality of blocks. For example, identification information and parcel intrinsic information, which are contained in parcel delivery information, are written into given storage blocks in the memory 2031c. The remaining storage blocks are managed as supplementary areas. Additional information is written into the supplementary areas of the memory 2031c. According to this management of the memory 2031c, it is possible to prevent identification information and parcel intrinsic information from being erased from the memory 2031c. The control program for the CPU 2031d in the responding circuit 2003 may be designed to prevent additional information from being erased from the memory 2031c. This design allows a check on the additional information at a later stage. The identification information, the parcel intrinsic information, and the additional information are sequentially written into the storage areas of the memory 2031c respectively. Thus, the storage areas of the memory 2031c are sequentially used or accessed according to the order of addresses thereof. Accordingly, it is unnecessary to provide a special storage area for storing information which manages conditions of use of the supplementary areas.

DESCRIPTION OF THE FOURTH PREFERRED EMBODIMENT

Figure 23:
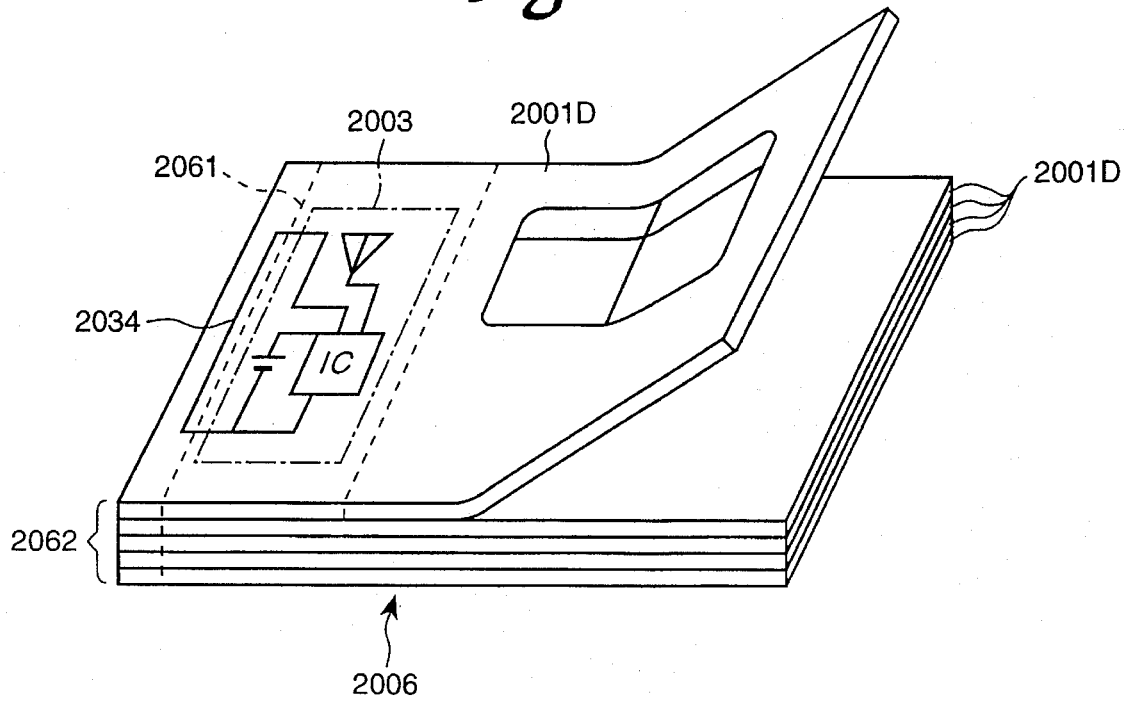
FIG. 23 is a diagram of a bunch of home-delivery slips in a fourth embodiment of this invention.

With reference to FIG. 23, a bunch 2006 of virgin home-delivery slips 2001D has a base 2062 at which ends of the slips 2001D are bonded together. The home-delivery slips 2001D are similar to the home-delivery slip 2001 of FIG. 16 except for design changes indicated hereinafter.

Each home-delivery slip 2001D has a perforated line 2061 extending at the base 2062 of the bunch 2006. An operation starting line 2034 on each home-delivery slip 2001D intersects with the perforated line 2061 at two points. When a home-delivery slip 2001D is separated from the bunch 2006, the operation starting line 2034 on the separated slip 2001D is broken so that the related responding circuit 2003 is automatically started. The punch section 2036 (see FIG. 17) is omitted from each home-delivery slip 2001D.

DESCRIPTION OF THE FIFTH PREFERRED EMBODIMENT

A fifth embodiment of this invention is similar to the embodiment of FIGS. 16–21 except for design changes indicated hereinafter.

Figure 24:
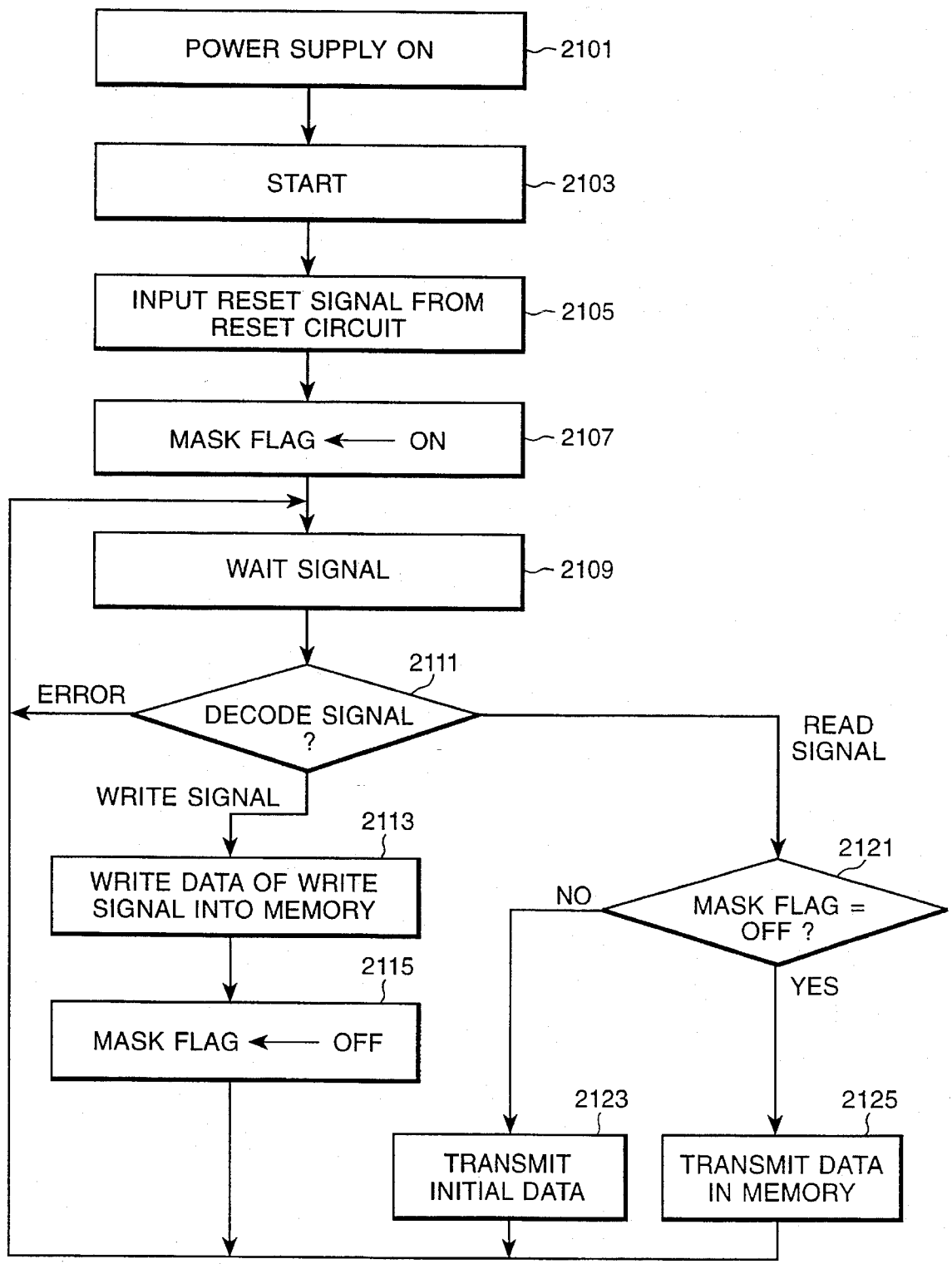
FIG. 24 is a flowchart of operation of a responding circuit in a fifth embodiment of this invention.

FIG. 24 is a flowchart of operation of a responding circuit 2003 (see FIG. 17), a part of which is executed according to a program for controlling a CPU 2031d (see FIG. 17). With reference to FIG. 24, the responding circuit 2003 operates as follows.

When a punch section 2036 (see FIG. 17) is removed, a high level potential is applied to an inverter INV (see FIG. 17) so that a transistor Tr (see FIG. 17) is made conductive. This process corresponds to a first step 2101 of FIG. 24. Then, the responding circuit 2003 starts to execute its main operation at a step 2103. In addition, a reset circuit 2031i (see FIG. 17) outputs a reset signal to the CPU 2031d. After the reset signal is inputted into the CPU 2031d at a step 2105, the CPU 2031d executes an initializing process and sets a mask flag to an ON state. Then, the CPU 2031d waits an incoming signal. This process corresponds to a step 2109.

When a slip issuing device is required to write parcel delivery information into the responding circuit 2003, the slip issuing device transmits an interrogation radio wave signal S1 which represents a write command and parcel delivery information. The interrogation radio wave signal S1 is caught by an antenna 2032 (see FIG. 17), and is then fed to a detector 2031a (see FIG. 17). A level comparator 2031b starts the supply of electric power to the CPU 2031d and a clock signal generator 2031e (see FIG. 17) in response to the output signal of the detector 2031a which is caused by the reception of the interrogation radio wave signal S1. The detector 2031a extracts information from the received interrogation radio wave signal S1, and outputs the extracted information to the CPU 2031d. At a step 2111 of FIG. 24, the CPU 2031d analyzes the input information (the information from the detector 2031a) and determines whether or not the input information has an error. When the input information has an error, the operation of the responding circuit 2003 returns to the step 2109. In addition, the step 2111 determines whether the input information contains a write command signal or a read command information. When the input information contains a write command signal, the operation of the responding circuit 2003 advances from the step 2111 to a step 2113. When the input information contains a read command signal, the operation of the responding circuit 2003 advances from the step 2111 to a step 2121.

At the step 2113, the CPU 2031d separates parcel delivery information from the input information and writes the parcel delivery information into a memory 2031c (see FIG. 17). It should be noted that the memory 2031c falls into an operable state immediately before the start of the information writing process. Then, at a step 2115, the mask flag is set to an OFF state. After the step 2115, the operation of the responding circuit 2003 returns to the step 2109.

At the step 2121, the CPU 2031d determines whether the mask flag is in the ON state or the OFF state. When the mask flag is in the ON state, the CPU 2031d feeds given initial data to a modulator 2031f (see FIG. 17) as a modulating signal at a step 2123. The modulator 2031f modulates the currently-received interrogation radio wave signal S1 with the modulating signal, thereby converting the interrogation radio wave signal S1 into a reply radio wave signal S2 carrying the given initial data. The reply radio wave signal S2 is fed to the antenna 2032, and is radiated from the antenna 2032. After the step 2123, the operation of the responding circuit 2003 returns to the step 2109. On the other hand, when the step 2121 detects that the mask flag is in the OFF state, the CPU 2031d reads out information data from the memory 2031c and outputs the readout information data to the modulator 2031f as a modulating signal at a step 2125. The modulator 2031f modulates the currently-received interrogation radio wave signal S1 with the modulating signal, thereby converting the interrogation radio wave signal S1 into a reply radio wave signal S2 carrying the readout information. The reply radio wave signal S2 is fed to the antenna 2032, and is radiated from the antenna 2032. After the step 2125, the operation of the responding circuit 2003 returns to the step 2109.

This embodiment dispenses with clearing the memory 2031c immediately after the resetting process. This is advantageous in shortening a processing time and reducing am electric power consumption rate related to the writing of information into the memory 2031c.

DESCRIPTION OF THE SIXTH PREFERRED EMBODIMENT

Figure 25:
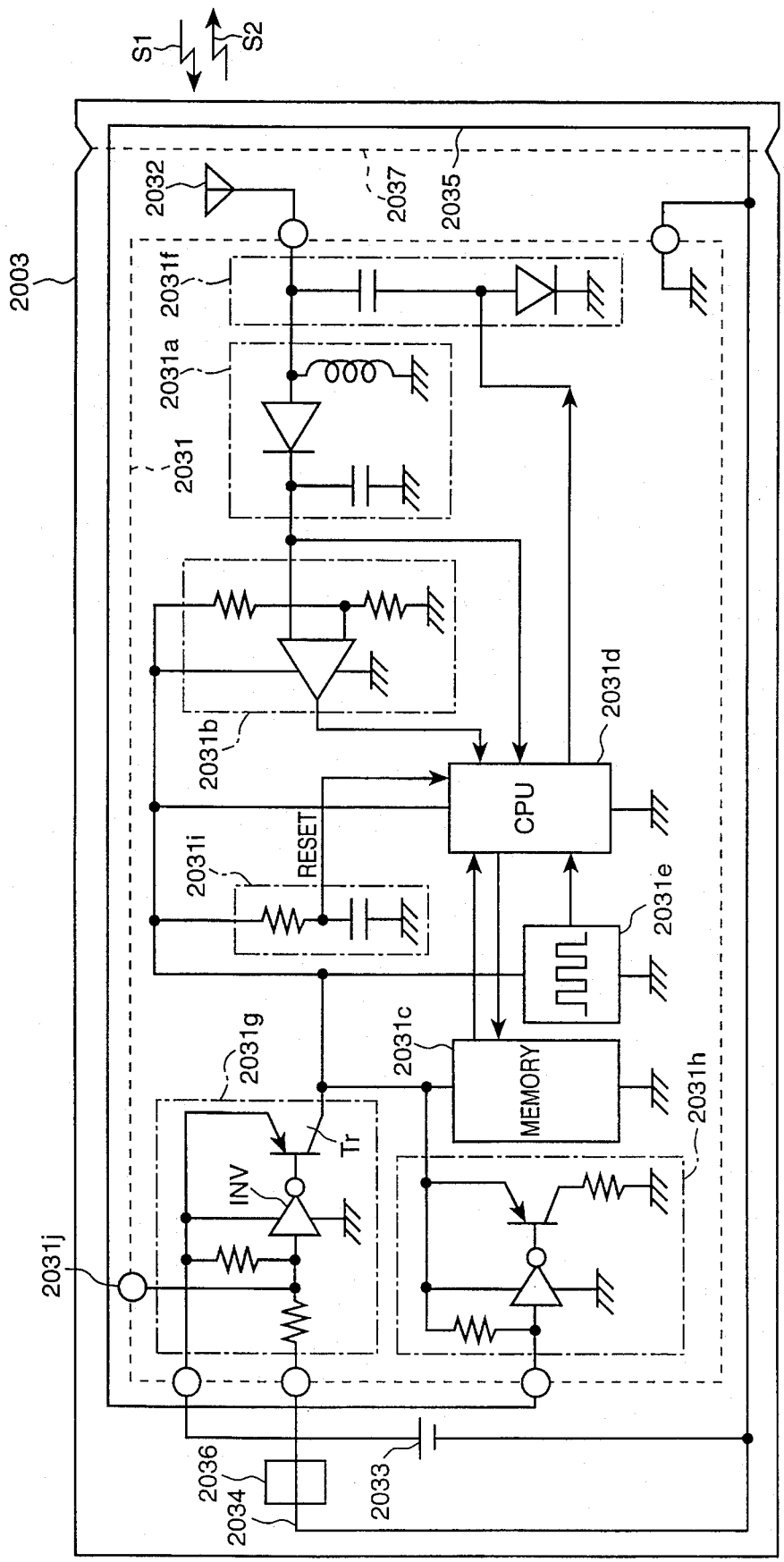
FIG. 25 is a diagram of a responding circuit in a sixth embodiment of this invention.

FIG. 25 shows a responding circuit 2003A which is similar to the responding circuit 2003 of FIG. 17 except for design changes indicated hereinafter.

The responding circuit 2003A of FIG. 25 includes a test terminal 2031j' for controlling a starting circuit 2031g. When a high level voltage is applied to the test terminal 2031j', the starting circuit 2031g is activated so that a CPU 2031d receives electric power from a battery 2033. Thus, the CPU 2031d executes an initializing process, and the responding circuit 2003A falls into a state capable of communication. In this way, the responding circuit 2003A can be started by using the test terminal 2031j' independent of the state of an operation starting line 2034. In the case where a check on the operation of a responding circuit 2003A is required after the manufacture thereof, such starting of the responding circuit 2003A is executed. When the test terminal 2031j' is grounded, the responding circuit 2003A returns to an inactive state. The above-indicated starting of the responding circuit 2003A can be used for checking the battery 2033.

DESCRIPTION OF THE SEVENTH PREFERRED EMBODIMENT

Figure 26:
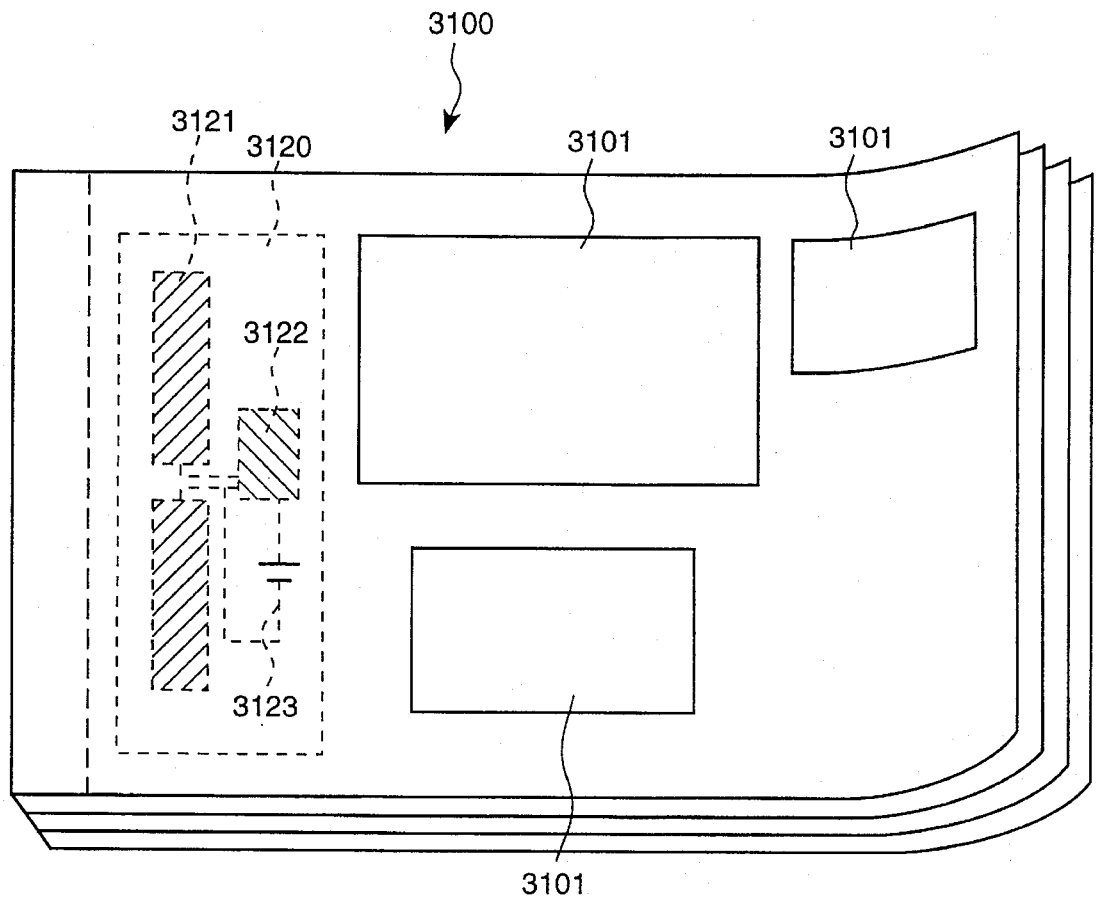
FIG. 26 is a diagram of a home-delivery slip in a seventh embodiment of this invention.

With reference to FIG. 26, a composite home-delivery slip 3100 being an information storage medium (an electronic tag) includes a plurality of slip pieces of various types. The home-delivery slip 3100 has both a delivery slip function and an electronic tag function. The home-delivery slip 3100 is mainly divided into an entry blanks 3101 and a responding circuit 3120.

Information is to be hand-written into the entry blanks 3101. Specifically, delivery information such as the names and addresses of a destination and a sender (the person requesting parcel delivery) is to be hand-written into the entry blanks 3101 by the sender. Also, information of a freight or fee and information of an assortment code (a sorting code) for identifying a destination region are to be hand-written into the entry blank 3101 by the parcel handling agent.

The responding circuit 3120 includes an antenna 3121, an integrated circuit (IC) 3122, and a battery (power supply) 3123. The antenna 3121 is used in radiating and catching radio waves carrying data. The IC 3122 serves to control various circuits and store parcel information (parcel delivery information). The battery 3123 supplies electric power to the IC 3122. Generally, a slip issuing device which can communicate with the responding circuit 3120 by radio is used in writing parcel delivery information into the IC 3122 of the responding circuit 3120. The parcel delivery information contains fixed data and variable data. The fixed data represents a slip number, that is, a character set, corresponding to a parcel identification (ID) code. The variable data represents an assortment code, a telephone number, and others. Generally, at a private parcel receiving center, the parcel delivery information is written into the responding circuit 3120 by using the slip issuing device.

Figure 27:
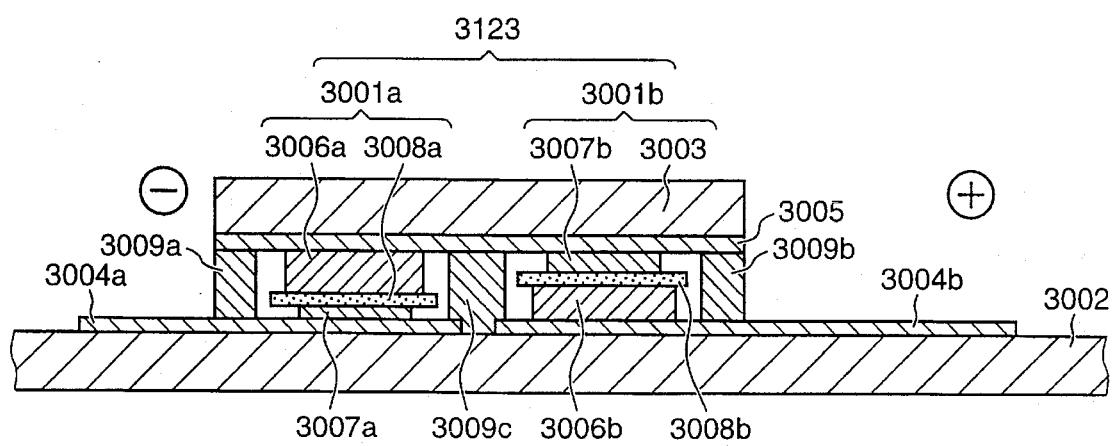
FIG. 27 is a sectional view of a battery in the seventh embodiment.

As shown in FIG. 27, the battery 3123 is a paper-type manganese-zinc battery directly fabricated on a PET (polyethylene terephtalate) base board or substrate 3002. The battery 3123 is of the set type including a plurality of single cells 3001a and 3001b which are electrically connected to each other in series and which are spaced from each other in a horizontal direction. The single cell 3001a includes a zinc plate 3007a, a manganese dioxide paste 3006a, and a separator 3008a. Similarly, the single cell 3001b includes a zinc plate 3007b, a manganese dioxide paste 3006b, and a separator 3008b. Since the electromotive force of each of the single cells 3001a and 3001b is 1.5 volts, the battery 3123 generates a voltage of 3.0 volts.

The parts of the battery 3123 are arranged as follows. Carbon pattern electrodes 3004a and 3004b are formed immediately above the PET board 3002. A PET sheet 3003 is placed on the top. A carbon electrode 3005 is formed immediately below the PET sheet 3003. The zinc plate 3007a is formed immediately above the carbon pattern electrode 3004a. The zinc plate 3007b is formed immediately below the carbon electrode 3005. The manganese dioxide paste 3006a is formed directly below the carbon electrode 3005. The manganese dioxide electrode 3006b is formed directly above the carbon pattern electrode 3004b. Each of the separators 3008a and 3008b is made of craft paper with paste. The separator 3008a is formed between the zinc plate 3007a and the manganese dioxide paste 3006a. The separator 3008b is formed between the zinc plate 3007b and the manganese dioxide paste 3006b. Adhesive agents 3009a, 3009b, and 3009c are used to bind and seal the above parts.

The manganese dioxide pastes 3006a and 3006b are each a well kneaded mixture of positive pole agent and electrolyte with a ratio of the former to the latter of 61 to 39. The positive pole agent is a mixture of electrolytic manganese dioxide, acetylene black, and zinc oxide with a ratio of 85 to 14 to 1. The electrolyte is, on the other hand, a mixture of zinc chloride, zinc ammonium, and water with a ratio of 26 to 3 to 71. The electrolyte is infiltrated into the entire single cells 3001a and 3001b. The paste applied to the craft paper is a mixture of electrolyte and starch.

The battery 3123 has art electrical route which starts with the carbon pattern electrode 3004a serving as the negative pole and ends with the carbon pattern electrode 3004b serving as the positive pole. Between the negative pole and the positive pole, the electrical path extends through the zinc plate 3007a, the separator 3008a, the manganese dioxide paste 3006a, the carbon electrode 3005, the zinc plate 3007b, the separator 3008b, and the manganese dioxide paste 3006b.

Figure 28:
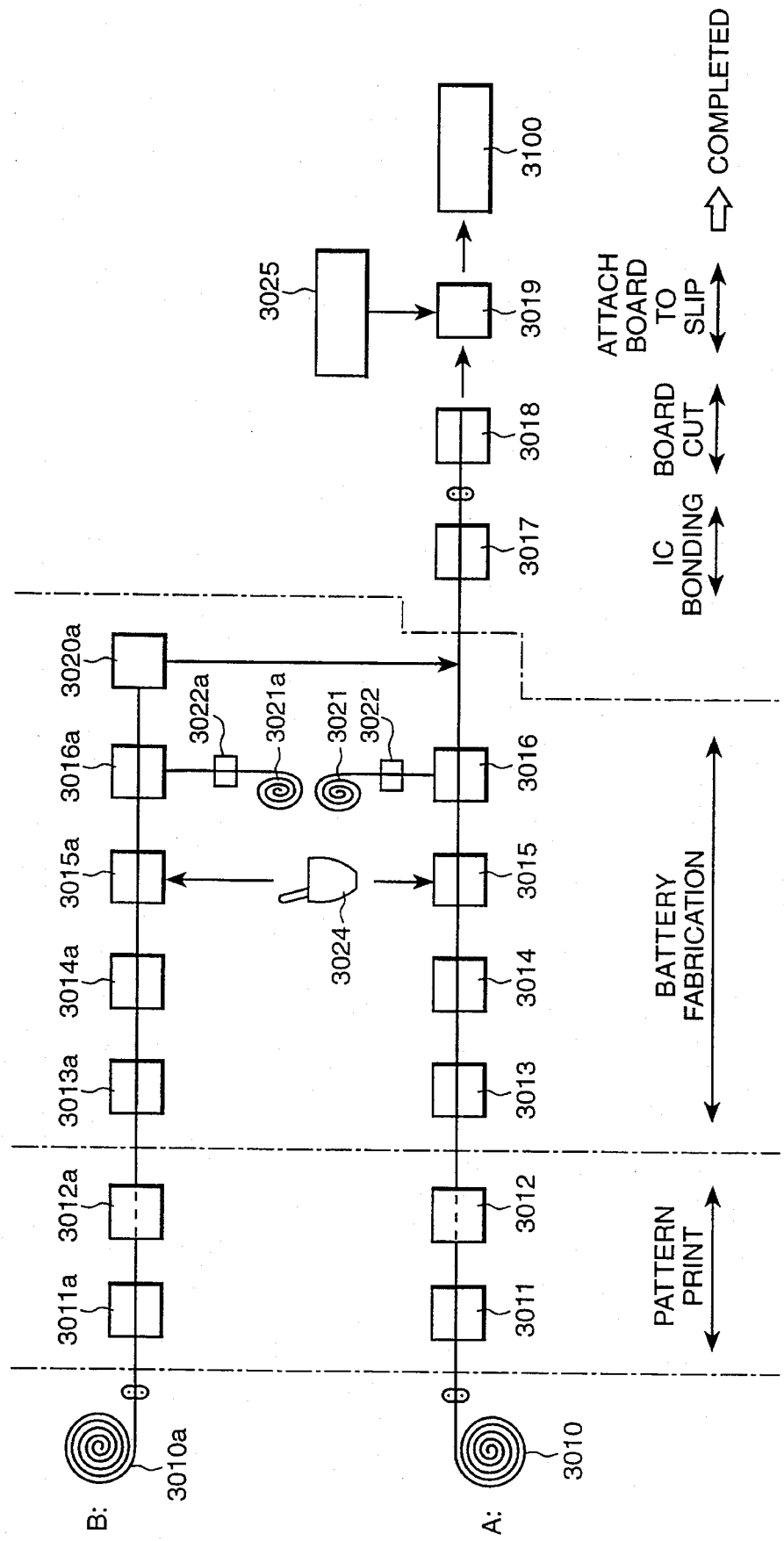
FIG. 28 is a flow diagram of steps of manufacturing the home-delivery slip in the seventh embodiment.
Figure 29:
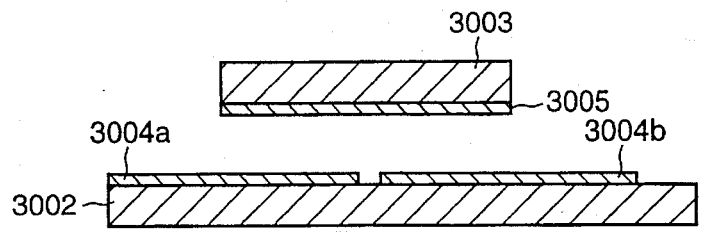
FIGS. 29–33 are sectional views of different states of the battery which occur during the manufacture thereof in the seventh embodiment.
Figure 34:
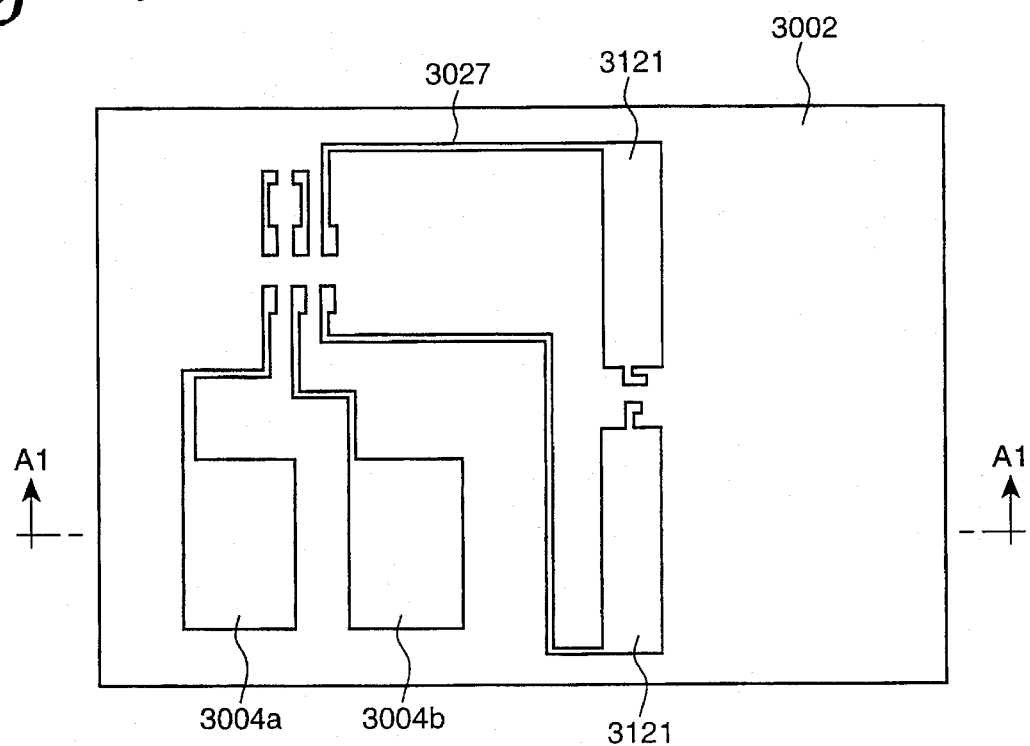
FIG. 34 is a plan view of a printed pattern on a PET board in the seventh embodiment.

With reference to FIG. 28, the home-delivery slip 3100 was manufactured as follows. On the line "A" in FIG. 28, a rolled PET film 3010 for forming PET boards 3002 was sent to a carbon pattern printer 3011, and board patterns (circuit patterns) were periodically printed on the PET film 3010 thereby. Each printed circuit pattern was made of carbon. As shown in FIG. 34, each printed circuit pattern included carbon pattern electrodes 3004a and 3004b, an antenna 3121, and conductive carbon wires 3027. FIG. 29 shows a cross section of the battery 3123 in a state which occurs at this carbon pattern printing process. In this way, the antenna 3121 and the conductive wires 3027 were made of carbon which could be disposed by burning. Once the antenna 3121 and the conductive carbon wires 3027 are burned, they become noninflammable garbage or a non-destructive thing that does not damage the environment. Thus, environmental problems can be prevented.

Figure 30:
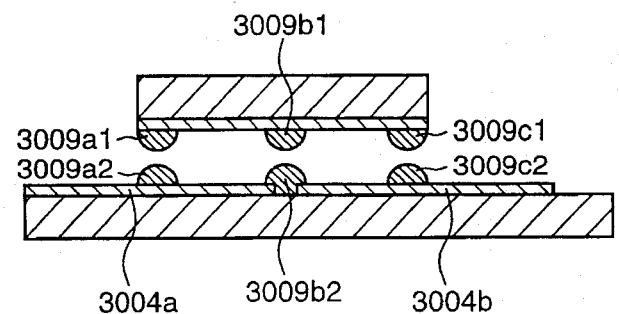
Figure 31:
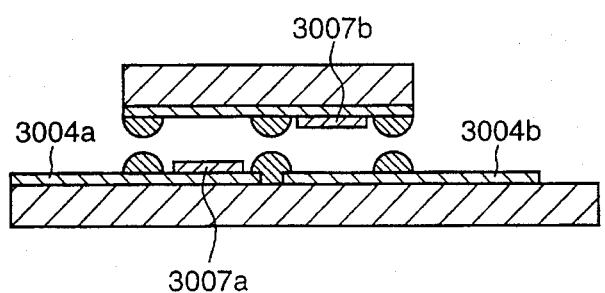

The PET film 3010 with the printed circuit pattern was dried by using a drier 3012. Specifically, the PET film 3010 remained heated at 150° C. for 10 minutes so that it was dried and hardened. Adhesive agents 3009a2, 3009b2, and 3009c2 were applied to predetermined areas on the carbon pattern electrodes 3004a and 3004b by using an adhesive agent coater 3013. FIG. 30 shows a cross section of the battery 3123 in a state which occurs at this adhesive agent applying process. Subsequently, a zinc plate superimposer 3014 attached a zinc plate 3007a onto the carbon pattern electrode 3004a by conductive adhesive agent. FIG. 31 shows a cross section of the battery 3123 in a state which occurs at this zinc plate superimposing process.

Figure 32:
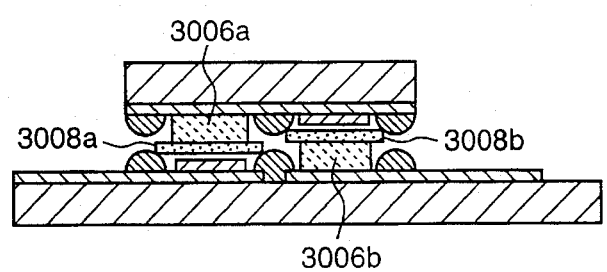

Paste was adjusted and prepared by using a manganese dioxide paste maker 3024. By using a manganese dioxide paste printer 3015, the prepared paste was printed to form a manganese dioxide paste 3006b onto the carbon pattern electrode 3004b. A separator 3008b was sent out from a rolled craft paper 3021, and paste was applied thereto by a paste application device 3022. The separator 3008b was then mounted on the manganese dioxide paste 3006b by using a craft paper superimposer 3016. FIG. 32 shows a cross section of the battery 3123 in a state which occurs at this separator superimposing process.

On the line "B" in FIG. 28 which extends parallel to the line "A", a rolled PET film 3010a for forming PET sheets 3003 was sent to a carbon pattern printer 3011a, and carbon electrodes 3005 were periodically printed on the PET film 3010a thereby as shown in FIG. 29. The PET film 3010a with the carbon electrode 3005 was dried by using a drier 3012a. Then, adhesive agents 3009a1, 3009b1, and 3009c1 were applied to predetermined areas on the carbon electrode 3005 by using an adhesive agent coater 3013a. FIG. 30 shows a cross section of the battery 3123 in a state which occurs at this adhesive agent applying process. Subsequently, a zinc plate superimposer 3014a attached a zinc plate 3007b onto the carbon electrode 3005 by conductive adhesive agent. FIG. 31 shows a cross section of the battery 3123 in a state which occurs at this zinc plate superimposing process.

Paste was adjusted and prepared by using the manganese dioxide paste maker 3024. By using a manganese dioxide paste printer 3015a, the prepared paste was printed to form a manganese dioxide paste 3006a onto the carbon electrode 3005. A separator 3008a was sent out from a rolled craft paper 3021a, and paste was applied thereto by a paste application device 3022a. The separator 3008a was then mounted on the manganese dioxide paste 3006a by using a craft paper superimposer 3016a. FIG. 32 shows a cross section of the battery 3123 in a state which occurs at this separator superimposing process. Subsequently, a PET sheet cutter 3020a trimmed the PET film 3010a into a PET sheet 3003 of a proper size which was provided with the carbon electrode 3005, the manganese dioxide paste 3006a, the separator 3008a, and the zinc plate 3007a.

Figure 33:
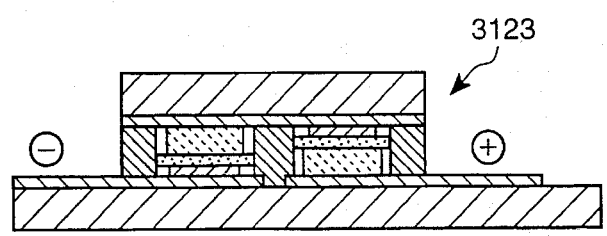

The PET sheet 3003 fabricated along the line "B" was superimposed on the PET film 3010 at the middle of the line "A" to form a permanent joint therebetween. In this process, the battery 3123 was completed. FIG. 33 shows a cross section of the battery 3123 in a state which occurs at this superimposing process. As described above, the adhesive agent coaters 3013 and 3013a were used for applying adhesive agent. It should be noted that the adhesive agent applying processes may also be carried out after the formation of the manganese dioxide pastes 3006a and 3006b. In addition, the separators 3008a and 3008b may also be superimposed on the zinc plates 3007a and 3007b respectively instead of the manganese dioxide pastes 3006a and 3006b.

Subsequently, a component mounter 3017 connected an IC 3122, chip resistors, chip capacitors, and others to the printed circuit pattern by using conductive adhesive agent. The component mounter 3017 included a component mounting section and a drying section. Then, a PET film cutter 3018 trimmed the PET film 3010 into a PET board 3002. In this process, a responding circuit 3120 of a home-delivery slip 3100 was completed. Finally, the responding circuit 3120 was affixed to a back side of a previously-printed slip 3025 by a board sticker 3019 to produce a complete home-delivery slip 3100.

The responding circuit 3120 on the home-delivery slip 3100 is similar in design to the responding circuit of FIGS. 11 and 12. The home-delivery slip 3100 is used and operated in a home delivery system as in the embodiment of FIGS. 1–7.

It is preferable to maintain a proper humidity of an atmosphere in which the battery 3123 is fabricated. Thus, the fabrication of the battery 3123 does not need a dry room or a dry box which would raise the manufacturing cost. Generally, the battery 3123 of the manganese zinc type is advantageous in preventing pollution problems. In addition, as previously described, the antenna 3121 and the conductive wires 3027 made of carbon are advantageous in preventing environmental problems.

The battery 3123 is directly fabricated on the board 3002 of the responding circuit 3120. Therefore, the home-delivery slip 3100 can be thin. For example, the thickness of the home-delivery slip 3100 is 0.5 mm. The home-delivery slip 3100 is flexible. Thus, the home-delivery slip 3100 can be affixed to any location of a parcel to be delivered.

DESCRIPTION OF THE EIGHTH PREFERRED EMBODIMENT

Figure 35:
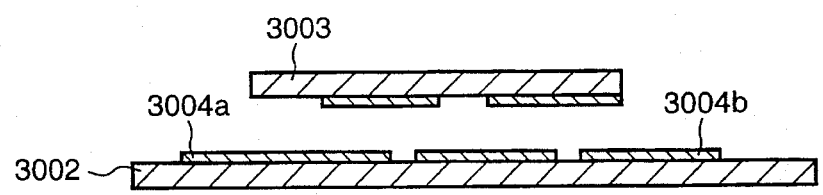
FIGS. 35–39 are sectional views of different states of a battery which occur during the manufacture thereof in an eighth embodiment of this invention.
Figure 36:
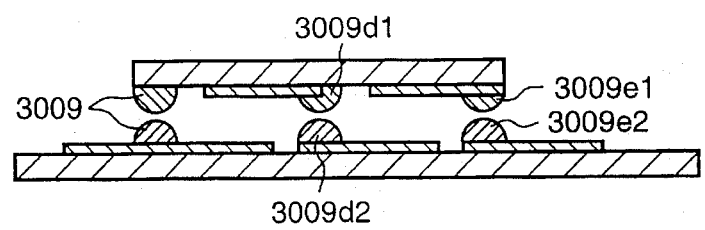
Figure 38:
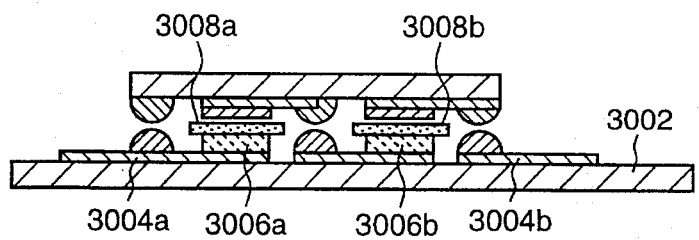
Figure 39:
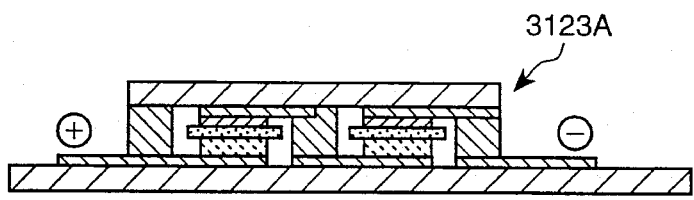

An eighth embodiment of this invention is similar to the embodiment of FIGS. 26–34 except for design changes described hereinafter. In the eighth embodiment, as shown in FIG. 39, a battery 3123A includes a plurality of single cells 3001a and 3001b having polarities, the directions of which are equal to each other. A technique of manufacturing a home-delivery slip 3100 in the eighth embodiment is shown in FIGS. 35–39. Since manufacturing processes shown in FIGS. 35 and 36 are similar to those in the embodiment of FIGS. 26–34, their description will be omitted. It should be noted that adhesive agents 3009d1, 3009d2, 3009e1, and 3009c2 in FIG. 36 are of the conductive type.

Figure 37:
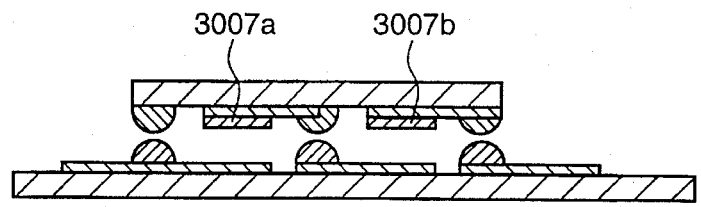

After the process shown in FIG. 36 was completed, zinc plates 3007a and 3007b were provided on a PET film for a PET sheet 3003 as shown in FIG. 37. The zinc plate providing process was executed on a line "B". subsequently, on a line "A", manganese dioxide pastes 3006a and 3006b and separators 3008a and 3008b were provided on a PET film for a PET board 3002 as shown in FIG. 38. The PET sheet 3003 fabricated along the line "B" was superimposed on the PET film for the PET board 3002 at the middle of the line "A" to form a permanent joint therebetween. In this process, the battery 3123A was completed as shown in FIG. 39.

DESCRIPTION OF THE NINTH PREFERRED EMBODIMENT

Figure 40:
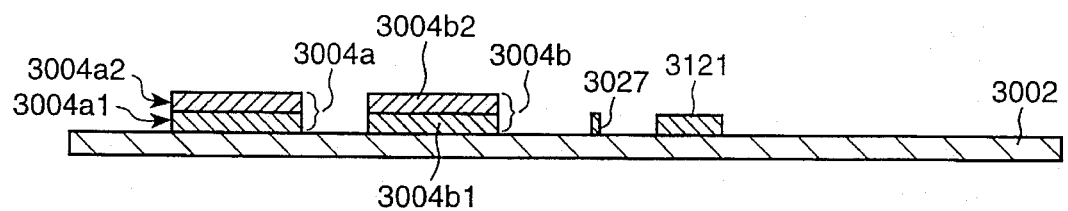
FIG. 40 is a sectional view of a printed pattern on a PET board in a ninth embodiment of this invention which is taken along a line corresponding to the line A1—A1 of FIG. 34.

A ninth embodiment of this invention is similar to the embodiment of FIGS. 26–34 except for design changes described hereinafter. In the ninth embodiment, similarly to the printed circuit pattern of FIG. 34, each printed circuit pattern on a PET film for a PET board 3002 includes carbon pattern electrodes 3004a and 3004b, an antenna 3121, and conductive carbon wires 3027. As shown in FIG. 40, the carbon pattern electrodes 3004a and 3004b include first layers 3004a1 and 3004b1, and second layers 3004a2 and 3004b2 superimposed on the first layers 3004a1 and 3004b1 respectively. The first layers 3004a1 and 3004b1 are made of polyester based conductive carbon. The second layers 3004a2 and 3004b2 are made of vinyl chloride/vinyl acetate copolymer based conductive carbon.

When the second layers 3004a2 and 3004b2 are dried and hardened, they form good protective layers on the first layers 3004a1 and 3004b1. The second layers 3004a2 and 3004b2 thus prevent electrolyte from reaching the first layers 3004a1 and 3004b1 so that the resistances of the first layers 3004a1 and 3004b1 hardly change according to ageing thereof. Therefore, a home-delivery slip in the ninth embodiment can be stored for a long term.

Figure 41:
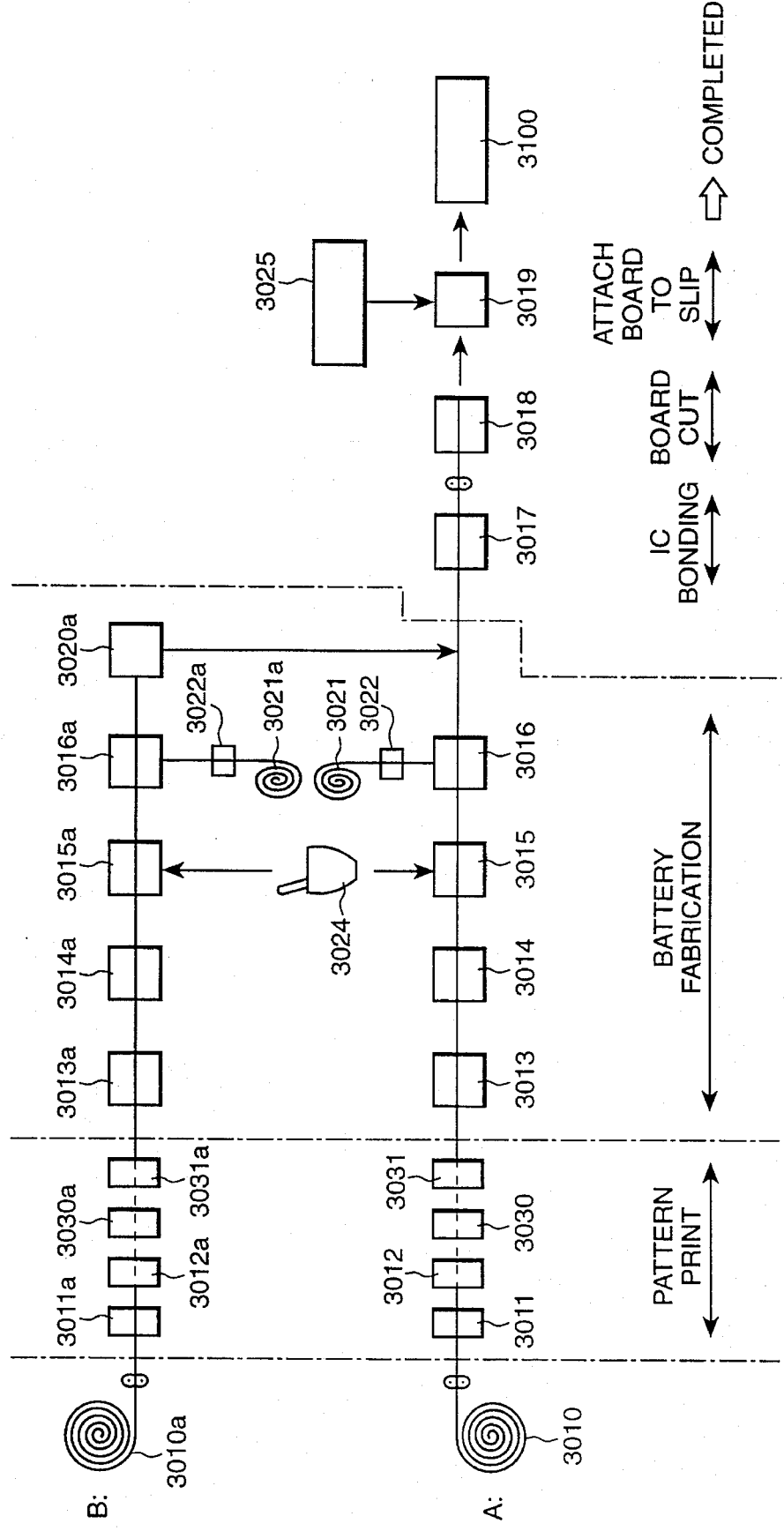
FIG. 41 is a flow diagram of steps of manufacturing a home-delivery slip in the ninth embodiment.

With reference to FIG. 41, the home-delivery slip in the ninth embodiment was manufactured as follows. On the line "A" in FIG. 41, a rolled PET film 3010 for forming PET boards 3002 was sent to a carbon pattern printer 3011, and predetermined circuit patterns were periodically printed on the PET film 3010 thereby. Each predetermined circuit pattern included first carbon layers 3004a1 and 3004b1, conductive carbon wires 3027, and an antenna 3121 Each printed circuit pattern was made of polyester based conductive carbon. The PET film 3010 with the printed circuit pattern was dried by using a drier 3012. Specifically, the PET film 3010 remained heated at 150° C. for 10 minutes so that it was dried and hardened. Subsequently, second carbon layers 3004a2 and 3004b2 were printed on the first carbon layers 3004a1 and 3004b1 by a carbon pattern printer 3030. The second carbon layers 3004a2 and 3004b2 were made of vinyl chloride/vinyl acetate copolymer based conductive carbon. The PET film 3010 with the second carbon layers 3004a2 and 3004b2 was dried by using a drier 3031. Specifically, the PET film 3010 remained heated at 80° C. for 10 minutes so that the second carbon layers 3004a2 and 3004b2 were dried and hardened. Later manufacturing processes in the line "A" were similar to those in the embodiment of FIGS. 26–34.

On the line "B" in FIG. 41, a rolled PET film 3010a for forming PET sheets 3003 was sent to a carbon pattern printer 3011a, and first layers of carbon electrodes 3005 were periodically printed on the PET film 3010a thereby. The first layers of the carbon electrodes 3005 were made of polyester based conductive carbon. The PET film 3010a with the first layer of the carbon electrode 3005 was dried by using a drier 3012a. Specifically, the PET film 3010a remained heated at 150° C. for 10 minutes so that it was dried and hardened. Subsequently, a second layer of the carbon electrode 3005 was printed on the first layer thereof by a carbon pattern printer 3030a. The second layer of the carbon electrode 3005 was made of vinyl chloride/vinyl acetate copolymer based conductive carbon. The PET film 3010a with the second layer of the carbon electrode 3005 was dried by using a drier 3031a. Specifically, the PET film 3010a remained heated at 80° C. for 10 minutes so that the second layer of the carbon electrode 3005 was dried and hardened. Later manufacturing processes in the line "B" were similar to those in the embodiment of FIGS. 26–34.

DESCRIPTION OF THE TENTH PREFERRED EMBODIMENT

A tenth embodiment of this invention is similar to the embodiment of FIGS. 26–34 except for design changes described hereinafter. In the tenth embodiment, an antenna and wiring lines within an electronic circuit use silver paste while electrodes of a battery use conductive carbon paste.

Figure 42:
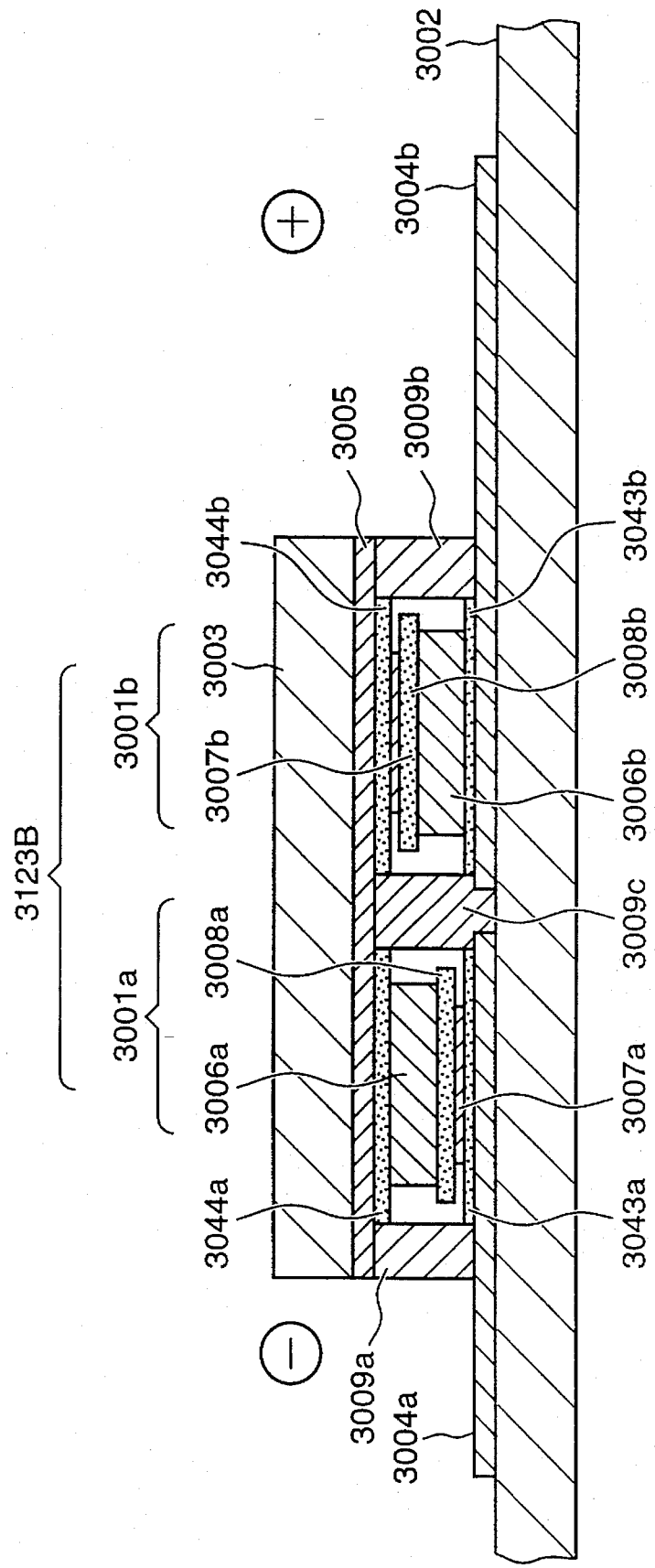
FIG. 42 is a sectional view of a battery in a tenth embodiment of this invention.

The tenth embodiment includes a battery 3123B which is designed as shown in FIG. 42. Specifically, in the battery 3123B of FIG. 42, given regions of carbon pattern electrodes 3004a and 3004b and a carbon electrode 3005 are coated with anisotropic conductive layers 3043a, 3043b, 3044a, and 3044b. The carbon pattern electrodes 3004a and 3004b, the carbon electrode 3005, the anisotropic conductive layers 3043a, 3043b, 3044a, and 3044b, and zinc plates 3007a and 3007b were bonded together by heating and pressing processes using polyester resin.

The anisotropic conductive layers 3043a, 3043b, 3044a, and 3044b prevent electrolyte from reaching the carbon pattern electrodes 3004a and 3004b and the carbon electrode 3005 so that the resistances of the carbon pattern electrodes 3004a and 3004b and the carbon electrode 3005 hardly change according to ageing thereof. Therefore, a home-delivery slip in the tenth embodiment can be stored for a long term. The polyester resin for bonding the carbon pattern electrodes 3004a and 3004b, the carbon electrode 3005, the anisotropic conductive layers 3043a, 3043b, 3044a, and 3044b, and the zinc plates 3007a and 3007b allows a bent of the battery 3123B without impairing the characteristics of contact thereamong.

Figure 43:
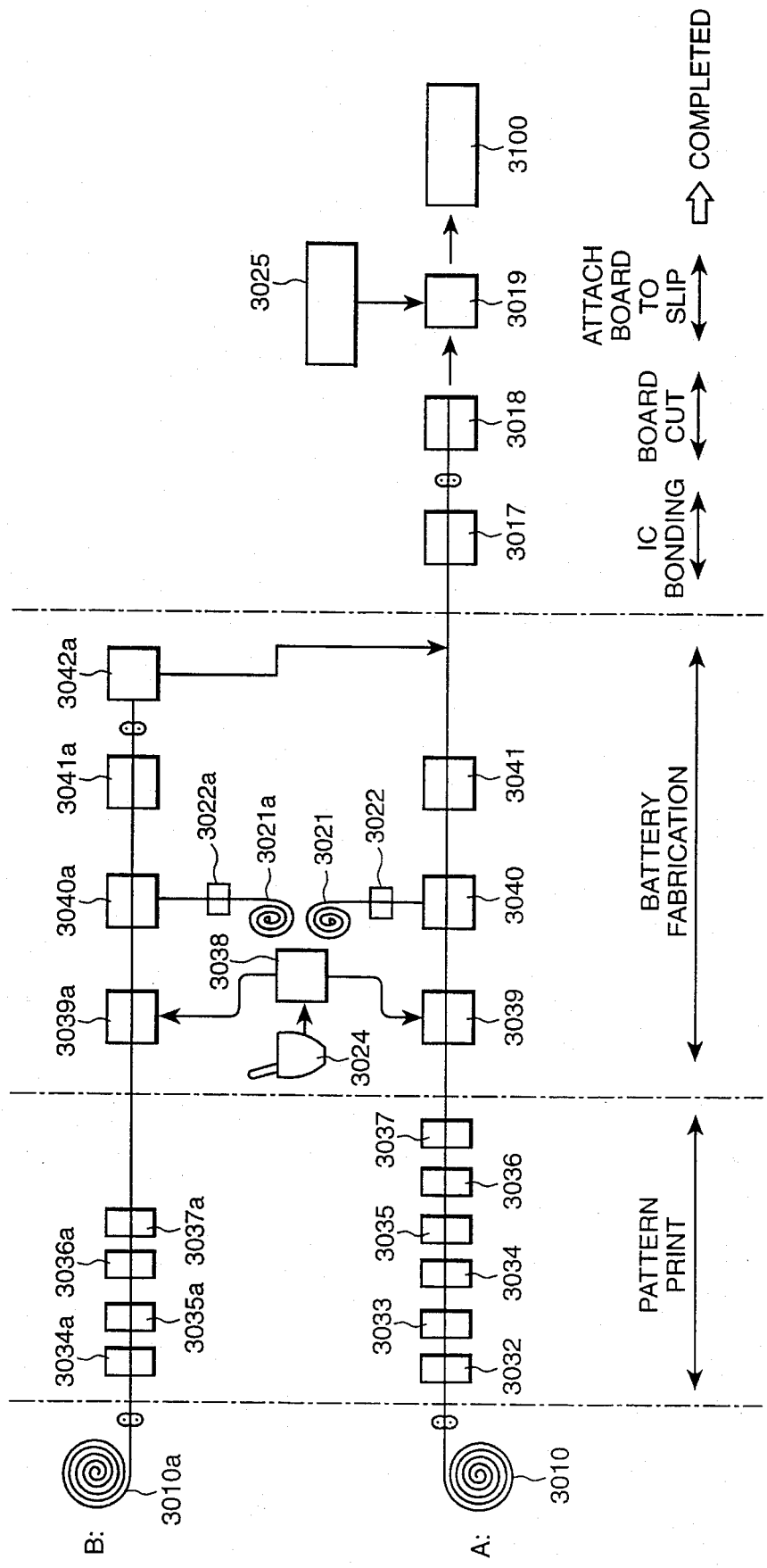
FIG. 43 is a flow diagram of steps of manufacturing a home-delivery slip in the tenth embodiment.

With reference to FIG. 43, the home-delivery slip in the tenth embodiment was manufactured as follows. On the line "A" in FIG. 43, a rolled PET film 3010 for forming PET boards 3002 was sent to a circuit pattern printer 3032, and board patterns (circuit patterns) were periodically printed on the PET film 3010 thereby. Each printed circuit pattern was made of silver paste. Each printed circuit pattern included an antenna 3121. After the PET film 3010 with the printed circuit pattern was dried by a drier 3033, it was fed to a carbon pattern printer 3034. Carbon pattern electrodes 3004a and 3004b were printed on given regions of the PET film 3010 by the carbon pattern printer 3034. After the PET film 3010 with the carbon pattern electrodes 3004a and 3004b was dried by a drier 3035, an anisotropic paste printer 3036 formed anisotropic conductive layers 3043a and 3043b on given regions of the carbon pattern electrodes 3004a and 3004b. The anisotropic conductive layers 3043a and 3043b were made of anisotropic conductive paste. The PET film 3010 with the anisotropic conductive layers 3043a and 3043b was dried by a drier 3037.

Paste was adjusted and prepared by using a manganese dioxide paste maker 3024. The prepared paste was applied to a stainless mesh, and was dried by a drier 3038. Then, the paste was cut into a manganese dioxide paste 3006b of a predetermined size. The manganese dioxide paste 3006b was bonded onto the anisotropic conductive layer 3043b by a bonding device 3039 which executed heating and pressing processes. A separator 3008b was sent out from a rolled craft paper 3021, and paste was applied thereto by a paste application device 3022. The separator 3008b was then mounted on the manganese dioxide paste 3006b by using a craft paper superimposer 3040. A zinc plate 3007a was bonded onto the anisotropic conductive layer 3043a by a bonding device 3041 which executed heating and pressing processes.

On the line "B" in FIG. 43 which extends parallel to the line "A", a rolled PET film 3010a for forming PET sheets 3003 was sent to a carbon pattern printer 3034a, and carbon electrodes 3005 were periodically printed on the PET film 3010a thereby. Each electrode 3005 was made of conductive carbon paste. The PET film 3010a with the carbon electrode 3005 was dried by using a drier 3035a. Then, an anisotropic paste printer 3036a formed anisotropic conductive layers 3044a and 3044b on given regions of the carbon electrode 3005. The anisotropic conductive layers 3044a and 3044b were made of anisotropic conductive paste. The PET film 3010a with the anisotropic conductive layers 3044a and 3044b was dried by a drier 3037a.

As previously described, the paste was adjusted and prepared by using the manganese dioxide paste maker 3024.

The prepared paste was applied to the stainless mesh, and was dried by the drier 3038. Then, the paste was cut into a manganese dioxide paste 3006a of a predetermined size. The manganese dioxide paste 3006a was bonded onto the anisotropic conductive layer 3044a by a bonding device 3039a which executed heating and pressing processes. A separator 3008a was sent out from a rolled craft paper 3021a, and paste was applied thereto by a paste application device 3022a. The separator 3008a was then mounted on the manganese dioxide paste 3006a by using a craft paper superimposer 3040a. A zinc plate 3007a was bonded onto the anisotropic conductive layer 3044b by a bonding device 3041a which executed heating and pressing processes. A PET sheet cutter 3042a trimmed the PET film 3010a into a PET sheet 3003 of a proper size which was provided with the above-mentioned battery parts.

The PET sheet 3003 fabricated along the line "B" was superimposed on the PET film 3010 at the middle of the line "A". The PET sheet 3003 and the PET film 3010 were bonded together by adhesive agents 3009a, 3009b, and 3009c of the hot melt type. As a result of this bonding process, the battery 3123B was completed. Later manufacturing processes are similar to those in the embodiment of FIGS. 26–34.

DESCRIPTION OF THE ELEVENTH PREFERRED EMBODIMENT

An eleventh embodiment of this invention is similar to the embodiment of FIGS. 26–34 except for design changes described hereinafter. In the eleventh embodiment, an antenna and wiring lines within an electronic circuit use silver paste while electrodes of a battery use conductive carbon paste. The conductive carbon paste includes polyester based conductive carbon and vinyl chloride/vinyl acetate copolymer based conductive carbon.

Figure 44:
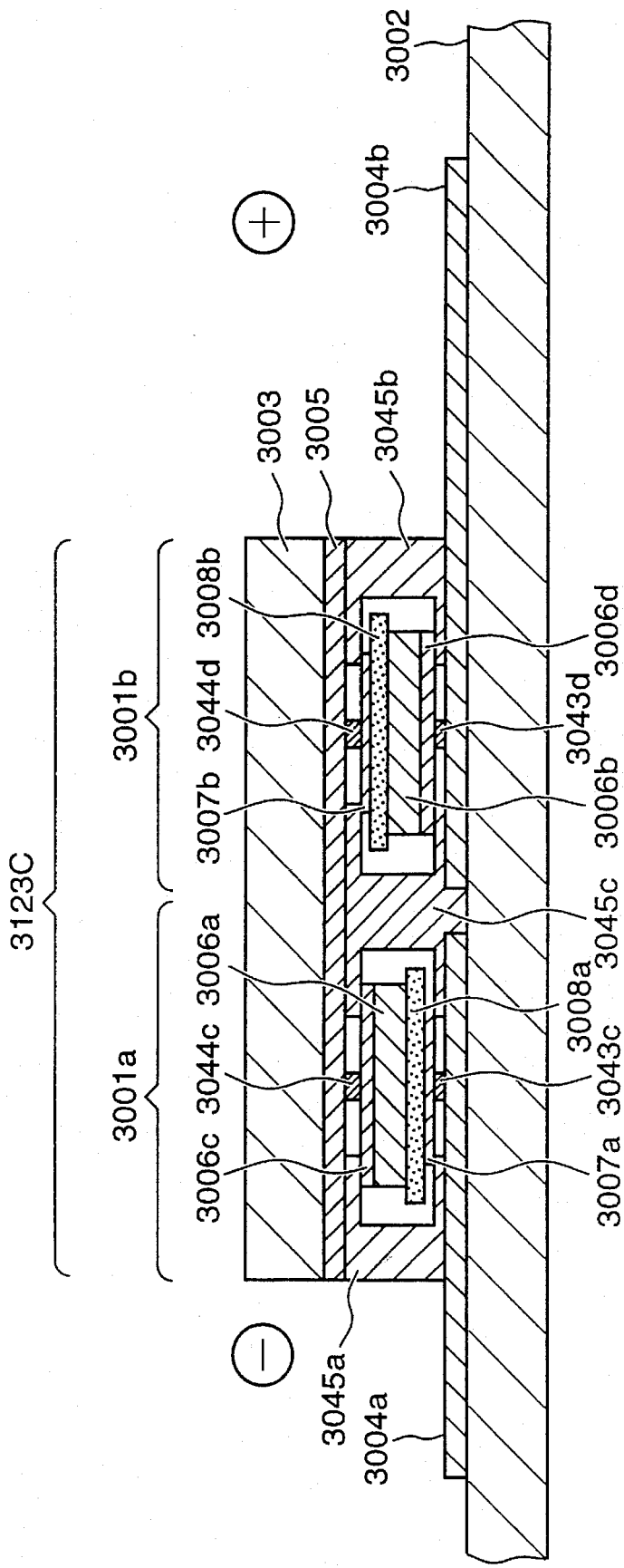
FIG. 44 is a sectional view of a battery in an eleventh embodiment of this invention.

The eleventh embodiment includes a battery 3123C which is designed as shown in FIG. 44. Specifically, in the battery 3123C of FIG. 44, adhesive agents 3045a, 3045b, and 3045c are provided among carbon pattern electrodes 3004a and 3004b and a carbon electrode 3005. The adhesive agents 3045a, 3045b, and 3045c compose a frame having two rectangular openings. Central regions of the openings accommodate anisotropic conductive layers 3043c, 3043d, 3044c, and 3044d. Zinc plates 3007a and 3007b and stainless meshes 3006c and 3006d each have four sides overlapping with inner edges of the frame composed of the adhesive agents 3045a, 3045b, and 3045c. The stainless meshes 3006c and 3006d serve as positive pole collectors. The carbon pattern electrodes 3004a and 3004b, the carbon electrode 3005, the adhesive agents 3045a, 3045b, and 3045c, the anisotropic conductive layers 3043c, 3043d, 3044c, and 3044d, and the stainless meshes 3006c and 3006d are bonded together by adhesive resin through heating and pressing processes.

The adhesive agents 3045a, 3045b, and 3045c prevent electrolyte from reaching portions of the carbon pattern electrodes 3004a and 3004b and the carbon electrode 3005 which extend below and above the zinc plates 3007a and 3007b. Therefore, the resistances of the carbon pattern electrodes 3004a and 3004b and the carbon electrode 3005 hardly change according to ageing thereof, and thus a home-delivery slip in the eleventh embodiment can be stored for a long term. The bonding of the parts of the battery 3123C by the adhesive resin allows a bent of the battery 3123C without impairing the characteristics of contact thereamong. The stainless meshes 3006c and 3006d which serve as the positive pole collectors can withstand an applied pressure on the top of the battery 3123C so that characteristics of the battery 3123C can be stably maintained even under such a pressure. The battery 3123C uses an aqueous solution of zinc perchlorate as electrolyte in view of the fact that the positive pole collectors include the stainless meshes.

Figure 45:
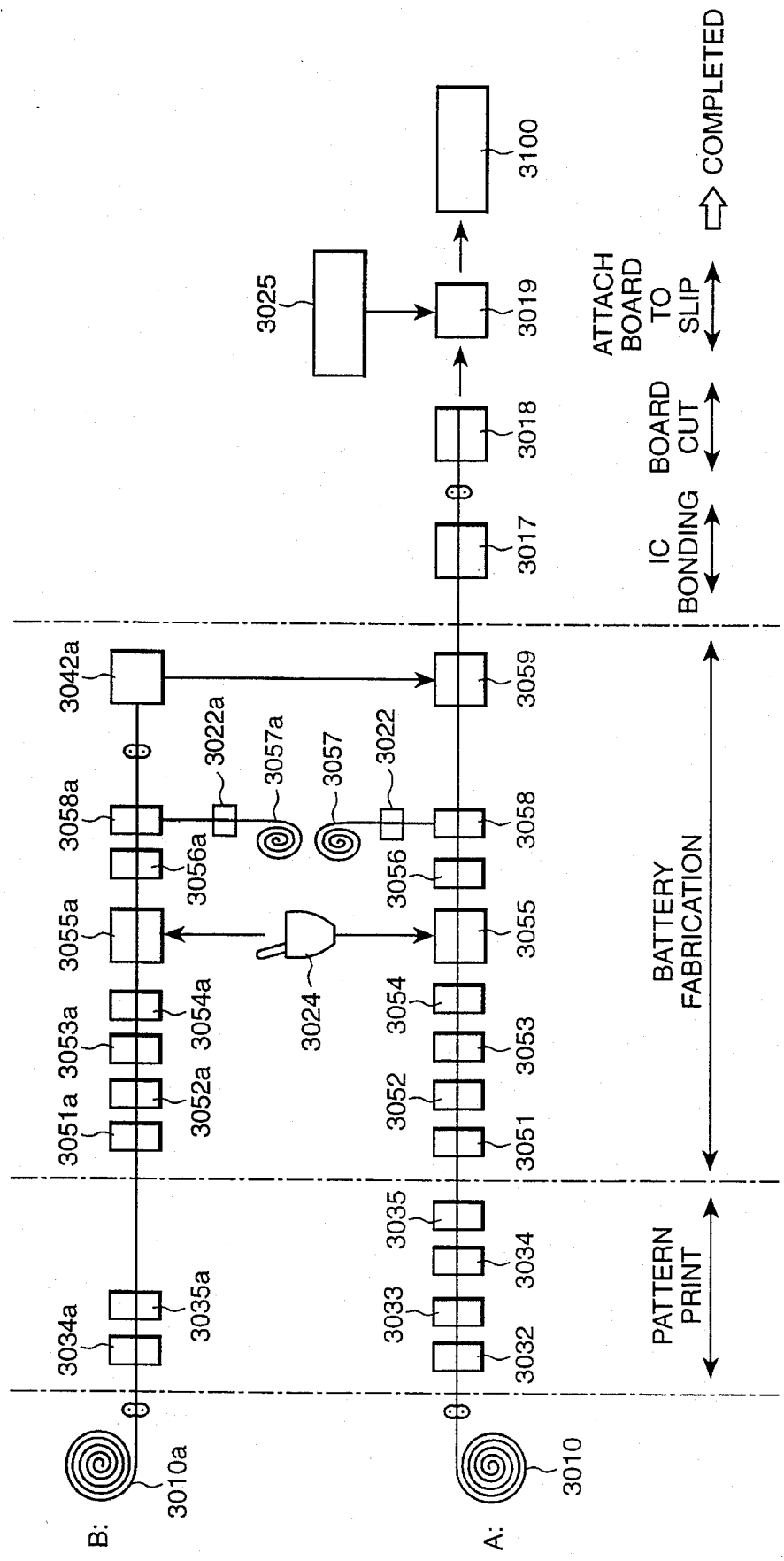
FIG. 45 is a flow diagram of steps of manufacturing a home-delivery slip in the eleventh embodiment.

With reference to FIG. 45, the home-delivery slip in the eleventh embodiment was manufactured as follows. On the line "A" in FIG. 45, a rolled PET film 3010 for forming PET boards 3002 was sent to a circuit pattern printer 3032, and board patterns (circuit patterns) were periodically printed on the PET film 3010 thereby. Each printed circuit pattern was made of silver paste. Each printed circuit pattern included an antenna 3121. After the PET film 3010 with the printed circuit pattern was dried by a drier 3033, it was fed to a carbon pattern printer 3034. Carbon pattern electrodes 3004a and 3004b were printed on given regions of the PET film 3010 by the carbon pattern printer 3034. The PET film 3010 with the carbon pattern electrodes 3004a and 3004b was dried by a drier 3035.

Subsequently, adhesive agents 3045a, 3045b, and 3045c were attached to given regions of the carbon pattern electrodes 3004a and 3004b by a bonding device 3051 which executed heating and pressing processes. The adhesive agents 3045a, 3045b, and 3045c composed a frame having two rectangular openings. Anisotropic conductive layers 3043c and 3043d were provisionally fixed in central regions of the openings in the frame by a bonding device 3052 which executed heating and pressing processes. A zinc plate 3007a was placed on the carbon pattern electrode 3004a. The zinc plate 3007a had four sides overlapping with inner edges of the frame composed of the adhesive agents 3045a, 3045b, and 3045c. The zinc plate 3007a was bonded to the adhesive agents 3045a and 3045c and the anisotropic conductive layer 3043c by a bonding device 3053 which executed heating and pressing processes. In addition, a stainless mesh 3006d was placed on the carbon pattern electrode 3004b. The stainless mesh 3006d had four sides overlapping with inner edges of the frame composed of the adhesive agents 3045a, 3045b, and 3045c. The stainless mesh 3006d was bonded to the adhesive agents 3045b and 3045c and the anisotropic conductive layer 3043d by a bonding device 3054 which executed heating and pressing processes.

Paste was adjusted and prepared by using a manganese dioxide paste maker 3024. By using a manganese dioxide paste printer 3055, the prepared paste was printed to form a manganese dioxide paste 3006b on the stainless mesh 3006d. A first separator including a cellophane sheet was placed on the manganese dioxide paste 3006b by a cellophane superimposer 3056. A second separator including non-woven cloth was sent out from a non-woven cloth roll 3057, and paste was applied thereto by a paste application device 3022. The second separator was then mounted on the first separator by a non-woven cloth superimposer 3058. The first separator and the second separator composed a separator 3008b.

On the line "B" in FIG. 45 which extends parallel to the line "A", a rolled PET film 3010a for forming PET sheets 3003 was sent to a carbon pattern printer 3034a, and carbon electrodes 3005 were periodically printed on the PET film 3010a thereby. Each electrode 3005 was made of conductive carbon paste. The PET film 3010a with the carbon electrode 3005 was dried by using a drier 3035a.

Subsequently, adhesive agents 3045a, 3045b, and 3045c were attached to given regions of the carbon electrode 3005 by a bonding device 3051a which executed heating and pressing processes. The adhesive agents 3045a, 3045b, and 3045c composed a frame having two rectangular openings. Anisotropic conductive layers 3044c and 3044d were provisionally fixed in central regions of the openings in the frame by a bonding device 3052a which executed heating and pressing processes. A zinc plate 3007b was placed on the carbon electrode 3005. The zinc plate 3007b had four sides overlapping with inner edges of the frame composed of the adhesive agents 3045a, 3045b, and 3045c. The zinc plate 3007b was bonded to the adhesive agents 3045b and 3045c and the anisotropic conductive layer 3044d by a bonding device 3053a which executed heating and pressing processes. In addition, a stainless mesh 3006c was placed on the carbon electrode 3005. The stainless mesh 3006c had four sides overlapping with inner edges of the frame composed of the adhesive agents 3045a, 3045b, and 3045c. The stainless mesh 3006c was bonded to the adhesive agents 3045a and 3045c and the anisotropic conductive layer 3044c via a bonding device 3054a which executed heating and pressing processes.

As previously described, paste was adjusted and prepared by using the manganese dioxide paste maker 3024. By using a manganese dioxide paste printer 3055a, the prepared paste was printed to form a manganese dioxide paste 3006a on the stainless mesh 3006c. A first separator including a cellophane sheet was placed on the manganese dioxide paste 3006a by a cellophane superimposer 3056a. A second separator including non-woven cloth was sent out from a non-woven cloth roll 3057a, and paste was applied thereto by a paste application device 3022a. The second separator was then mounted on the first separator by a non-woven cloth superimposer 3058a. The first separator and the second separator composed a separator 3008a. Subsequently, a PET sheet cutter 3042a trimmed the PET film 3010a into a PET sheet 3003 of a proper size which was provided with the above-mentioned battery parts.

The PET sheet 3003 fabricated along the line "B" was superimposed on the PET film 3010 at the middle of the line "A". A battery assembling device 3059 was used so that the PET sheet 3003 and the PET film 3010 were bonded together by the adhesive agents 3045a, 3045b, and 3045c. As a result of this bonding process, the battery 3123C was completed. Later manufacturing processes are similar to those in the embodiment of FIGS. 26–34.

DESCRIPTION OF THE TWELFTH
PREFERRED EMBODIMENT

A twelfth embodiment of this invention is similar to one of the embodiments 26–45 except for design changes described hereinafter. In the twelfth embodiment, the manganese dioxide pastes 3006a and 3006b are replaced by a well kneaded mixture of positive pole agent and paste with a weight ratio of the former to the latter of 60 to 40. The positive pole agent is a mixture of electrolytic manganese dioxide, acetylene black, and zinc oxide with a ratio of 85 to 14 to 1. The paste is a well kneaded mixture of electrolyte and starch with a weight ratio of tile former to the latter of 50 to 50. The electrolyte is a mixture of zinc chloride, ammonium chloride, and water with a ratio of 26 to 3 to 71. Alternatively, the electrolyte may be a resultant of dissolving zinc perchlorate in water at a rate of 1–3 mol/dm$^3$. The starch may be replaced by caking agent having a mixture of acrylic emulsion and electrolyte.

In the twelfth embodiment, during the manufacture of a home-delivery slip, manganese dioxide paste was applied onto a carbon pattern electrode 3004b, a carbon electrode 3005, a stainless mesh 3006c, or a stainless mesh 3006d. For example, the manganese dioxide paste remained heated at 80° C. for 5 minutes so that it was dried and hardened into a solid manganese dioxide layer. Subsequently, electrolyte was fed to the solid manganese dioxide layer or the solid manganese dioxide layer was coated with paste, and a craft paper with paste, a cellophane sheet, or an un-woven cloth sheet was superimposed thereon.

In the twelfth embodiment, each of the zinc plates 3007a and 3007b is replaced by a well kneaded mixture of negative pole agent and the above-mentioned paste or caking agent with a weight ratio of the former to the latter of 60 to 40. The negative pole agent is a mixture of zinc powder and acetylene black with a ratio of the former to the later of 200 to 1.

In the twelfth embodiment, during the manufacture of a home-delivery slip, zinc paste was applied onto a carbon pattern electrode 3004a and a carbon electrode 3005. For example, the zinc paste remained heated at 80° C. for 5 minutes so that it was dried and hardened into a solid zinc layer. Subsequently, electrolyte was fed to the solid zinc layer or the solid zinc layer was coated with paste.

In the twelfth embodiment, the stainless meshes 3006c and 3006d are replaced by expanded metal members of stainless or punching metal members of stainless. In addition, each of the PET board 3002 and the PET sheet 3003 is replaced by a paper laminated with a paper or a PET sheet. Each of the PET board 3002 and the PET sheet 3003 may be replaced by a silicone-containing paper, a paper, or a PET sheet laminated with an aluminum layer or a stainless layer. A metal foil may be attached to the outer surfaces of the paper or the PET sheet instead of laminating. Furthermore, a responding circuit including an antenna is provided in a home-delivery slip or is attached to the front surface of the home-delivery slip. The responding circuit may be directly fabricated on the back surface of the home-delivery slip.

In the twelfth embodiment, the adhesive agents for sealing are replaced by double coated tapes or hot melt adhesive agents. In addition, carbon pattern electrodes use carbon-containing conductive resin or rubber instead of carbon-containing paints. Furthermore, an IC provided with TAB is bonded to a base board by an anisotropic conductive film. The IC may be directly bonded to the base board by the anisotropic conductive film. Chip parts other than the IC may be bonded to the base board in a similar way.

It should be noted that the paste may use dextrin, methylcellulose, polyvinylalcohol, or others instead of starch.

In the twelfth embodiment, the manganese-zinc battery is replaced by a solid electrolyte silver battery, a solid electrolyte copper battery, or others.

DESCRIPTION OF THE THIRTEENTH
PREFERRED EMBODIMENT

Figure 46:
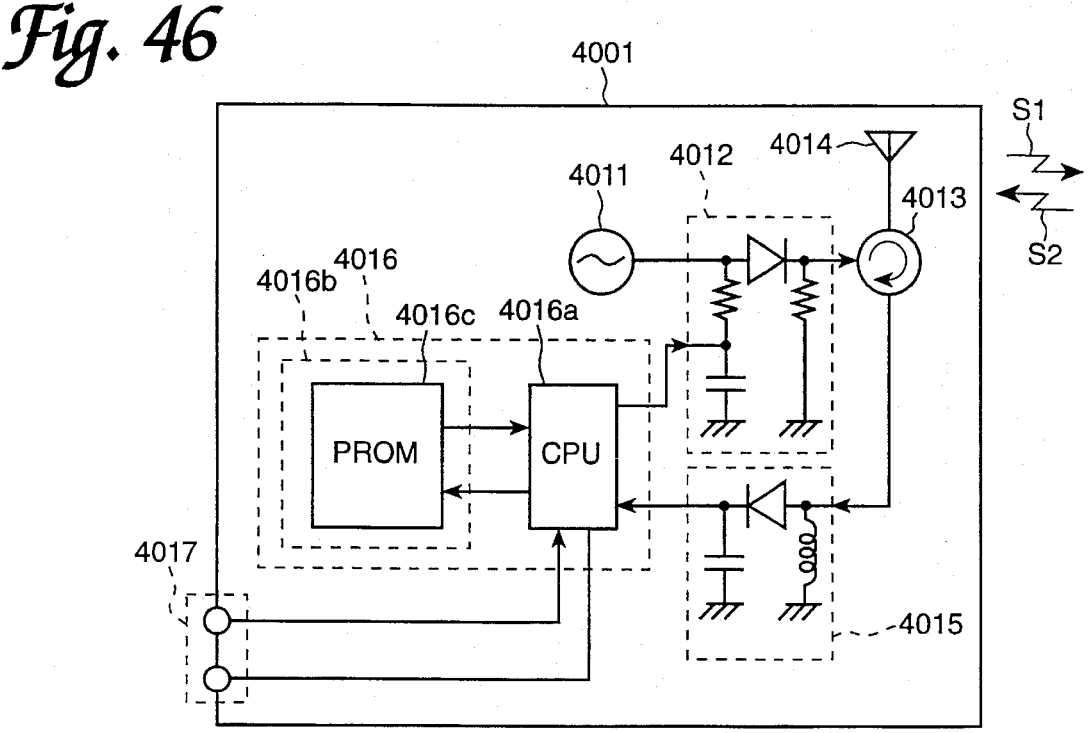
FIG. 46 is a diagram of an interrogator in a thirteenth embodiment of this invention.

With reference to FIG. 46, an interrogator 4001 transmits an interrogation radio wave signal S1 to an information storage medium, and receives a reply radio wave signal S2 therefrom. The interrogator 4001 includes a carrier oscillator 4011, a modulator 4012, a circulator 4013, an antenna 4014, a demodulator 4015, a signal processor 4016, and an interface or a terminal 4017.

The carrier oscillator 4011 generates a carrier of transmission radio wave. The modulator 4012 superimpose information on the carrier generated by the carrier oscillator 4011. The circulator 4013 separates transmitted radio wave and received radio wave. The antenna 4014 radiates and catches radio waves. The demodulator 4015 recovers information from the received radio wave. The signal processor 4016 functions to process information and to control the modulator 4012 and the demodulator 4015. The signal processor 4016 includes a CPU 4016a and a system identification (ID) information setting section 4016b. The CPU 4016a operates in accordance with a program stored in an internal ROM. The system ID information setting section 4016b functions to set a system ID number. The system ID information setting section 4016b includes a PROM 4016c storing system ID information. The CPU 4016a is connected via the interface 4017 to an external device (for example, a host information processing device or a system management device) to transmit and receive information to and from the external device.

The interrogator 4001 operates as follows. The signal processor 4016 feeds information data (interrogation data) to the modulator 4012. The carrier oscillator 4011 feeds the carrier to the modulator 4012. The modulator 4012 modulates the carrier with the information data, thereby superimposing the information data on the carrier and converting the carrier into an interrogation radio wave signal S1 containing the interrogation data. The interrogation radio wave signal S1 is fed from the modulator 4012 to the antenna 4014 via the circulator 4013, and is then radiated from the antenna 4014.

A reply radio wave signal S2 from a responding circuit on an information storage medium is caught by the antenna 4014, being fed via the circulator 4013 to the demodulator 4015. The demodulator 4015 recovers information from the reply radio wave signal S2, and outputs the recovered information to the signal processor 4016. The recovered information is processed by the signal processor 4016. The recovered information can be outputted to an external device via the interface 4017.

The signal processor 4016 generates transmission data (information data) in response to a control signal and various information received from an external device via the interface 4017. The signal processor 4016 outputs the transmission data to the modulator 4012. The transmission data is transmitted from the interrogator 4001 to a responding circuit on an information storage medium by radio. The transmission data can be used in controlling the responding circuit or the information storage medium.

Figure 47:
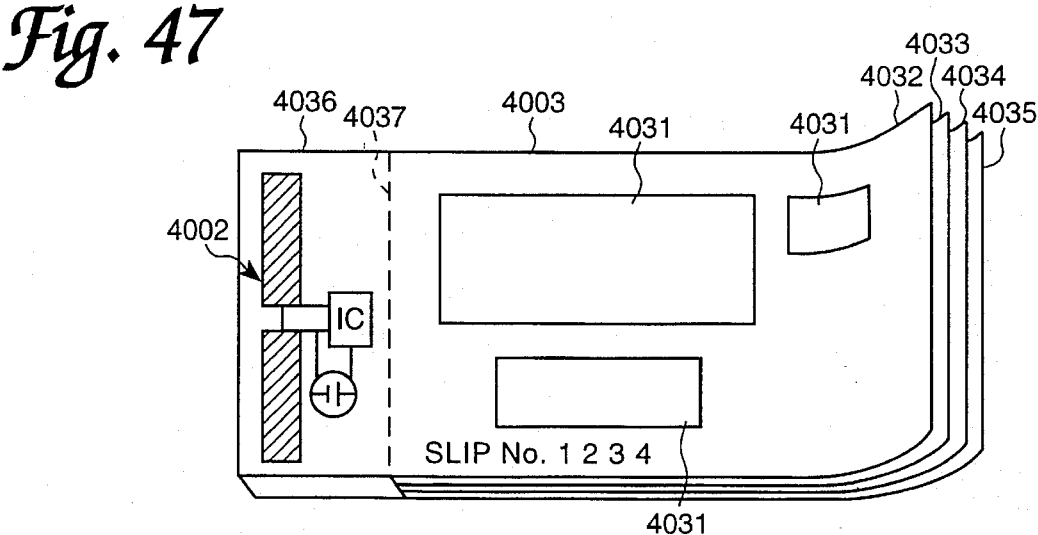
FIG. 47 is a diagram of a home-delivery slip in the thirteenth embodiment.

FIG. 47 shows a home-delivery slip 4003 which is a first example of an information storage medium. The home-delivery slip 4003 includes slip pieces, such as a sender slip copy 4032, a processing slip copy 4033, a delivery slip copy 4034, and a recipient slip copy 4035, which have ends bonded together at a base 4036 to form a bundled configuration. The sender slip copy 4032 has entry blanks 4031. The processing slip copy 4033 is separated from the home-delivery slip 4003 during the delivery of a related parcel. The delivery slip copy 4034 is taken back upon the completion of the delivery of the related parcel. The recipient slip copy 4035 is given to a recipient upon the completion of the delivery of the related parcel. The home-delivery slip 4003 has a perforated line 4037 extending near the base 4036 thereof. When the slip pieces 4032, 4033, and 4034 are required to be separated from the home-delivery slip 4003, they are cut along the perforated line 4037. The base 4036 of the home-delivery slip 4003 has a responding circuit 4002 which stores a slip number and a system ID information number of a slip system as ID information of the home-delivery slip 4003. In the home-delivery slip 4003 of FIG. 47, the slip number is "1234".

Figure 48:
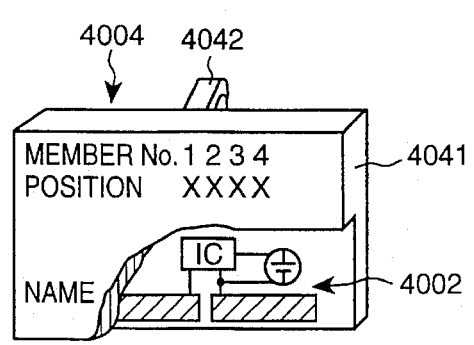
FIG. 48 is a diagram of a nameplate in the thirteenth embodiment.

FIG. 48 shows a nameplate 4004 which is a second example of an information storage medium. The nameplate 4004 includes a display 4041 and a clip 4042. The display 4041 indicates person's (member's) name and position. The clip 4042 attaches the display 4041 to a support. The display 4041 has a responding circuit 4002 which stores member's number and a system ID information number of a nameplate system as personal ID information. In the nameplate 4004 of FIG. 48, the member's number is "1234".

Figure 49:
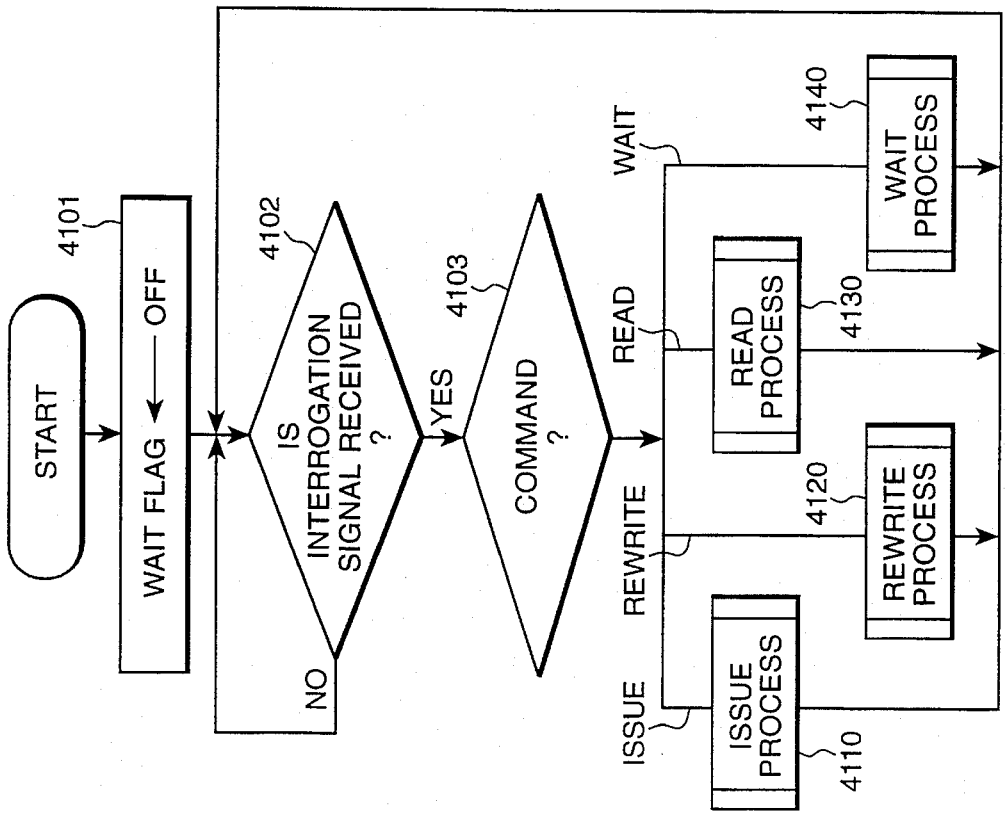
FIG. 49 is a flowchart of a program for controlling a CPU in a responding circuit in the thirteenth embodiment.

The responding circuit 4002 in the home-delivery slip 4003 and the responding circuit 4002 in the nameplate 4004 are similar in basic design to the responding circuit of FIGS. 11 and 12. Each of the responding circuits 4002 includes a CPU which operates in accordance with a program stored in an internal ROM. FIG. 49 is a flowchart of this program. When a level comparator within the responding circuit 4002 detects the reception of an interrogation signal S1, the CPU starts to operate.

As shown in FIG. 49, a first step 4101 of the program sets a wait flag to an OFF state. After the step 4101, the program advances to a step 4102. The step 4102 determines whether or not an interrogation signal S1 is received. When an interrogation signal S1 is received, the program advances from the step 4102 to a step 4103. Otherwise, the step 4102 is repeated. In this way, waiting continues until an interrogation signal S1 is received.

The step 4103 extracts a command from the received interrogation signal S1, and interprets the command. Specifically, the step 4103 detects a type of the command. Generally, a command in an interrogation signal S1 is of four different types, that is, "issuing", "rewriting", "reading", and "waiting". When the type of the command corresponds to "issuing", the program advances from the step 4103 to a block 4110 for an issuing process. When the type of the command corresponds to "rewriting", the program advances from the step 4103 to a block 4120 for a rewriting process. When the type of the command corresponds to "reading", the program advances from the step 4103 to a block 4130 for a reading process. When the type of the command corresponds to "waiting", the program advances from the step 4103 to a block 4140 for a waiting process. After the blocks 4110, 4120, 4130, and 4140, the program returns to the step 4102.

Figure 50:
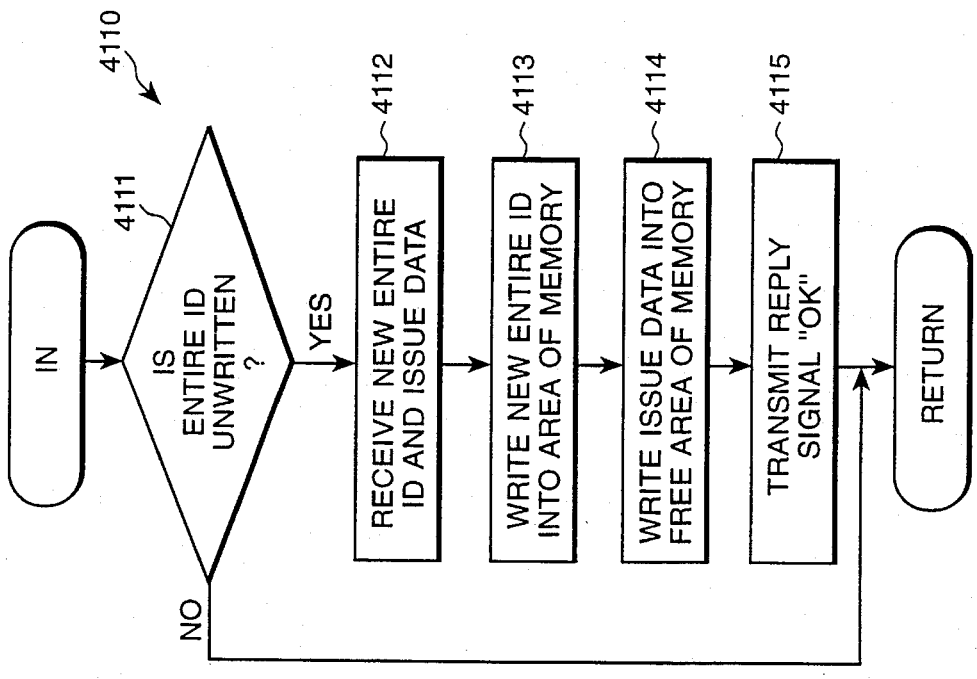

FIG. 50 shows the details of the issuing block 4110 of FIG. 49. A first step 4111 in the issuing block 4110 determines whether or not ID information has been written into the responding circuit 4002. When ID information has been written into the responding circuit 4002, the program advances from the step 4111 and then exits from the issuing block 4110 before returning to the step 4102 of FIG. 49. When ID information has not yet been written into the responding circuit 4002, the program advances from the step 4111 to a step 4112. The step 4112 receives new entire ID information and issuing data. A step 4113 following the step 4112 writes the new entire ID information into an ID information area of a memory within the responding circuit 4002. A step 4114 following the step 4113 writes the issuing data into a free area of the memory. A step 4115 following the step 4114 transmits a reply signal representing "OK", that is, representing that the issuing process has been successfully completed. After the step 4115, the program exits from the issuing block 4110 and then returns to the step 4102 of FIG. 49.

FIG. 51 shows the details of the rewriting block 4120 of FIG. 49. A first step 4121 in the rewriting block 4120 determines whether or not entire ID information has been written into the responding circuit 4002. When entire ID information has not yet been written into the responding circuit 4002, the program advances from the step 4121 and then exits from the rewriting block 4120 before returning to the step 4102 of FIG. 49. When entire ID information has been written into the responding circuit 4002, the program advances from the step 4121 to a step 4122. The step 4122 receives new entire ID information and rewriting data. A step 4123 following the step 4122 determines whether or not the received new ID information is equal to the ID information stored in the memory within the responding circuit 4002. When the received new ID information is equal to the ID information in the memory, the program advances from the step 4123 to a step 4124. Otherwise, the program advances from the step 4123 and then exits from the rewriting block 4120 before returning to the step 4102 of FIG. 49. The step 4124 writes the rewriting data into the free area of the memory. A step 4125 following the step 4124 transmits a reply signal representing "OK", that is, representing that the rewriting process has been successfully completed. After the step 4125, the program exits from the rewriting block 4120 and then returns to the step 4102 of FIG. 49.

FIG. 52 shows the details of the reading block 4130 of FIG. 49. A first step 4131 in the reading block 4130 determines whether or not the wait flag is in the OFF state. When the wait flag is in the OFF state, the program advances from the step 4131 to a step 4132. Otherwise, the program advances from the step 4131 and then exits from the reading block 4130 before returning to the step 4102 of FIG. 49. The step 4132 reads out entire ID information and data from the ID information area and the free area of the memory, and transmits the readout ID information and the data as a reply signal. After the step 4132, the program exits from the reading block 4130 and then returns to the step 4102 of FIG. 49.

FIG. 53 shows the details of the waiting block 4140 of FIG. 49. A first step 4141 in the waiting block 4140 receives new entire ID information. A step 4142 following the step 4141 determines whether or not the received new ID information is equal to the ID information stored in the memory within the responding circuit 4002. When the received new ID information is equal to the ID information in the memory, the program advances from the step 4142 to a step 4143. Otherwise, the program advances from the step 4142 and then exits from the waiting block 4140 before returning to the step 4102 of FIG. 49. The step 4143 sets the wait flag to an ON state. After the step 4143, the program exits from the waiting block 4140 and then returns to the step 4102 of FIG. 49.

As previously described, the issuing process can be executed only when ID information has not yet been written into the responding circuit 4002. Thus, it is generally difficult to make a forgery of an information storage medium (a home-delivery slip 4003 or a nameplate 4004) which has been subjected to an issuing process. The rewriting process can be executed only after ID information has been written into the responding circuit 4002. Accordingly, it is possible to prevent an unissued information storage medium from being actually used. Entire ID information in the responding circuit 4002 has a first portion corresponding to system ID information of the interrogator 4001, and a second portion corresponding to ID information for setting by the user. During the processing in the responding circuit 4002, the system ID information and the user setting ID information are handled without being distinguished from each other.

As long as the wait flag is in the OFF state, the responding circuit 4002 replies to each reading command. After the responding circuit 4002 receives a waiting command, the responding circuit 4002 does not reply to a reading command. When the detection of an interrogation signal S1 by the level comparator within the responding circuit 4002 ends, power feed to the CPU and a clock signal generator within the responding circuit 4002 is suspended so that the operation of the responding circuit 4002 terminates. During a subsequent period, the CPU within the responding circuit 4002 restarts to operate when the level comparator within the responding circuit 4002 detects the reception of an interrogation signal S1.

As previously described, the CPU 4016*a* within the interrogator 4001 operates in accordance with a program stored in an internal ROM. FIG. 54 is a flowchart of this program.

As shown in FIG. 54, a first step 4201 of the program determines whether or not a host command is received from a host information processing device via the interface 4017. When a host command is received, the program advances from the step 4201 to a step 4202. Otherwise, the step 4201 is repeated. In this way, a host command is waited. The step 4202 interprets the host command and detects a type of the host command. Generally, a host command is of four different types, that is, "ID setting", "reading", "issuing", and "rewriting". When the type of the host command corresponds to "ID setting", the program advances from the step 4202 to a block 4210 for a system ID setting process. When the type of the host command corresponds to "reading", the program advances from the step 4202 to a block 4220 for a reading process. When the type of the host command corresponds to "issuing", the program advances from the step 4202 to a block 4230 for an issuing process. When the type of the host command corresponds to "rewriting", the program advances from the step 4202 to a block 4240 for a rewriting process. After the blocks 4210, 4220, 4230, and 4240, the program returns to the step 4201. When given conditions are satisfied in the reading block 4220, the program returns from the reading block 4220 to the step 4202.

FIG. 55 shows the details of the ID setting block 4210 of FIG. 54. A first step 4211 in the ID setting block 4210 determines whether or not system ID information has been written into the system ID information setting section 4016*b* of the interrogator 4001. When system ID information has been written into the system ID information setting section 4016*b*, the program advances from the step 4211 and then exits from the ID setting block 4210 before returning to the step 4201 of FIG. 54. When system ID information has not yet been written into the system ID information setting section 4016*b*, the program advances from the step 4211 to a step 4212. The step 4212 receives new system ID information from the host information processing device via the interface 4017. A step 4213 following the step 4212 writes the new system ID information into the system ID information setting section 4016*b*. In other words, the step 4213 sets the received system ID information as formal system ID information. A step 4214 following the step 4213 notifies the host information processing device that the ID setting process has been successfully completed. After the step 4214, the program exits from the ID setting block 4210 and then returns to the step 4201 of FIG. 54.

FIG. 56 shows the details of the reading block 4220 of FIG. 54. A first step 4221 in the reading block 4220 controls the modulator 4012 within the interrogator 4001 to transmit an interrogation signal representative of a "reading" command toward a responding circuit 4002 within an information storage medium (a home-delivery slip 4003 or a nameplate 4004). A step 4222 following the step 4221 determines whether or not another host command is received from the host information processing device via the interface 4017. When another host command is received, the program advances from the step 4222 and then exits from the reading block 4220 before returning to the step 4202 of FIG. 54. Otherwise, the program advances from the step 4222 to a step 4223. The step 4223 determines whether or not a reply signal is received from a responding circuit 4002 within an information storage medium (a home-delivery slip 4003 or a nameplate 4004). When a reply signal is received, the program advances from the step 4223 to a step 4224. Otherwise, the program returns from the step 4223 to the step 4221. In this way, a reply signal is waited. The step 4224 derives entire ID information of the responding circuit 4002 from the received reply signal. Then, the step 4224 controls the modulator 4012 within the interrogator 4001 to transmit an interrogation signal representative of a "waiting" command toward the responding circuit 4002. A step 4225 following the step 4224 separates system ID information from the entire ID information of the responding circuit 4002. The step 4225 determines whether or not the system ID information of the responding circuit 4002 is equal to the system ID information stored in the system ID information setting section 4016b within the interrogator 4001. When the system ID information of the responding circuit 4002 is equal to the system ID information in the system ID information setting section 4016b, the program advances from the step 4225 to a step 4226. Otherwise, the program returns from the step 4225 to the step 4221. The step 4226 notifies the host information processing device of the received information of the responding circuit 4002. To maintain security regarding the system ID information, it is preferable to exclude the system ID information from the information fed to the host information processing device. After the step 4226, the program exits from the reading block 4220 and then returns to the step 4201 of FIG. 54.

Figure 57:
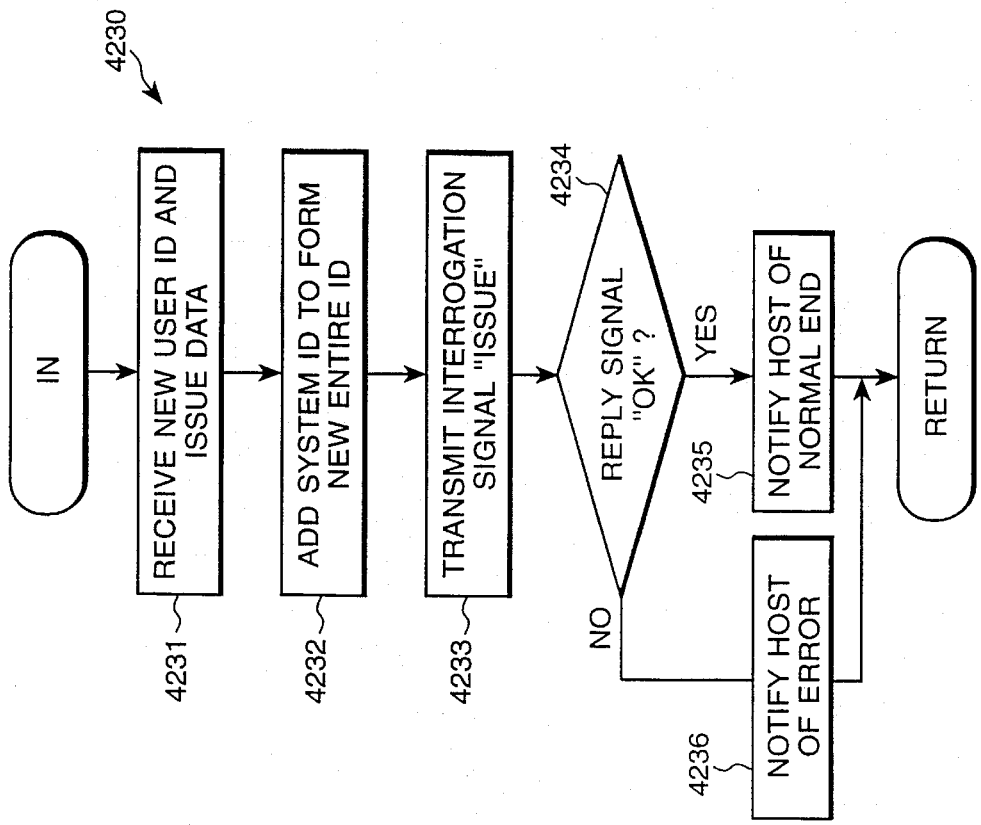

FIG. 57 shows the details of the issuing block 4230 of FIG. 54. A first step 4231 in the issuing block 4230 receives new user setting ID information and issuing data from the host information processing device via the interface 4017. A step 4232 following the step 4231 combines the system ID information and the new user setting ID information into new entire ID information. A step 4233 following the step 4232 controls the modulator 4012 within the interrogator 4001 so that an interrogation signal representative of a "issuing" command, the new entire ID information, and the issuing data will be transmitted toward a responding circuit 4002 within an information storage medium (a home-delivery slip 4003 or a nameplate 4004). A step 4234 following the step 4233 determines whether or not a reply signal representative of "OK" is received from the responding circuit 4002. When a reply signal of "OK" is received, the program advances from the step 4234 to a step 4235. Otherwise, the program advances from the step 4234 to a step 4236. The step 4235 notifies the host information processing device that the issuing process has been successfully completed. The step 4236 notifies the host information processing device of the occurrence of an error. After the steps 4235 and 4236, the program exits from the issuing block 4230 and then returns to the step 4201 of FIG. 54.

Figure 58:
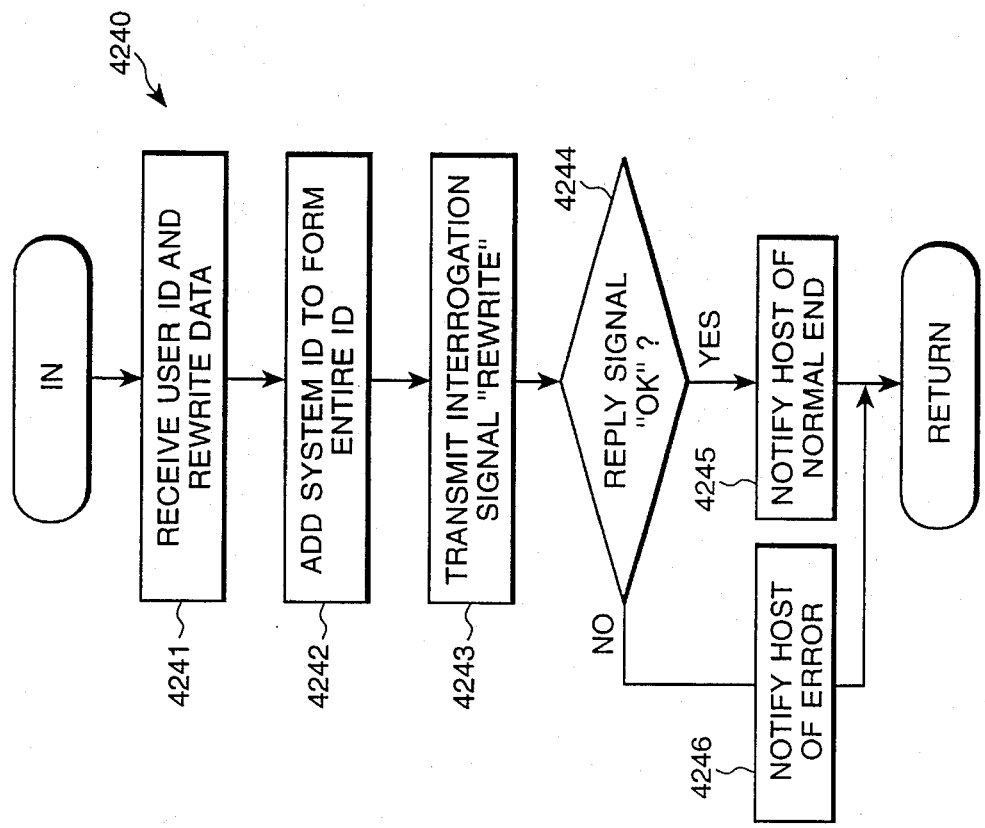

FIG. 58 shows the details of the rewriting block 4240 of FIG. 54. A first step 4241 in the rewriting block 4240 receives user setting ID information and rewriting data from the host information processing device via the interface 4017. A step 4242 following the step 4241 combines system ID information and the user setting ID information into new entire ID information. A step 4243 following the step 4242 controls the modulator 4012 within the interrogator 4001 so that an interrogation signal representative of a "rewriting" command, the new entire ID information, and the rewriting data will be transmitted toward a responding circuit 4002 within an information storage medium (a home-delivery slip 4003 or a nameplate 4004). A step 4244 following the step 4243 determines whether or not a reply signal representative of "OK" is received from the responding circuit 4002. When a reply signal of "OK" is received, the program advances from the step 4244 to a step 4245. Otherwise, the program advances from the step 4244 to a step 4246. The step 4245 notifies the host information processing device that the rewriting process has been successfully completed. The step 4246 notifies the host information processing device of the occurrence of an error. After the steps 4245 and 4246, the program exits from the rewriting block 4240 and then returns to the step 4201 of FIG. 54.

Figure 59:
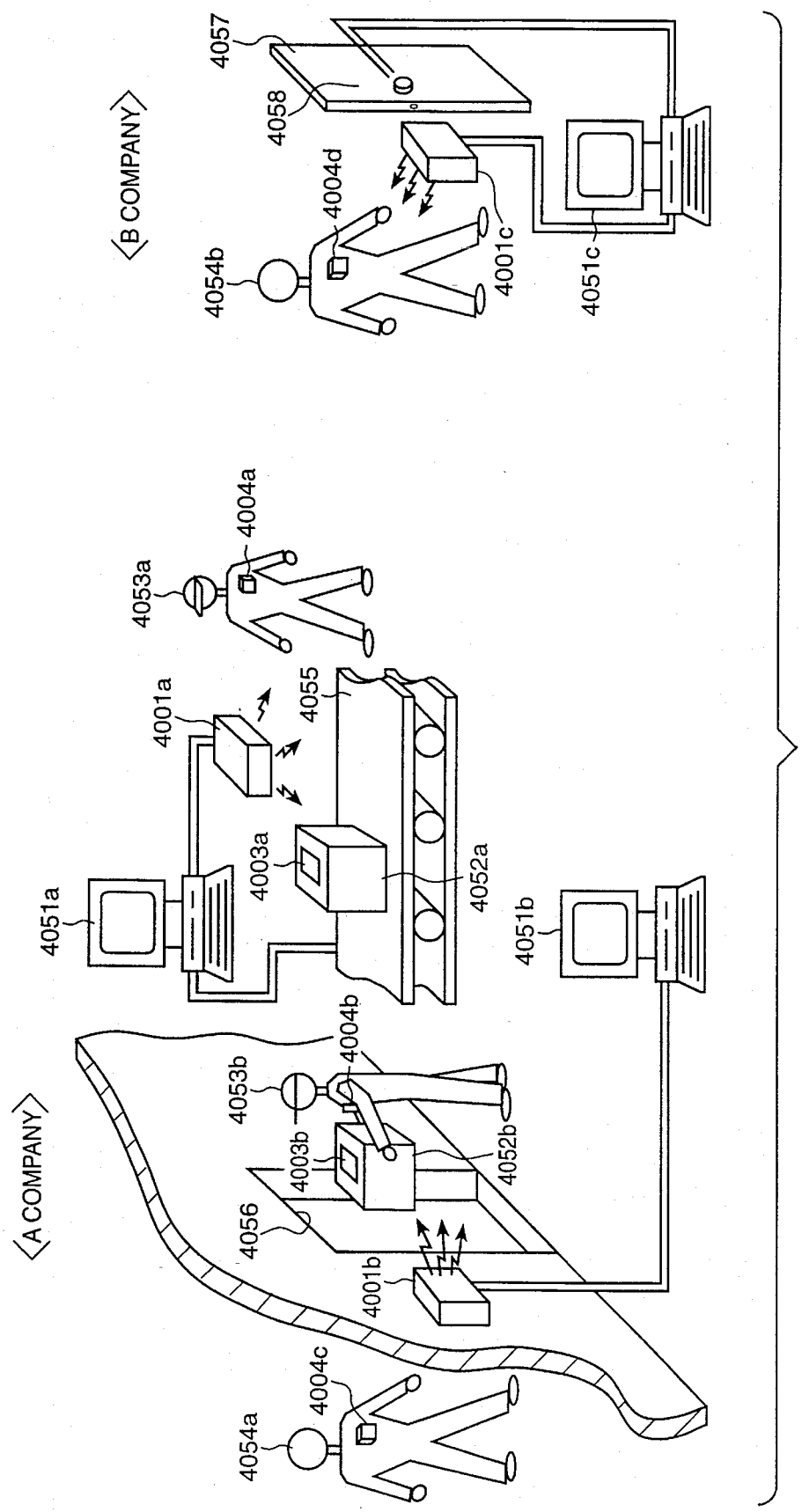
FIG. 59 is a diagram of a parcel management system, a worker management system, and an entrance and exit management system in the thirteenth embodiment.

With reference to FIG. 59, an "A" company handling parcel home delivery uses a parcel management system and a worker management system.

The parcel management system includes a system management device 4051a, parcels 4052a and 4052b, home-delivery slips 4003a and 4003b, an interrogator 4001a, and a belt conveyor 4055. The system management device 4051a is a host device for managing and controlling the flow of the parcels 4052a and 4052b. The home-delivery slips 4003a and 4003b are attached to the parcels 4052a and 4052b respectively. The home-delivery slips 4003a and 4003b are similar in design to the previously-mentioned home-delivery slip 4003. The home-delivery slip 4003a stores ID information of the parcel 4052a. The home-delivery slip 4003b stores ID information of the parcel 4052b. The interrogator 4001a is used in reading out the information from the home-delivery slips 4003a and 4003b. The interrogator 4001a is similar in design to the previously-mentioned interrogator 4001. The interrogator 4001a is electrically connected to the system management device 4051a. The belt conveyor 4055 carries the parcels 4052a and 4052b.

The worker management system includes a system management device 4051b, workers 4053a and 4053b of the "A" company, nameplates 4004a and 4004b, an interrogator 4001b, and a gateway (an entrance and exit) 4056. The system management device 4051b is a host device for management of movement of the workers 4053a and 4053b. The nameplates 4004a and 4004b are attached to the workers 4053a and 4053b respectively. The nameplates 4004a and 4004b are similar in design to the previously-mentioned nameplate 4004. The nameplate 4004a stores ID information of the worker 4053a. The nameplate 4004b stores ID information of the worker 4053b. The interrogator 4001b is used in reading out the information from the nameplates 4004a and 4004b. The interrogator 4001b is similar in design to the previously-mentioned interrogator 4001. The interrogator 4001b is electrically connected to the system management device 4051b. The workers 4053a and 4053b and the parcels 4052a and 4052b can move into and from the "A" company via the gateway 4056.

With reference to FIG. 59, a "B" company uses an entrance and exit management system. The entrance and exit management system includes a system management device 4051c, workers 4054a and 4054b of the "B" company, nameplates 4004c and 4004d, an interrogator 4001c, a door 4057, and an electromagnetic lock 4058. The system management device 4051c is a host device which serves to check qualifications for entrance and exit and to control the electromagnetic lock 4058. The nameplates 4004c and 4004d are attached to the workers 4054a and 4054b respectively. The nameplates 4004c and 4004d are similar in design to the previously-mentioned nameplate 4004. The nameplate 4004c stores ID information of the worker 4054a. The nameplate 4004d stores ID information of the worker 4054b. The interrogator 4001c is used in reading out the information from the nameplates 4004c and 4004d. The interrogator 4001c is similar in design to the previously-mentioned interrogator 4001. The interrogator 4001c is electrically connected to the system management device 4051c. The door 4057 is provided at a gateway (am entrance and exit) for a work room within the "B" company. The door 4057 is locked and unlocked by the electromagnetic lock 4058. The electromagnetic lock 4058 is electrically connected to the system management device 4051c.

In the parcel management system of the "A" company, the interrogator 4001a reads out the information from the home-delivery slips 4003a and 4003b on the parcels 4052a and 4052b when the parcels 4052a and 4052b are carried on the belt conveyor 4055. The interrogator 4001a outputs the readout information to the system management device 4051a. The system management device 4051a derives parcel identification information and parcel delivery destination information from the information outputted by the interrogator 4001a, and controls a sorting device including the belt conveyor 4055 in response to the parcel identification information and the parcel delivery destination information to automatically sort the parcels 4052a and 4052b.

In the worker management system of the "A" company, the interrogator 4001b reads out the information from the nameplates 4004a and 4004b on the workers 4053a and 4053b of the "A" company when the workers 4053a and 4053b have just passed through the gateway 4056. The interrogator 4001b outputs the readout information to the system management device 4051b. The system management device 4051b manages conditions of duties of the workers 4053a and 4053b by referring to the information outputted by the interrogator 4001b.

In the entrance and exit management system of the "B" company, the interrogator 4001c reads out the information from the nameplates 4004c and 4004d on the workers 4054a and 4054b of the "B" company when the workers 4054a and 4054b stand in front of the door 4057. The interrogator 4001c outputs the readout information to the system management device 4051c. The system management device 4051c derives ID information and associated data of qualifications from the information outputted by the interrogator 4001c. When good qualifications for entrance and exit are confirmed, the system management device 4051c controls the electromagnetic lock 4058 to unlock the door 4057.

Figure 60:
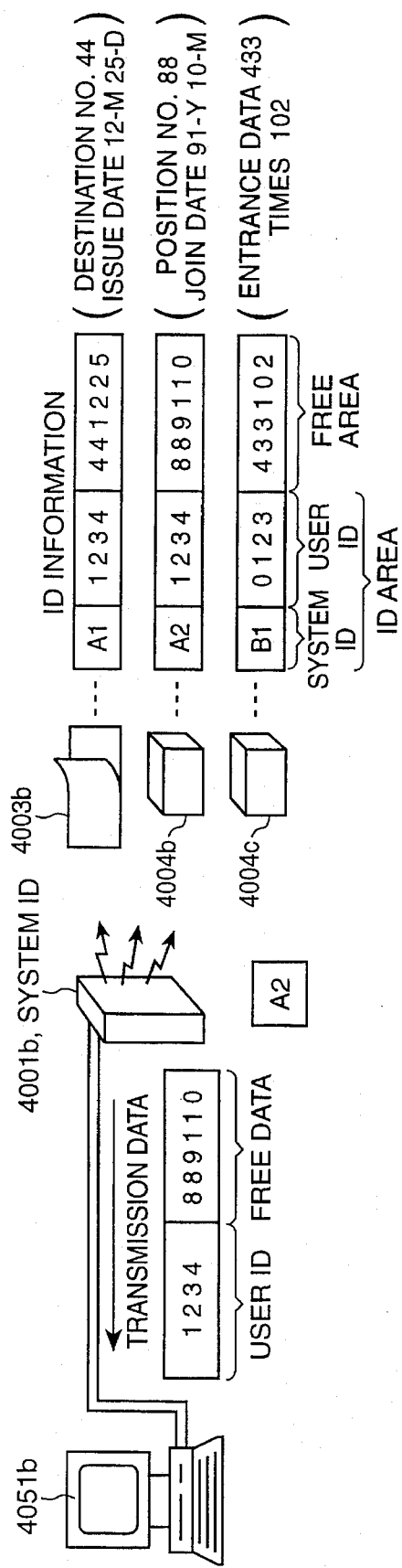
FIG. 60 is a diagram of portions of the systems of FIG. 59.

To prevent problems which might be caused by radio communication interference, the interrogator 4001b in the worker management system is designed to operate as follows. Under the conditions of FIG. 59, the interrogator 4001b reads out the information from the home-delivery slip 4003b and the nameplates 4004b and 4004c. Specifically, the readout of the information is executed according to the reading block 4220 of FIG. 56. It is now assumed that, as shown in FIG. 60, the home-delivery slip 4003b, the nameplate 4004b, and the nameplate 4004c have system ID information A1, system ID information A2, and system ID information B1 respectively. In addition, system ID information is set in the interrogator 4001b. Accordingly, the readout information contains the system ID information A1, the system ID information A2, and the system ID information B1. The interrogator 4001b compares each of the readout system ID information A1, the readout system ID information A2, and the readout system ID information B1 with the system ID information A2 set therein. This comparison is executed according to the step 4225 of FIG. 56. As a result of the comparison, the interrogator 4001b detects that the readout system ID information A2 is equal to the system ID information A2 set therein. Thus, the interrogator 4001b selects user setting data and flee-area data which are associated with the system ID information A2 and which are transmitted from the nameplate 4004b. The interrogator 4001b outputs the selected user setting data and the selected free-area data to the system management device 4051b according to the step 4226 of FIG. 56. User setting data and free-area data associated with the system ID information A1 and the system ID information B1 are prevented from being outputted to the system management device 4051b.

User setting ID information in the ID information area of a memory within each information storage medium contains data representative of a slip number or a member (worker) number. Under the conditions of FIG. 60, data in the free area of the memory within the home-delivery slip 4003b represents a preceding number of 44 and an issue date of 12-th month and 25-th day. In addition, data in the free area of the memory within the nameplate 4004b represents a position number of 88 and a joining company date of 91-st year and 10-th month. Furthermore, data in the free area of the memory within the nameplate 4004c has entrance data of 433 and entrance management of 102 times.

The information outputted to the system management device 4051b from the interrogator 4001b does not have data which should not be processed by the system management device 4051b. Accordingly, it is unnecessary for the system management device 4051b to select given data from the information outputted by the interrogator 4001b. Since data of a slip number or a member (worker) number is stored in the ID information area of the memory within an information storage medium, a relatively wide free area of the memory can be provided.

Generally, management data used in the entrance and exit management system of the "B" company is prevented from leaking into the parcel management system and the worker management system of the "A" company. This is advantageous in security.

Figure 61:
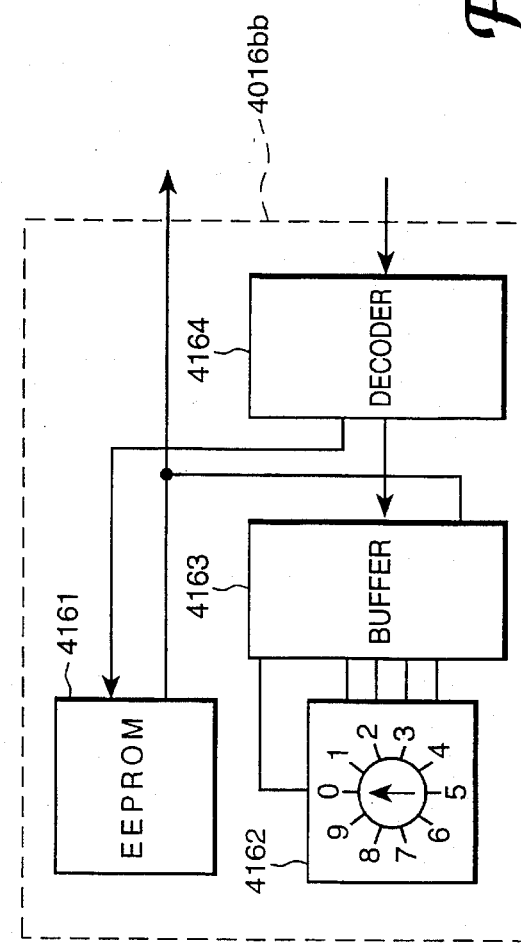
FIG. 61 is a diagram of a system ID information setting section of an interrogator in the thirteenth embodiment.

The system ID information setting section 4016b of the interrogator 4001 (see FIG. 46) may be replaced by a system ID information setting section 4016bb of FIG. 61. As shown in FIG. 61, the system ID information setting section 4016bb includes an EEPROM 4161, a rotary DIP switch unit 4162, a buffer 4163, and a decoder 4164. The rotary DIP switch unit 4162 sets and outputs a signal representing a changeable value. The buffer 4163 subjects the output signal of the rotary DIP switch unit 4162 to level conversion or analog-to-digital conversion. The decoder 4164 selects one of the EEPROM 4161 and the buffer 4163 in response to an address signal fed from the CPU 4016a (see FIG. 46). Selected one of the EEPROM 4161 and the buffer 4163 is accessed by the CPU 4016a. System ID information has a first portion stored in the EEPROM 4161, and a second portion set by the rotary DIP switch unit 4162. The second portion of the system ID information is changed by operating the rotary DIP switch unit 4162.

The system ID information setting section 4016bb operates as follows. The EEPROM 4161 stores the first portion of the system ID information. The rotary DIP switch unit 4162 stores the second portion of the system ID information, and informs the buffer 4163 of the second portion of the system ID information. The decoder 4164 selects one of the EEPROM 4161 and the buffer 4163 in response to the address signal fed from the CPU 4016a (see FIG. 46). Selected one of the EEPROM 4161 and the buffer 4163 is accessed by the CPU 4016a. When the EEPROM 4161 is selected by the decoder 4164, the first portion of the system ID information is fed from the EEPROM 4161 to the CPU 4016a. When the buffer 4163 is selected by the decoder 4164, the second portion of the system ID information is fed from the buffer 4163 to the CPU 4016a.

As shown in FIG. 60, the system ID information A1 and the system ID information A2 are assigned to the parcel management system and the worker management system of the "A" company respectively. First portions "A" of the system ID information A1 and the system ID information A2 are stored in the EEPROM 4161 of FIG. 61. Each of second portions "1" and "2" of the system ID information A1 and the system ID information A2 is set in the rotary DIP switch unit 4162 of FIG. 61. The second portion of system ID information can be changed among "0"–"9" by operating the rotary DIP switch unit 4162. It should be noted that the rotary DIP switch unit 4162 may be omitted from the system ID information setting section 4016bb. In this case, the second portion of system ID information is also stored in the EEPROM 4161, and is changed by operation of the CPU 4016a (see FIG. 46).

DESCRIPTION OF THE FOURTEENTH PREFERRED EMBODIMENT

A fourteenth embodiment of this invention is similar to the embodiment of FIGS. 46–60 except for design changes indicated hereinafter.

Figure 62:
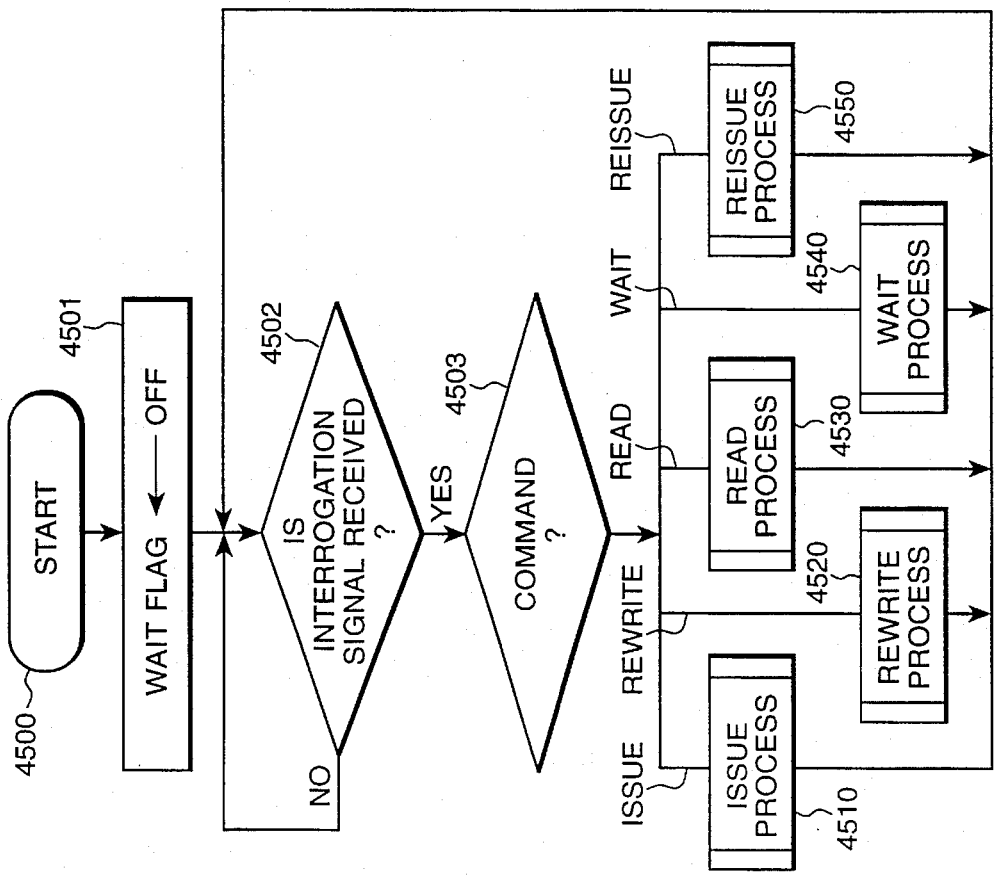
FIG. 62 is a flowchart of a program for controlling a CPU in a responding circuit in a fourteenth embodiment of this invention.

In the fourteenth embodiment, each of responding circuits 4002 (see FIGS. 47 and 48) includes a CPU which operates in accordance with a program stored in an internal ROM. FIG. 62 is a flowchart of this program.

As shown in FIG. 62, a first step 4501 of the program sets a wait flag to an OFF state. After the step 4501, the program advances to a step 4502. The step 4502 determines whether or not an interrogation signal S1 is received. When an interrogation signal S1 is received, the program advances from the step 4502 to a step 4503. Otherwise, the step 4502 is repeated. In this way, waiting continues until an interrogation signal S1 is received.

The step 4503 extracts a command from the received interrogation signal S1, and interprets the command. Specifically, the step 4503 detects a type of the command. Generally, a command in an interrogation signal S1 is of five different types, that is, "issuing", "rewriting", "reading", "waiting", and "reissuing". When the type of the command corresponds to "issuing", the program advances from the step 4503 to a block 4510 for an issuing process. When the type of the command corresponds to "rewriting", the program advances from the step 4503 to a block 4520 for a rewriting process. When the type of the command corresponds to "reading", the program advances from the step 4503 to a block 4530 for a reading process. When the type of the command corresponds to "waiting", the program advances from the step 4503 to a block 4540 for a waiting process. When the type of the command corresponds to "reissuing", the program advances from the step 4503 to a block 4550 for a reissuing process. After the blocks 4510, 4520, 4530, 4540, and 4550, the program returns to the step 4502.

The issuing block 4510 is similar to the issuing block 4110 of FIGS. 49 and 50. The rewriting block 4520 is similar to the rewriting block 4120 of FIGS. 49 and 51. The waiting block 4540 is similar to the waiting block 4140 of FIGS. 49 and 53.

Figure 63:
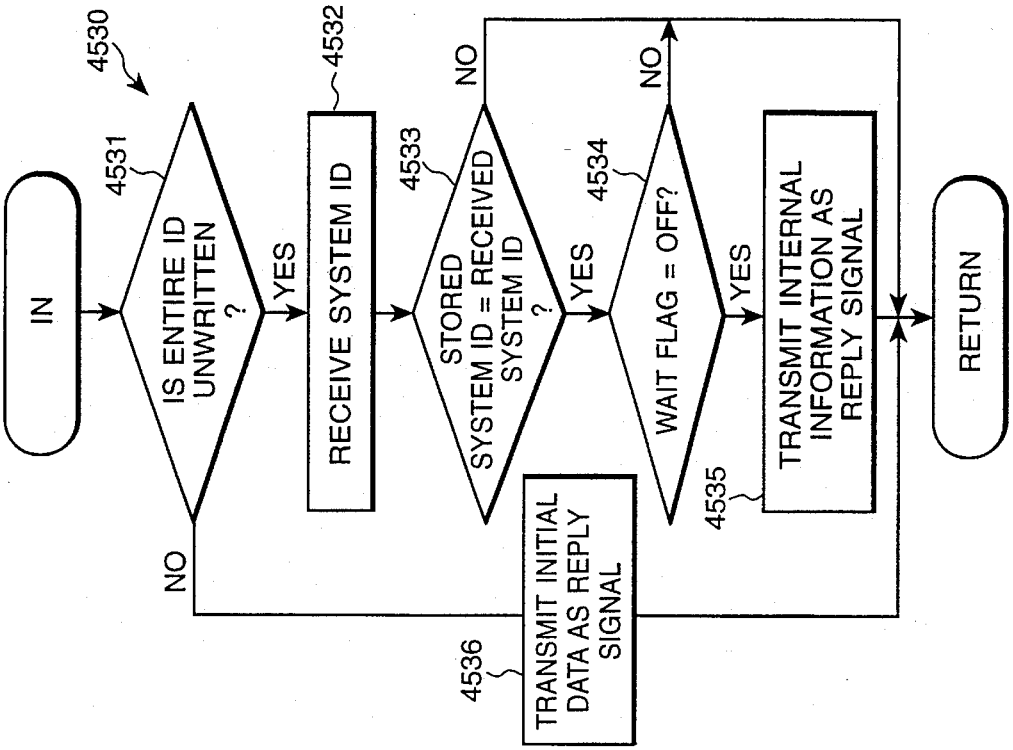
FIGS. 63 and 64 are flowcharts of details of blocks in FIG. 62.

FIG. 63 shows the details of the reading 6lock 4530 of FIG. 62. A first step 4531 in the reading block 4530 determines whether or not entire ID information has been written into the responding circuit 4002. When entire ID information has not yet been written into the responding circuit 4002, the program advances from the step 4531 to a step 4536. When entire ID information has been written into the responding circuit 4002, the program advances from the step 4531 to a step 4532. The step 4532 receives new system ID information which follows an interrogation signal S1. A step 4533 following the step 4532 determines whether or not the received new system ID information is equal to system ID information stored in a memory within the responding circuit 4002. When the received new system ID information is equal to the system ID information in the memory, the program advances from the step 4533 to a step 4534. Otherwise, the program advances from the step 4533 and then exits from the reading block 4530 before returning to the step 4502 of FIG. 62. The step 4534 determines whether or not the wait flag is in the OFF state. When the wait flag is in the OFF state, the program advances from the step 4534 to a step 4535. Otherwise, the program advances from the step 4534 and then exits from the reading block 4530 before returning to the step 4502 of FIG. 62. The step 4535 reads out entire ID information and data from the ID information area and the free area of the memory, and transmits the readout ID information and the data as a reply signal. After the step 4535, the program exits from the reading block 4530 and then returns to the step 4502 of FIG. 62. The step 4536 transmits given initial data as a reply signal. After the step 4536, the program exits from the reading block 4530 and then returns to the step 4502 of FIG. 62.

Figure 64:
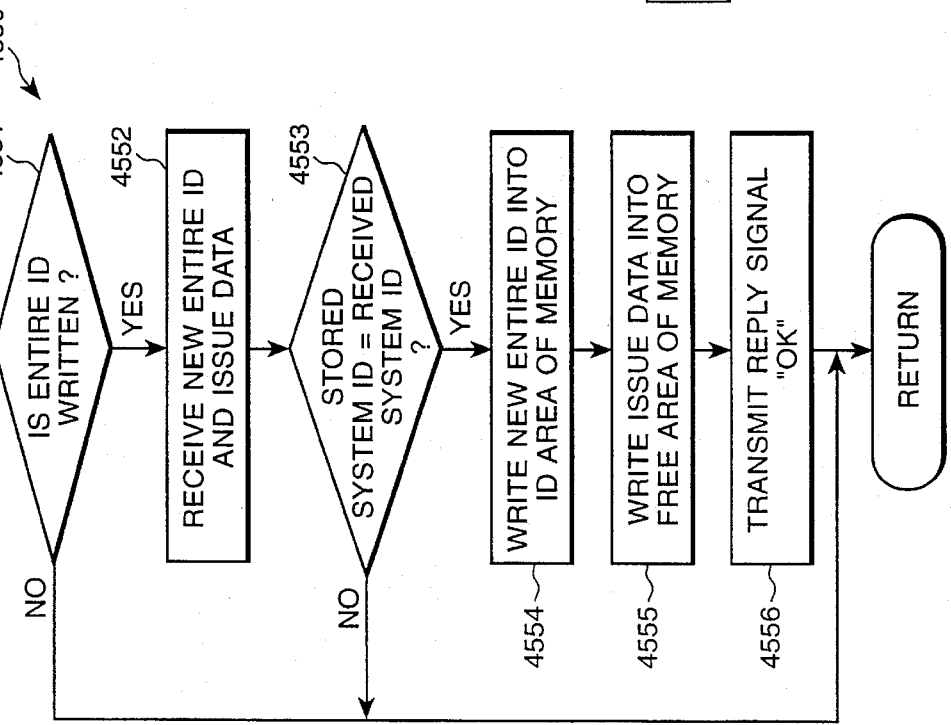

FIG. 64 shows the details of the reissuing block 4550 of FIG. 62. A first step 4551 in the reissuing block 4550 determines whether or not entire ID information has been written into the responding circuit 4002. When entire ID information has not yet been written into the responding circuit 4002, the program advances from the step 4551 and then exits from the reissuing block 4550 before returning to the step 4502 of FIG. 62. When entire ID information has been written into the responding circuit 4002, the program advances from the step 4551 to a step 4552. The step 4552 receives new entire ID information and issuing data. A step 4553 following the step 4552 determines whether or not the received new system ID information is equal to the system ID information stored in the memory within the responding circuit 4002. When the received new system ID information is equal to the system ID information in the memory, the program advances from the step 4553 to a step 4554. Otherwise, the program advances from the step 4553 and then exits from the reissuing block 4550 before returning to the step 4502 of FIG. 62. The step 4554 writes the received new entire ID information into the ID information area of the memory. A step 4555 following the step 4554 writes the received issuing data into the free area of the memory. A step 4556 following the step 4555 transmits a reply signal representing "OK", that is, representing that the reissuing process has been successfully completed. After the step 4556, the program exits from the reissuing block 4550 and then returns to the step 4502 of FIG. 62.

Figure 65:
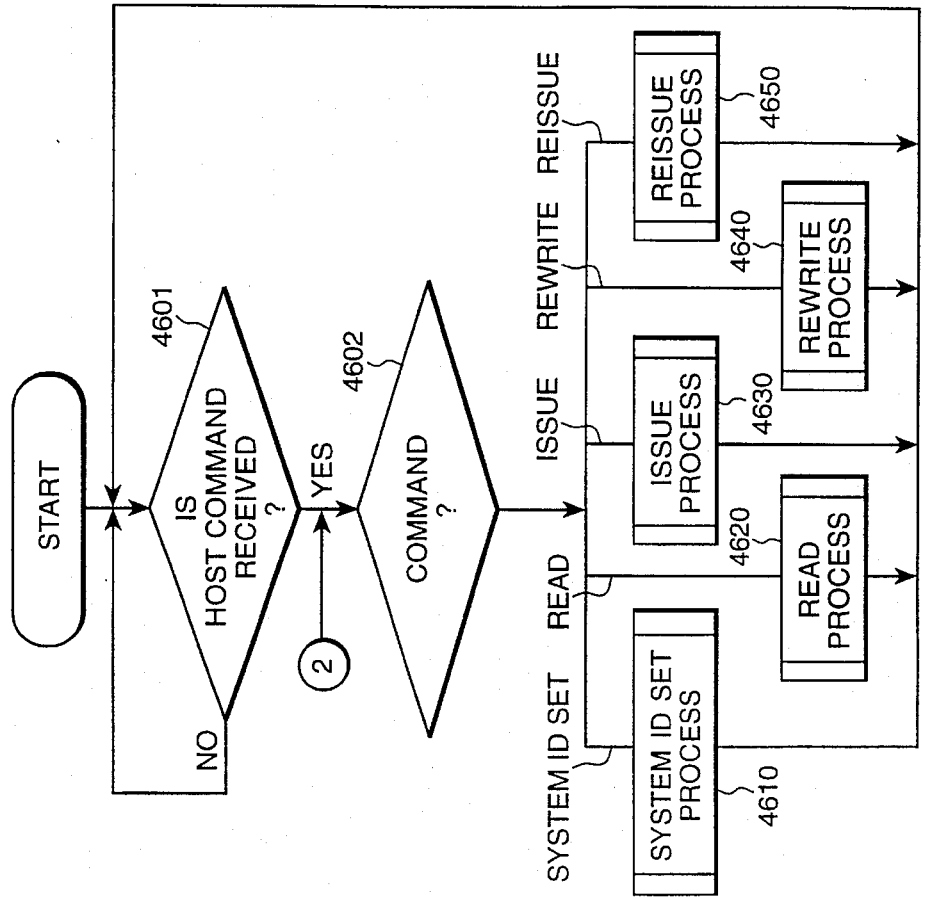
FIG. 65 is a flowchart of a program for controlling a CPU in an interrogator in the fourteenth embodiment.

A CPU 4016a within an interrogator 4001 (see FIG. 46) operates in accordance with a program stored in an internal ROM. FIG. 65 is a flowchart of this program.

As shown in FIG. 65, a first step 4601 of the program determines whether or not a host command is received from a host information processing device via an interface 4017 (see FIG. 46). When a host command is received, the program advances from the step 4601 to a step 4602. Otherwise, the step 4601 is repeated. In this way, a host command is waited. The step 4602 interprets the host command and detects a type of the host command. Generally, a host command is of five different types, that is, "ID setting", "reading", "issuing", "rewriting", and "reissuing". When the type of the host command corresponds to "ID setting", the program advances from the step 4602 to a block 4610 for a system ID setting process. When the type of the host command corresponds to "reading", the program advances from the step 4602 to a block 4620 for a reading process. When the type of the host command corresponds to "issuing", the program advances from the step 4602 to a block 4630 for an issuing process. When the type of the host command corresponds to "rewriting", the program advances from the step 4602 to a block 4640 for a rewriting process. When the type of the host command corresponds to "reissuing", the program advances from the step 4602 to a block 4650 for a reissuing process. After the blocks 4610, 4620, 4630, 4640, and 4650, the program returns to the step 4601. When given conditions are satisfied in the reading block 4620, the program returns from the reading block 4620 to the step 4602.

The ID setting block 4610 is similar to the ID setting block 4210 of FIGS. 54 and 55. The issuing block 4630 is similar to the issuing block 4230 of FIGS. 54 and 57. The rewriting block 4640 is similar to the rewriting block 4240 of FIGS. 54 and 58.

Figure 66:
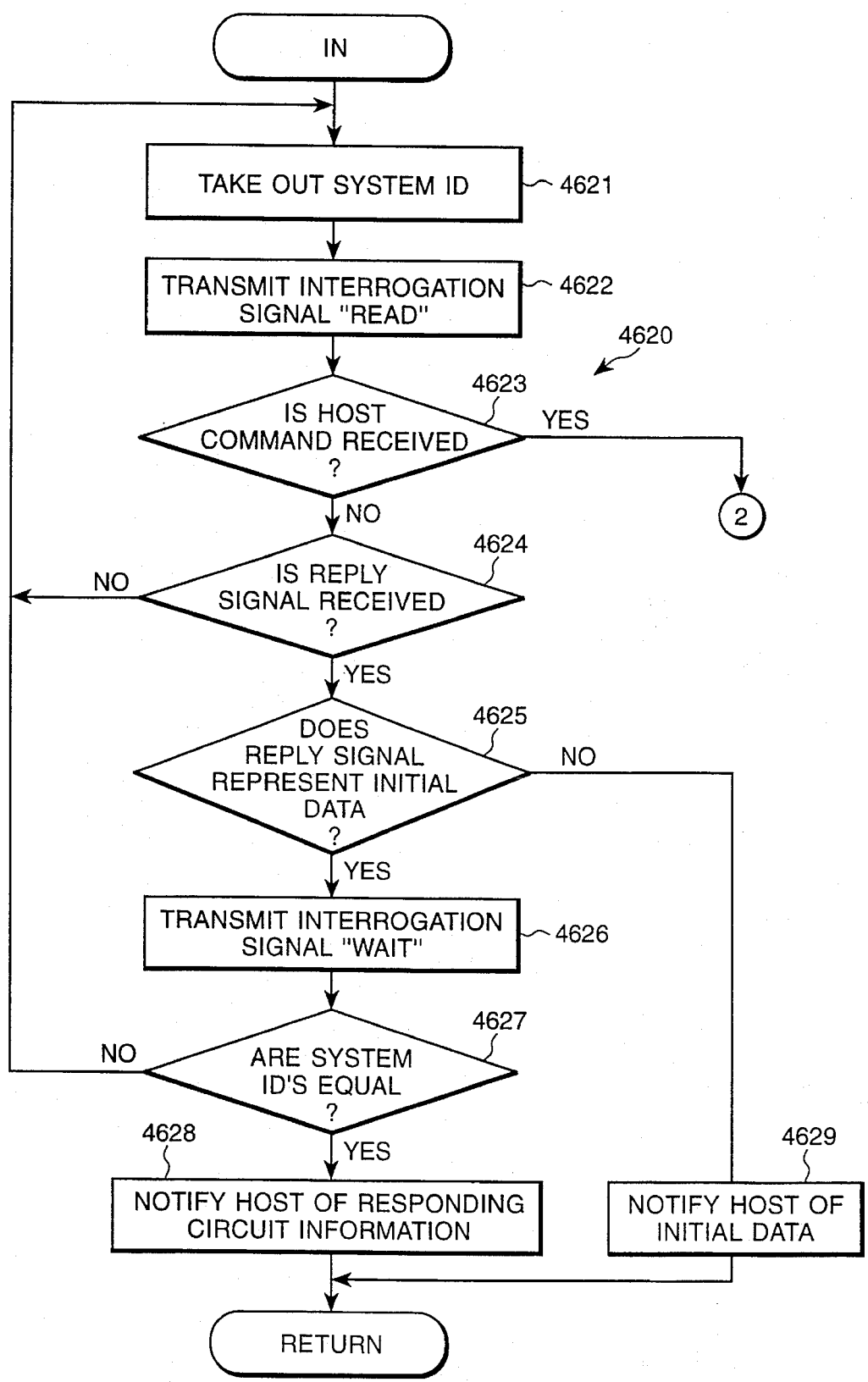

FIG. 66 shows the details of the reading block 4620 of FIG. 65. A first step 4621 in the reading block 4620 reads out system ID information from a system ID information setting section 4016b (see FIG. 46) of the interrogator 4001. A step 4622 following the step 4621 controls a modulator 4012 (see FIG. 46) within the interrogator 4001 to transmit an interrogation signal representative of a "reading" command and the readout system ID information toward a responding circuit 4002 within an information storage medium (a home-delivery slip 4003 or a nameplate 4004). A step 4623 following the step 4622 determines whether or not another host command is received from the host information processing device via the interface 4017. When another host command is received, the program advances from the step 4623 and then exits from the reading block 4620 before returning to the step 4602 of FIG. 65. Otherwise, the program advances from the step 4623 to a step 4624. The step 4624 determines whether or not a reply signal is received from a responding circuit 4002 within an information storage medium (a home-delivery slip 4003 or a nameplate 4004). When a reply signal is received, the program advances from the step 4624 to a step 4625. Otherwise, the program returns from the step 4624 to the step 4621. In this way, a reply signal is waited. The step 4625 determines whether or not the reply signal represents given initial data. When the reply signal represents the initial data, the program advances from the step 4625 to a step 4629. When the reply signal does not represent the initial data, the program advances from the step 4625 to a step 4626. The step 4626 derives entire ID information of the responding circuit 4002 from the received reply signal. Then, the step 4626 controls the modulator 4012 within the interrogator 4001 to transmit an interrogation signal representative of a "waiting" command toward the responding circuit 4002. A step 4627 following the step 4626 separates system ID information from the entire ID information of the responding circuit 4002. The step 4627 determines whether or not the system ID information of the responding circuit 4002 is equal to the system ID information stored in the system ID information setting section 4016b within the interrogator 4001. When the system ID information of the responding circuit 4002 is equal to the system ID information in the system ID information setting section 4016b, the program advances from the step 4627 to a step 4628. Otherwise, the program returns from the step 4627 to the step 4621. The step 4628 notifies the host information processing device of the received information of the responding circuit 4002. After the step 4628, the program exits from the reading block 4620 and then returns to the step 4601 of FIG. 65.

FIG. 67 shows the details of the reissuing block 4650 of FIG. 65. A first step 4651 in the issuing block 4650 receives new user setting ID information and issuing data from the host information processing device via the interface 4017. A step 4652 following the step 4651 combines the system ID information and the new user setting ID information into new entire ID information. A step 4653 following the step 4652 controls the modulator 4012 within the interrogator 4001 so that an interrogation signal representative of a "reissuing" command, the new entire ID information, and the issuing data will be transmitted toward a responding circuit 4002 within an information storage medium (a home-delivery slip 4003 or a nameplate 4004). A step 4654 following the step 4653 determines whether or not a reply signal representative of "OK" is received from the responding circuit 4002. When a reply signal of "OK" is received, the program advances from the step 4654 to a step 4655. Otherwise, the program advances from the step 4654 to a step 4656. The step 4655 notifies the host information processing device that the issuing process has been successfully completed. The step 4656 notifies the host information processing device of the occurrence of an error. After the steps 4655 and 4656, the program exits from the reissuing block 4650 and then returns to the step 4601 of FIG. 65.

As previously described, during the transmission of a "read" command from an interrogator 4001 to a responding circuit 4002, the interrogator 4001 adds system ID information to the transmitted "read" command. Only in the case where the received system ID information is equal to system ID information previously stored in the responding circuit 4002, the responding circuit 4002 transmits internally-stored information to the interrogator 4001 as a reply signal. This is advantageous in security regarding the internally-stored information of the responding circuit 4002, and also in reduction of radio communication interference.

As previously described, in the case where ID information has not yet been written into a responding circuit 4002, when a "reading" command is received, the responding circuit 4002 transmits given initial data to an interrogator 4001 as a reply signal. The interrogator 4001 notifies a host information processing device of the received initial data. Thus, the host information processing device can be advised that the responding circuit 4002 has not yet undergone an issuing process.

User setting ID information cam be reissued even after entire ID information has been written into a responding circuit 4002 by an issuing process. Accordingly, the assignment of nameplates 4004 (including responding circuits 4002) to workers can be suitably changed by reissuing user setting ID information. On the other hand, system ID information is protected after entire ID information has been written into a responding circuit 4002 by an issuing process. This is advantageous in the prevention of making a forgery of an information storage medium including a responding circuit 4002.

DESCRIPTION OF THE FIFTEENTH PREFERRED EMBODIMENT

With reference to FIGS. 68 and 69, a home-delivery slip 5001 includes slip pieces, such as a sender slip copy 5002, a delivery slip copy 5003, a processing slip copy 5004, and a recipient slip copy 5005, which have ends bonded together at a base 5070 to form a bundled configuration. The home-delivery slip 5001 has both a delivery slip function and an electronic tag function. The home-delivery slip 5001 has a perforated line 5010 extending near the base 5070 thereof. When the slip pieces 5002–5005 are cut along the perforated line 5010, major portions of the slip pieces 5002–5005 can be separated from the base 5070.

The sender slip copy 5002 has entry blanks 5006. After certain information is hand-written into the entry blanks 5006, the sender slip copy 5002 is separated from the home-delivery slip 5001 and is then given to a sender (requester). The other slip pieces 5003–5005 are affixed to a parcel to be delivered. The delivery slip copy 5003 is taken back upon the completion of the delivery of the related parcel. The processing slip copy 5004 is separated from the home-delivery slip 5001 during the delivery of the related parcel. The recipient slip copy 5005 is given to a recipient upon the completion of the delivery of the related parcel.

The home-delivery slip 5001 includes a responding circuit 5008 which is loaded by an external information writing device with parcel delivery information such as the names and addresses of a destination and a sender. The responding circuit 5008 transmits the parcel delivery information in response to an interrogation signal from an interrogator being an information reading device.

The responding circuit 5008 includes a winding (coil) 5007 for electromagnetic coupling, an antenna 5008a, an IC 5008b, and a battery 5008c. The winding 5007 is used in writing parcel delivery information into the responding circuit 5008. The antenna 5008a radiates and catches radio waves which carry data. The IC 5008b serves to control various circuits and store parcel information (parcel delivery information). The battery 5008c supplies electric power to the IC 5008b.

Figure 70:
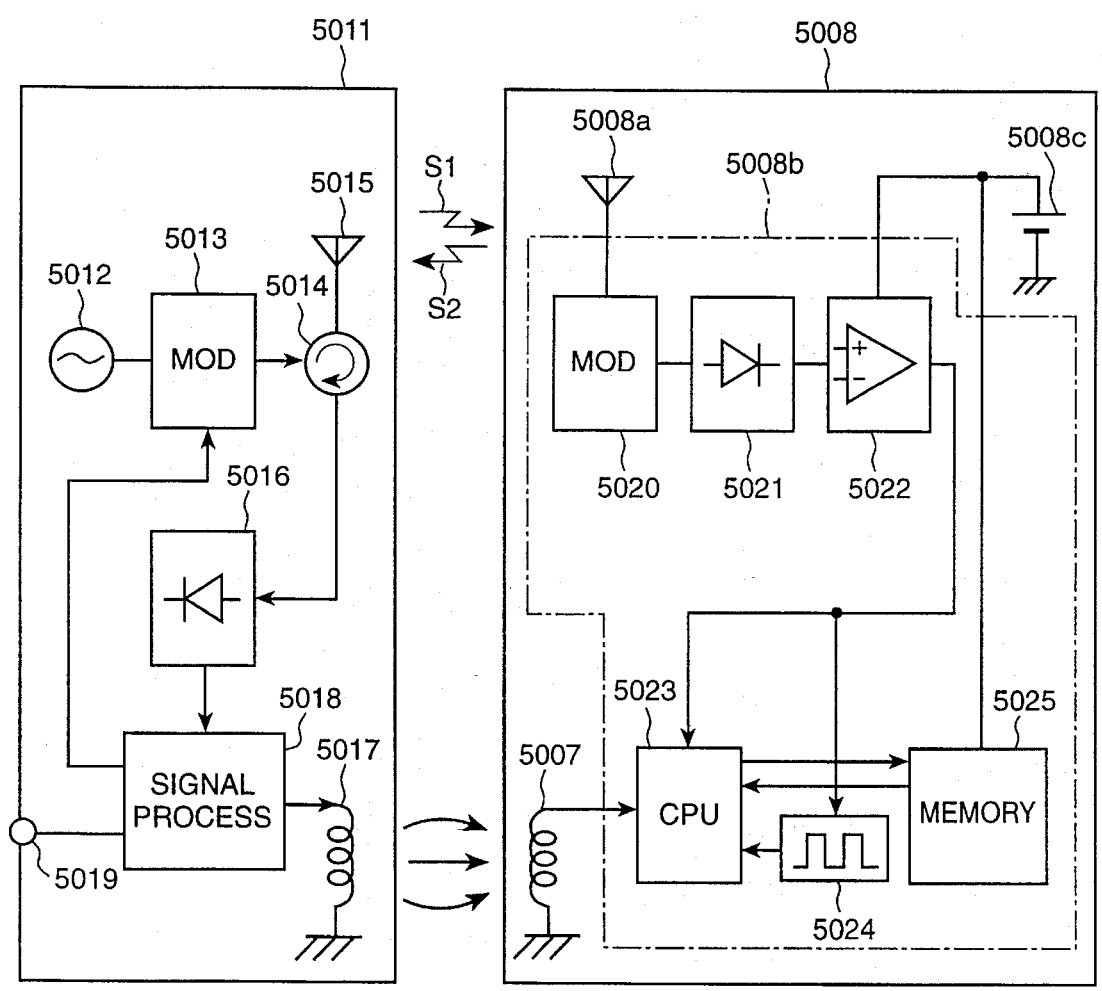
FIG. 70 is a diagram of an interrogator and a responding circuit in the fifteenth embodiment.

As shown in FIG. 70, the IC 5008b in the responding circuit 5008 includes a modulator 5020, a detector 5021, a level comparator 5022, a CPU 5023, a clock signal generator 5024, and a memory 5025. The level comparator 5022 includes an operational amplifier which compares the voltage of the output signal of the detector 5021 with a reference voltage. When the voltage of the output signal of the detector 5021 exceeds the reference voltage, the operational amplifier connects the battery 5008c to the CPU 5023 and the clock signal generator 5024. Otherwise, the operational amplifier disconnects the battery 5008c from the CPU 5023 and the clock signal generator 5024.

The memory 5025 is backed up by the battery 5008c. The memory 5025 stores a program for controlling the CPU 5023. The memory 5025 also serves to store received data representing information of a destination, information of a sender, and an identification (ID) number assigned to the responding circuit 5008. During the manufacture of the home-delivery slip 5001, the data of the identification (ID) number is written into the memory 5025. Generally, in the case where the home-delivery slip 5001 is subjected to an issuing process, information of an identification number and additional data to be written into the memory 5025 are transmitted to the responding circuit 5008. In this case, when the transmitted identification number is equal to the identification number stored in the memory 5025, the writing of the transmitted additional data into the memory 5025 is allowed. Accordingly, the additional data is prevented from being written into non-target home-delivery slips.

The winding 5007 for electromagnetic coupling is provided on the sender slip copy 5002. The other parts of the responding circuit 5008 are provided on the slip copies 5003–5005. As shown in FIGS. 68 and 69, the winding 5007 is electrically connected to the IC 5008b via conductors 5009a and 5009b provided on portions of the sender slip copy 5002 and the delivery slip copy 5003 which extend at the base 5070 of the home-delivery slip 5001. Accordingly, when the sender slip copy 5002 is cut along the perforated line 5010 and is separated from the home-delivery slip 5001, the winding 5007 and the IC 5008b are disconnected from each other. The home-delivery slip 5001 from which the sender slip copy 5002 has been removed is affixed to a parcel. FIG. 69 shows the home-delivery slip 5001 in such a state.

A slip issuing device which serves as an information writing device includes an interrogator 5011 shown in FIG. 70. The interrogator 5011 includes a carrier oscillator 5012, a modulator 5013, a circulator 5014, an antenna 5015, a demodulator 5016, a winding (coil) 5017 for electromagnetic coupling, a signal processor 5018, and an interface 5019. The carrier oscillator 5012 generates a carrier of transmission radio wave. The modulator 5013 superimpose information on the carrier generated by the carrier oscillator 5012. The circulator 5014 separates transmitted radio wave and received radio wave. The antenna 5015 radiates radio wave S1 and catches radio wave S2. The demodulator 5016 recovers information from the received radio wave. The winding 5017 can be electromagnetically coupled with the winding 5007 of a responding circuit 5008 on a home-delivery slip 5001. The winding 5017 is used in transmitting data to the responding circuit 5008 via the electromagnetic coupling between the windings 5007 and 5017. The signal processor 5018 functions to process information and to control the modulator 5013, the demodulator 5016, and the winding 5017.

The signal processor 5018 includes a computer having a CPU, a clock signal generator, and a memory. The signal processor 5018 executes information processing and also communication with an external host device via the interface 5019.

The interrogator 5011 receives a control signal and write data from the external host device via the interface 5019. The interrogator 5011 transmits the received control signal and the write data to the responding circuit 5008 on a home-delivery slip 5001. In the interrogator 5011, the signal processor 5018 feeds the received control signal to the modulator 5013 and the winding 5017. The carrier oscillator 5012 feeds the carrier to the modulator 5013. The modulator 5013 modulates the carrier with the control signal, thereby superimposing the control signal on the carrier and thus converting the carrier into transmission radio wave S1 representative of the control signal. The transmission radio wave S1 which carries the control signal is fed from the modulator 5013 to the antenna 5015 via the circulator 5014, and is then radiated from the antenna 5015. The signal processor 5018 feeds the received write data to the modulator 5013 and the winding 5017. The modulator 5013 modulates the carrier with the write data, thereby superimposing the write data on the carrier and thus converting the carrier into transmission radio wave S1 representative of the write data. The transmission radio wave S1 which carries the write data is fed from the modulator 5013 to the antenna 5015 via the circulator 5014, and is then radiated from the antenna 5015.

When the interrogator 5011 transmits an interrogation radio wave signal S1 to the responding circuit 5008 on a home-delivery slip 5001 in this way, the responding circuit 5008 returns a reply radio wave signal S2 to the interrogator 5011. In the interrogator 5011, the reply radio wave signal S2 is caught by the antenna 5015, being fed via the circulator 5014 to the demodulator 5016. The demodulator 5016 recovers information from the reply radio wave signal S2, and outputs the recovered information to the signal processor 5018. The recovered information is processed by the signal processor 5018. The resultant of the information processing is outputted from the signal processor 5018 to the external host device via the interface 5019.

The responding circuit 5008 on a home-delivery slip 5001 operates as follows. An interrogation radio wave signal S1 is caught by the antenna 5008a and is then fed to the detector 5021. The detector 5021 recovers information from the interrogation radio wave signal S1. The detector 5021 outputs the recovered information to the level comparator 5022 and the CPU 5023. The level comparator 5022 compares the voltage of the output signal of the detector 5021 with the reference voltage. When the voltage of the output signal of the detector 5021 exceeds the reference voltage, the level comparator 5022 connects the battery 5008c to the CPU 5023 and the clock signal generator 5024. As a result, the CPU 5023 and the clock signal generator 5024 start to operate.

The CPU 5023 operates in accordance with the program stored in the memory 5025. Specifically, the CPU 5023 determines a type of the recovered information (which is contained in the interrogation radio wave signal S1 ). In the case where the recovered information corresponds to a "reading" command, the CPU 5023 reads out data from the memory 5025 in response to the clock signal generated by the clock signal generator 5024. The CPU 5023 generates a modulating signal depending on the readout data. The CPU 5023 outputs the modulating signal to the modulator 5020. Conductive/unconductive conditions of a diode within the modulator 5020 vary in accordance with the modulating signal, causing an impedance change and modulating the currently-received radio wave with the modulating signal. Thus, the currently-received radio wave is modulated into reply radio wave representing the data read out from the memory 5025. The reply radio wave is radiated back from the antenna 5008a.

In the case where the recovered information corresponds to a "writing" command, the CPU 5023 receives various data, such as write data representing a destination and reference data representing an identification number, from the interrogator 5011 via the electromagnetic coupling between the windings 5007 and 5017. The CPU 5023 stores the received data into a predetermined area of the memory 5025.

Figure 71:
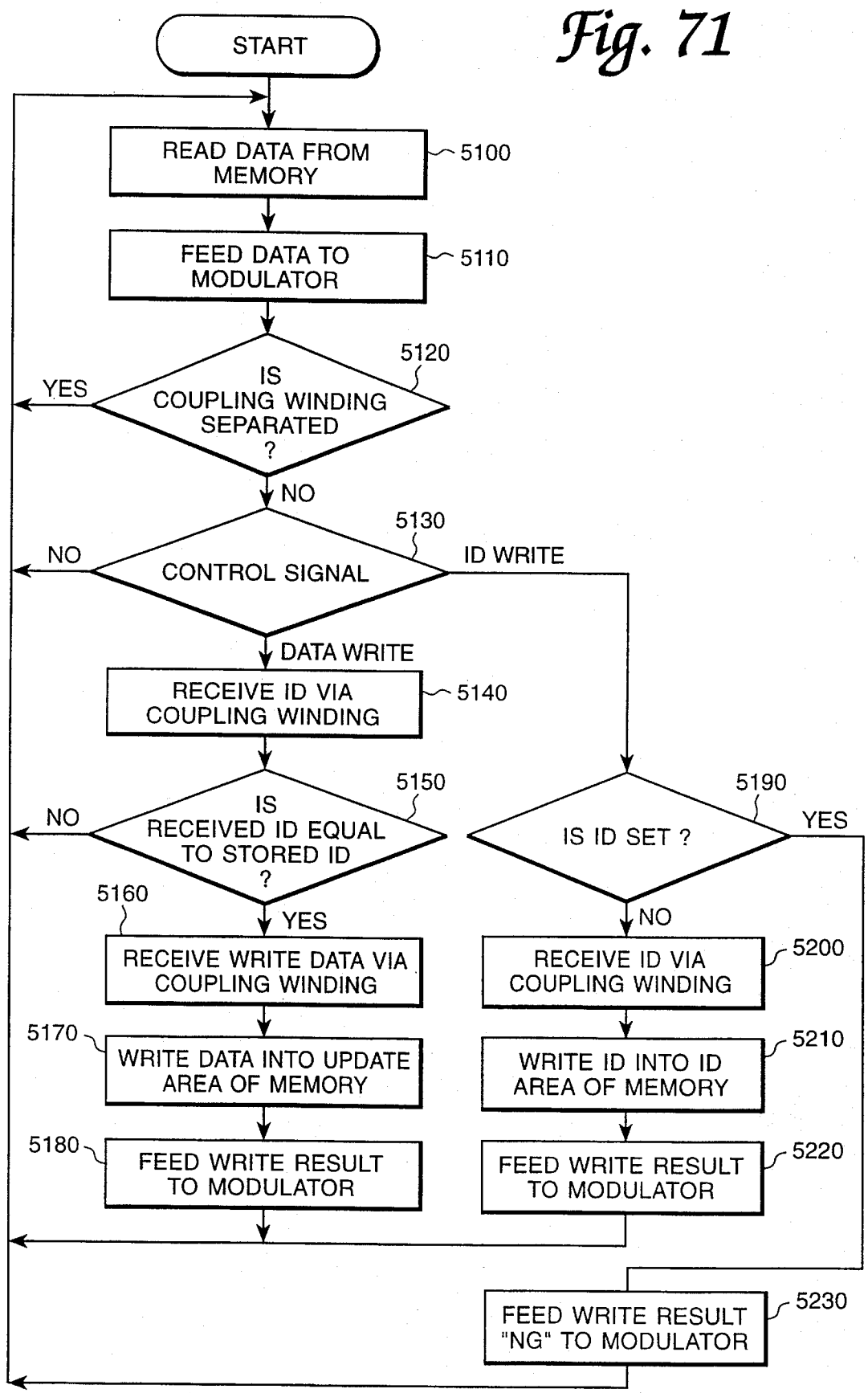
FIG. 71 is a flowchart of a program for controlling a CPU in the responding circuit in the fifteenth embodiment.

As previously described, the CPU 5023 operates in accordance with the program stored in the memory 5025. FIG. 71 is a flowchart of a segment of this program. As shown in FIG. 71, a first step 5100 of the segment of the program reads out data from the memory 5025. The readout data includes data representing an identification (ID) number. A step 5110 following the step 5100 feeds the readout data to the modulator 5020. A step 5120 following the step 5110 determines whether or not the winding 5007 is uncoupled from the winding 5017 of an interrogator 5011. When the winding 5007 is uncoupled from the winding 5017, the program returns from the step 5120 to the step 5100. When the winding 5007 is coupled with the winding 5017, the program advances from the step 5120 to a step 5130.

The step 5130 receives a control signal from an interrogator via the electromagnetic coupling between the windings 5007 and 5017. The step 5130 interprets or decodes the received control signal. When the received control signal represents a command of writing data, the program advances from the step 5130 to a step 5140. When the received control signal represents a command of writing an identification (ID) number, the program advances from the step 5130 to a step 5190. In the absence of an effective received control signal, the program returns from the step 5130 to the step 5100.

The control signal representing a command of writing data is transmitted from an interrogator 5011. The step 5140 receives information of an identification number from the interrogator 5011 via the electromagnetic coupling between the windings 5007 and 5017. A step 5150 following tile step 5140 determines whether or not the identification number currently received from the interrogator 5011 is equal to the identification number read out from the memory 5025. When the currently-received identification number is equal to the identification number read out from the memory 5025, the program advances from the step 5150 to a step 5160. Otherwise, the program returns from the step 5150 to the step 5100. The step 5160 receives write data from the interrogator 5011 via the electromagnetic coupling between the windings 5007 and 5017. A step 5170 following the step 5160 stores the write data into an area of the memory 5025. The write data represents parcel delivery information containing information of a destination. A step 5180 following the step 5170 determines whether or not the storing of the write data has been successfully completed. The step 5180 feeds the modulator 5020 with a signal representing a result of the determination. After the step 5180, the program returns to the step 5100.

The sequence of the above-mentioned steps 5100–5180 is executed when a slip issuing device performs a slip issuing process.

During the manufacture of a home-delivery slip 5001, the control signal which represents a command of writing an identification number is transmitted to the responding circuit 5008 from an interrogator (not shown) similar in design to the interrogator 5011 of FIG. 70. This control signal is designed for a preliminary process executed prior to a slip issuing process. The step 5190 determines whether or not an identification number has been set. When an identification number has been set, the program advances from the step 5190 to a step 5230. When an identification number has not yet been set, the program advances from the step 5190 to a step 5200. The step 5200 receives data of an identification number via the electromagnetic coupling which includes the winding 5007. A step 5210 following the step 5200 writes the received data of the identification number into an identification number area of the memory 5025. A step 5220 following the step 5210 determines whether or not the writing of the identification number data has been successfully completed. The step 5220 feeds the modulator 5020 with a signal representing a result of the determination. After the step 5220, the program returns to the step 5100. The step 5230 feeds the modulator 5020 with a signal representing a negative state (NG) as a result of the writing process.

The sequence of the above-mentioned steps 5190–5230 enables a suitable identification number to be assigned to a responding circuit 5008 on each home-delivery slip 5001. Responding circuits 5008 on home-delivery slips 5001 can be identified by using assigned identification numbers.

A home-delivery slip 5001 is used as follows. At a private parcel receiving center to send a parcel, information of a destination and a sender is hand-written into the entry blanks 5006 of the home-delivery slip 5001. The sender slip copy 5002 is cut along the perforated line 5010, being separated from the home-delivery slip 5001. The sender slip copy 5002 is given to the sender. As a result of the separation of the sender slip copy 5002 from the home-delivery slip 5001, the winding 5007 and the IC 5008b are disconnected from each other. Thus, the responding circuit 5008 can not receive identification number data and write data via the winding 5007 any more so that the identification number data and the write data which have been previously stored in the responding circuit 5008 can be protected. The home-delivery slip 5001 from which the sender slip copy 5002 has been removed is affixed to a parcel given by the sender.

Parcels with home-delivery slips 5001 are transported from private parcel receiving centers to a delivery center. In the delivery center, parcels are sequentially carried by a belt conveyor which is a part of a sorting line. Interrogators 5011 are located at given positions of the sorting line. When a responding circuit 5008 of a home-delivery slip 5001 on a parcel receives an interrogation radio wave signal from an interrogator 5011, the responding circuit 5008 transmits a reply radio wave signal representing parcel delivery information stored in the memory 5025. The parcel delivery information contains information of a destination. The interrogator 5011 receives the reply radio wave signal and derives the parcel delivery information therefrom. The sorting line is controlled in response to the parcel delivery information derived by the interrogator 5011 so that the parcels can be automatically sorted according to the areas of the destinations of delivery thereof.

DESCRIPTION OF THE SIXTEENTH PREFERRED EMBODIMENT

Figure 72:
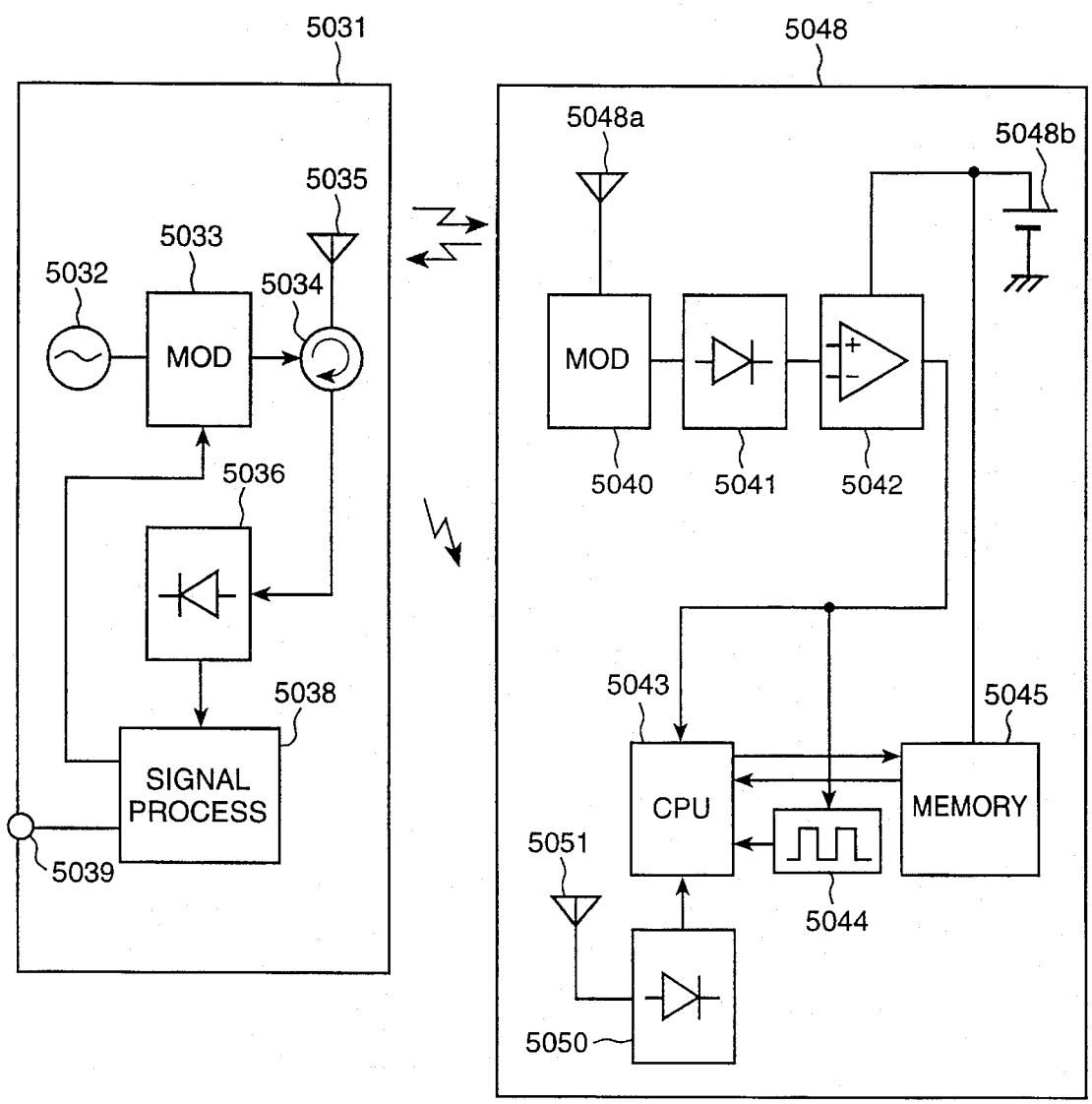
FIG. 72 is a diagram of an interrogator and a responding circuit in a sixteenth embodiment of this invention.

FIG. 72 shows a sixteenth embodiment of this invention which is similar to the embodiment of FIGS. 68–71 except for design changes indicated hereinafter. As shown in FIG. 72, the sixteenth embodiment includes an interrogator 5031 which has a carrier oscillator 5032, a modulator 5033, a circulator 5034, an antenna 5035, a demodulator 5036, a signal processor 5038, and an interface 5039. The interrogator 5031 is similar to the interrogator 5011 of FIG. 70 except that the winding 5017 for electromagnetic coupling is omitted. The interrogator 5031 transmits write data and identification number data by radio using the modulator 5033 and the antenna 5035.

The sixteenth embodiment also includes a responding circuit 5048 which has an antenna 5048a, a modulator 5040, a detector 5041, a level comparator 5042, a CPU 5043, a clock signal generator 5044, a memory 5045, and a battery 5048. The responding circuit 5048 further has a demodulator 5050 and an antenna 5051. The responding circuit 5048 is similar to the responding circuit 5008 of FIG. 70 except that the winding 5007 for electromagnetic coupling is omitted and the demodulator 5050 and the antenna 5051 are added. The demodulator 5050 is connected between the antenna 5051 and the CPU 5043.

Radio wave representing write data and identification number data is transmitted from the interrogator 5031. The radio wave transmitted from the interrogator 5031 is caught by the antenna 5051 of the responding circuit 5048. The radio wave is fed from the antenna 5051 to the demodulator 5050. The write data and the identification number data are recovered from the radio wave by the demodulator 5050. The recovered write data and the recovered identification number data are outputted from the demodulator 5050 to the CPU 5043.

DESCRIPTION OF THE SEVENTEENTH PREFERRED EMBODIMENT

Figure 73:
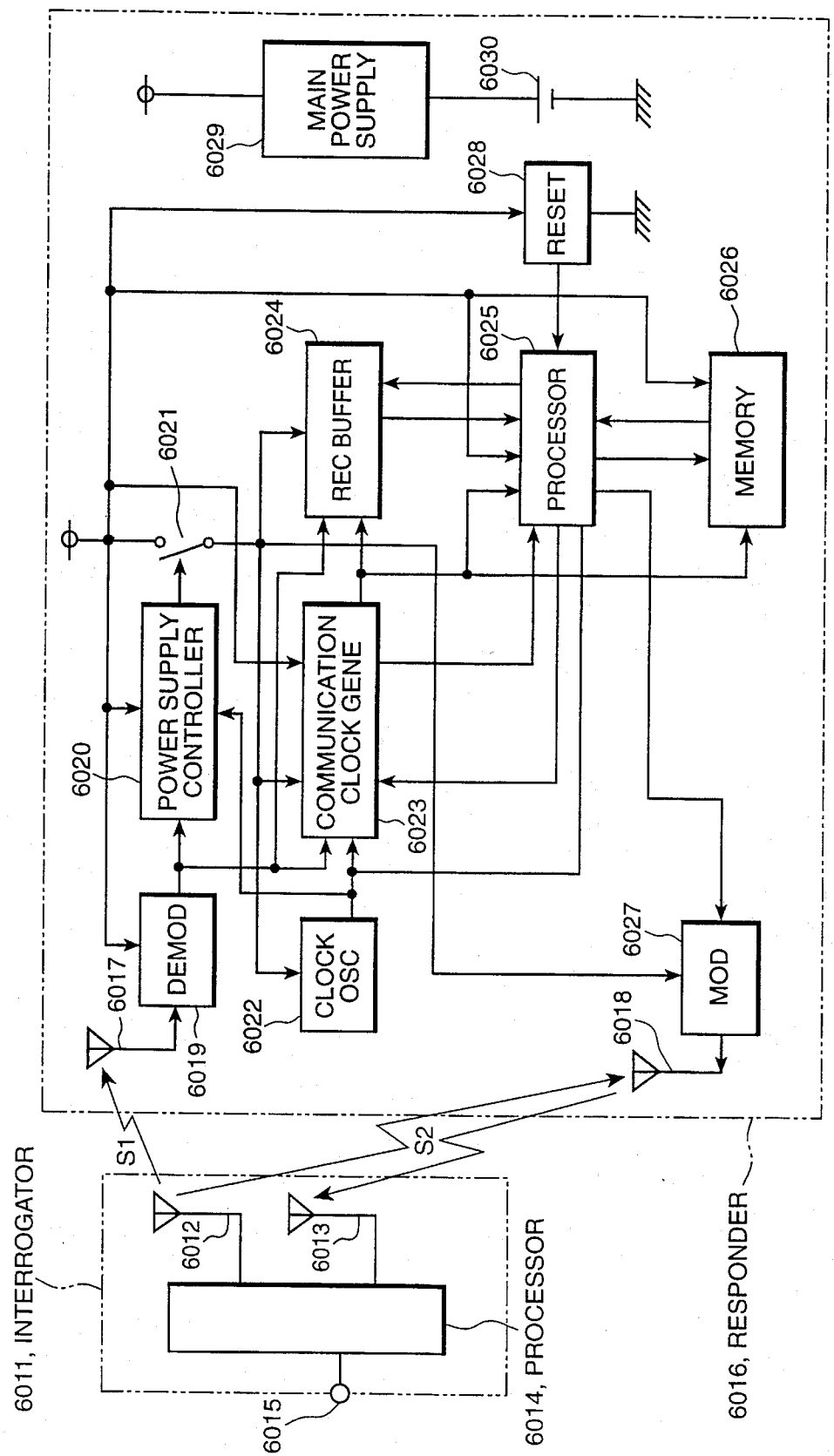
FIG. 73 is a diagram of an interrogator and a responder in a seventeenth embodiment of this invention.

With reference to FIG. 73, an interrogator 6011 includes antennas 6012 and 6013 and a processor 6014. The antenna 6012 is used in radiating an interrogation radio wave signal S1. The antenna 6013 catches a reply radio wave signal S2. The processor 6014 generates the interrogation signal S1 and feeds it to the antenna 6012. In addition, the processor 6014 analyzes and processes the reply signal S2 caught by tile antenna 6013. The interrogator 6011 has an input/output terminal 6015 via which a signal for the recognition of an interrogation signal S1 is transmitted to the processor 6014.

A responder 6016 includes antennas 6017 and 6018. The antenna 6017 catches an interrogation radio wave signal S1. The antenna 6018 also catches the interrogation radio wave signal S1. The antenna 6018 is used in modulating the carrier of the received interrogation signal S1 and simultaneously reflecting the modulated carrier as a reply radio wave signal S2.

In the responder 6016, a demodulator 6019 extracts a received waveform (baseband components) from the interrogation signal S1 caught by the antenna S1. A switch 6021 disposed in a power supply line selectively connects and disconnects a power supply to major portions of the responder 6016. A power supply controller 6020 turns on and off (that is, closes and opens) the switch 6021 and thereby controls the connection of an internal power supply in response to the output signal of the demodulator 6019 which represents the received waveform. A clock oscillator 6022 of the CR type generates a basic clock signal having a predetermined frequency. A communication clock signal generator 6023 receives the output signal of the demodulator 6019 which represents the received waveform. The communication clock signal generator 6023 receives the basic clock signal from the clock oscillator 6022. The communication clock signal generator 6023 produces a communication clock signal at a given timing on the basis of the output signal of the demodulator 6019 and the basic clock signal. A reception buffer 6024 receives the output signal of the demodulator 6019 which represents the received waveform. The reception buffer 6024 receives the communication clock signal from the communication clock signal generator 6023. The reception buffer 6024 extracts data from the received waveform by using the communication clock signal. The reception buffer 6024 temporarily stores the extracted data.

In the responder 6016, a processor 6025 decodes the data stored in the reception buffer 6024. A memory 6026 connected to the processor 6025 stores internal information. The processor 6025 transfers a signal of the internal information from the memory 6026 to a modulator 6027. The modulator 6027 generates a reply radio wave signal S2 on the basis of the signal of the internal information, and feeds the generated signal S2 to the antenna 6018. A power on reset circuit 6028 outputs a reset signal to the processor 6025 when a main power supply circuit 6029 is turned on. The main power supply circuit 6029, which is connected to a battery 6030, is turned on and off to enable and inhibit the feed of electric power to all the portions of the responder 6016.

Figure 74:
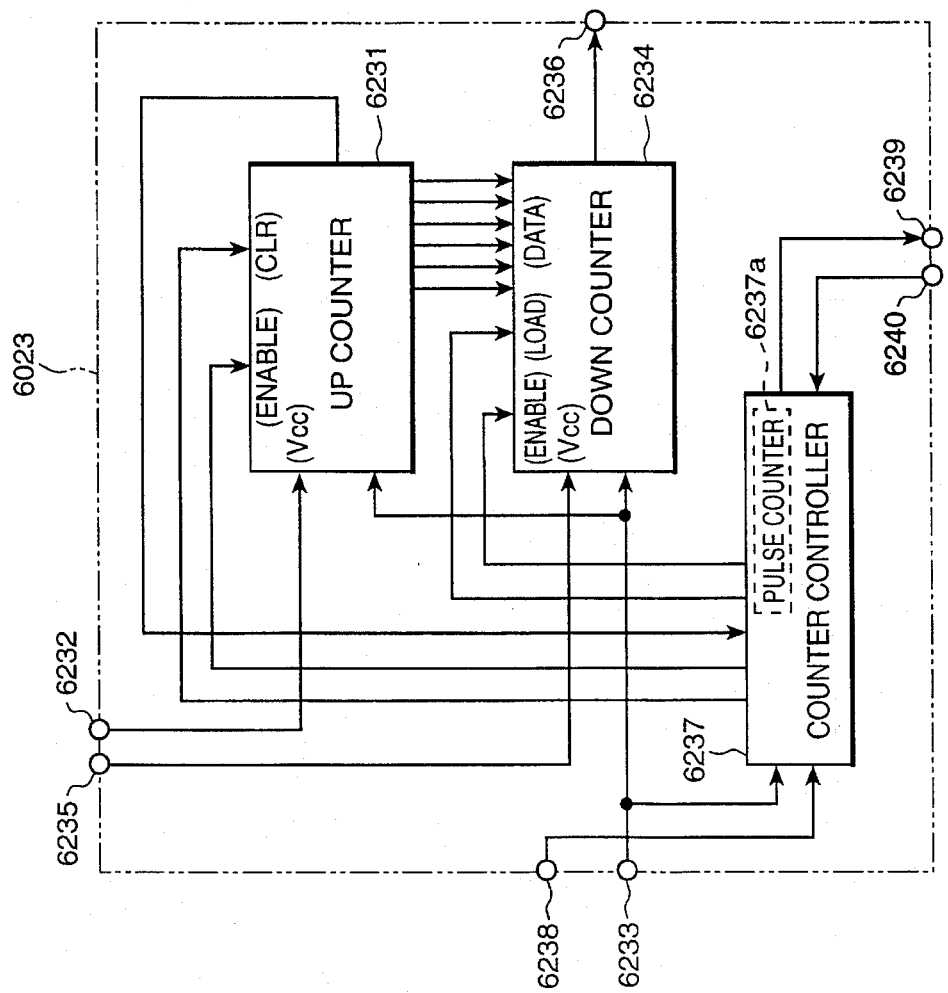
FIG. 74 is a block diagram of a communication clock signal generator in the seventeenth embodiment.

As shown in FIG. 74, the communication clock signal generator 6023 includes an up counter 6231 and a down counter 6234. The up counter 6231 receives electric power via a main power supply terminal 6232. In the case where the up counter 6231 receives the electric power and its enable terminal receives an active signal, the up counter 6231 counts pulses of the basic clock signal fed via a clock input terminal 6233. The up counter 6231 outputs a count value signal representing the number of the counted pulses. The down counter 6234 receives electric power via an operation power supply terminal 6235. In the case where the down counter 6234 receives the electric power and its enable terminal receives an active signal, when a signal applied to its load terminal changes to an active state, the down counter 6234 samples and holds the count value signal outputted from the up counter 6231. Then, the down counter 6234 counts pulses of the basic clock signal fed via the clock input terminal 6233. When the number of the counted pulses reaches the number represented by the held count value signal, the down counter 6234 outputs a pulse of a communication clock signal to a communication clock output terminal 6236. A counter controller 6237 including a pulse counter 6237a initializes the up counter 6231 and the down counter 6234, and controls timings at which the up counter 6231 and the down counter 6234 start to count pulses.

The counter controller 6237 receives the received waveform signal from the demodulator 6019 via a received data input terminal 6238. The counter controller 6237 receives the basic clock signal from the clock oscillator 6022 via the clock input terminal 6233. The communication clock signal outputted from the down counter 6234 is fed via the communication clock output terminal 6236 to portions of the responder 6016. The counter controller 6237 notifies, via a condition notification output terminal 6239, the processor 6025 of conditions of signal processing by the communication clock signal generator 6023. The counter controller 6237 receives control information from the processor 6025 via a control terminal 6240. When the main power supply circuit 6029 is turned on, the up counter 6231 is connected to the battery 6030 via the main power supply terminal 6232. When the switch 6021 is turned on by the power supply controller 6020, the down counter 6234 is connected to the battery 6030 via the operation power supply terminal 6235.

Figure 75:
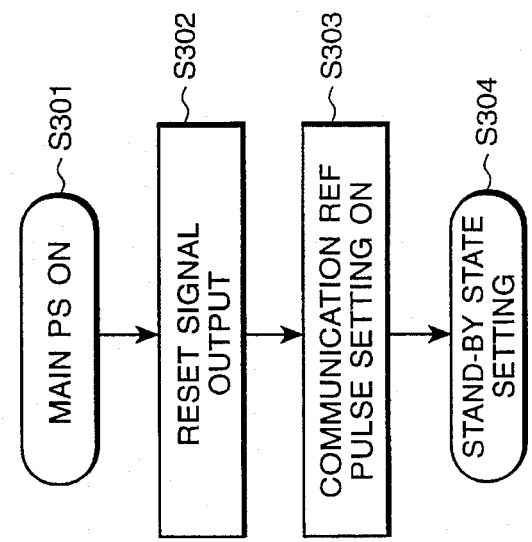
FIG. 75 is a flow diagram of operation of the responder in the seventeenth embodiment.

The responder 6016 operates as follows. When the responder 6016 remains unused, the main power supply circuit 6029 continues to be in an OFF state. Thus, the consumption of electric power of the battery 6030 is suppressed. With reference to FIG. 75, when the main power supply circuit 6029 is turned on at a stage S301, the battery 6030 is connected to the demodulator 6019, the power supply controller 6020, the processor 6025, the power on reset circuit 6028, and others. As a result, the power on reset circuit 6028 outputs a reset signal to the processor 6025 at a stage S302. Then, at a stage S303, the processor 6025 provides the communication clock signal generator 6023 with setting for the reception of a communication reference pulse in response to the reset signal. As a result, the responder 6016 falls into a stand-by state at a stage S304.

The operation of the responder 6016 which occurs at the stages S302 and S303 is completed during an interval for which the power supply controller 6020 remains in an OFF state after the main power supply circuit 6029 is turned on. After this interval terminates, the responder 6016 moves into the stand-by state.

Figure 76:
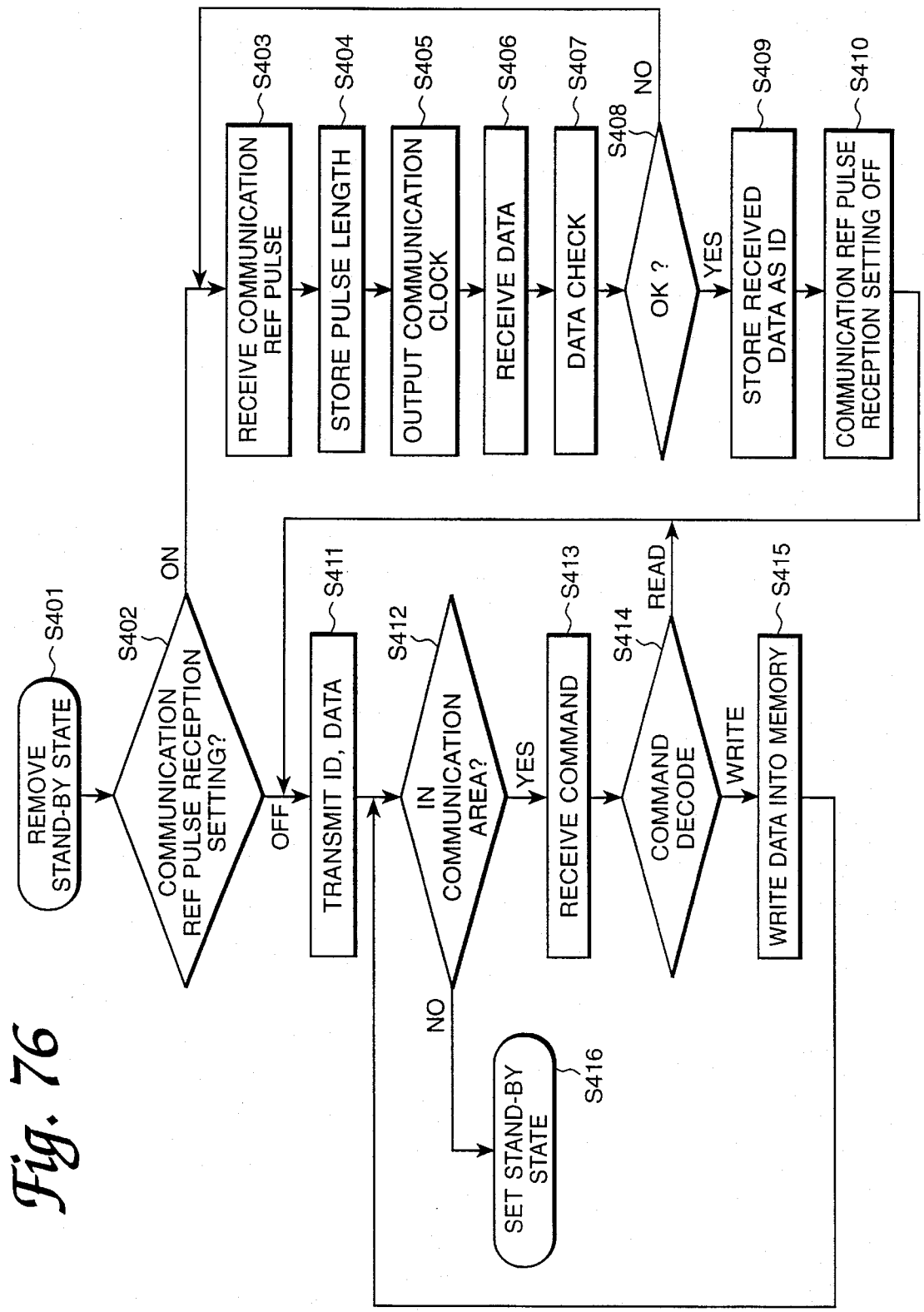
FIG. 76 is a flow diagram of operation of the responder in the seventeenth embodiment.

The interrogator 6011 transmits an interrogation signal S1 containing a communication reference pulse and ID number information. The antenna 6017 of the responder 6016 catches the interrogation signal S1, and feeds the received interrogation signal to the demodulator 6019. As a result, the received waveform signal outputted from the demodulator 6019 changes to a high level. With reference to FIG. 76, at a stage S401, the power supply controller 6020 moves the responding circuit 6016 from the stand-by state in response to the high-level signal from the demodulator 6019. Specifically, the power supply controller 6020 turns on the switch 6021 so that the battery 6030 is connected to the clock oscillator 6022, the reception buffer 6024, and others.

When the processor 6025 is connected to the battery 6030, the processor 6025 starts to operate. The processor 6025 operates in accordance with a program stored in a ROM. After the processor 6025 starts to operate, the processor 6025 determines whether or not the setting for the reception of a communication reference pulse is provided at a stage S402. In this case, since the setting for the reception of a communication reference pulse is provided, the processor 6025 enables the communication clock signal generator 6023 to receive a communication reference pulse, that is, a communication reference signal, which is contained in a head of the interrogation signal S1 at a stage S403. Thereby, the communication clock signal generator 6023 measures the time length of the communication reference pulse (the time length determined by the communication reference pulse), which is a communication reference time width, by counting pulses of the basic clock signal outputted from the clock oscillator 6022. The number of the counted pulses, that is, the measured time length of the communication reference pulse, is stored at a stage S404.

Subsequently, the communication clock signal generator 6023 produces a communication clock signal on the basis of the stored counted pulse number. The communication clock signal is synchronous with the received waveform represented by the output signal of the demodulator 6019. At a stage S405, the communication clock signal generator 6023 outputs the communication clock signal to the reception buffer 6024, the processor 6025, and others. Thereby, the processor 6025 detects and recovers data and check code contained in the interrogation signal S1 at a stage S406. At stages S407 and S408, the processor 6025 determines whether or not the received data is correct by referring to the check code. When the received data is correct, the processor 6025 stores the received data into the memory 6026 as an ID number at a stage S409. Then, the processor 6025 removes the setting for the reception of a communication reference pulse at a stage S410.

An interrogation signal S1 for registering an ID number into a responder 6016 is generated as follows. A host device for controlling an interrogator 6011 judges states of responders 6016 within a communication area around the interrogator 6011, and examines and determines ID numbers to be written into the responders 6016. The host device informs the interrogator 6011 of an ID transmission command and a determined ID number via the input/output terminal 6015 thereof. The processor 6014 in the interrogator 6011 generates an interrogation signal S1 in response to the ID transmission command and the ID number fed from the host device. The interrogation signal S1 has a communication reference pulse at its head. In the interrogation signal S1, the communication reference pulse is followed by a waveform which results from the encoding of the ID number (see the part (a) of FIG. 78).

In the case where the setting for the reception of a communication reference pulse is absent when the responder 6016 receives an interrogation signal S1 from the interrogator 6011, the processor 6025 reads out data of an ID number (ID code) from the memory 6026 and feeds the ID number data to the modulator 6027 as serial data according to the communication clock signal outputted by the communication clock signal generator 6023 (see a stage S411 of FIG. 76). The modulator 6027 modulates the carrier of the interrogation signal caught by the antenna 6018 in accordance with the ID number serial data. Thus, the carrier of the interrogation signal is converted into a reply radio wave signal S2 which represents the ID number. The reply signal S2 is radiated from the antenna 6018.

Subsequently, the responder 6016 determines whether or not an interrogation signal S1 is received, that is, whether or not the responder 6016 is in a communication area around an interrogator 6011, at a stage S412. When the responder 6016 is outside a communication area, the responder 6016 falls into the stand-by state. On the other hand, when the responder 6016 is in a communication area, a command and data extracted from the received interrogation signal S1 are stored into the reception buffer 6024 at a stage S413. Then, the processor 6025 decodes the command in the reception buffer 6024 at a stage S414. When the decoded command is "reading", the responder 6016 transmits the stored ID code and data as a reply radio wave signal S2 at the stage S411. When the decoded command is "writing", the processor 6025 transfers the data from the reception buffer 6024 to the memory 6026 at a stage S415. Then, the responder 6016 determines again whether or not the responder 6016 is in a communication area around an interrogator 6011 at the stage S412.

The operation of the communication clock signal generator 6023 will be described in detail hereinafter. The communication clock signal generator 6023 outputs the communication clock signal to the reception buffer 6024, the processor 6025, and the memory 6026. The communication clock signal is used in decoding the received waveform into data. The communication clock signal generator 6023 includes the counter controller 6237 which controls the up counter 6231 and the down counter 6234 in response to controls signals fed via the control terminal 6240. Even when the responder 6016 is in the stand-by state, a signal or data in the up counter 6231 is backed up by electric power fed via the main power supply terminal 6232. When the down counter 6234 receives electric power via the operation power supply terminal 6235, the down counter 6234 starts to operate so that the communication clock signal generator 6023 commences effective signal processing.

Figure 77:
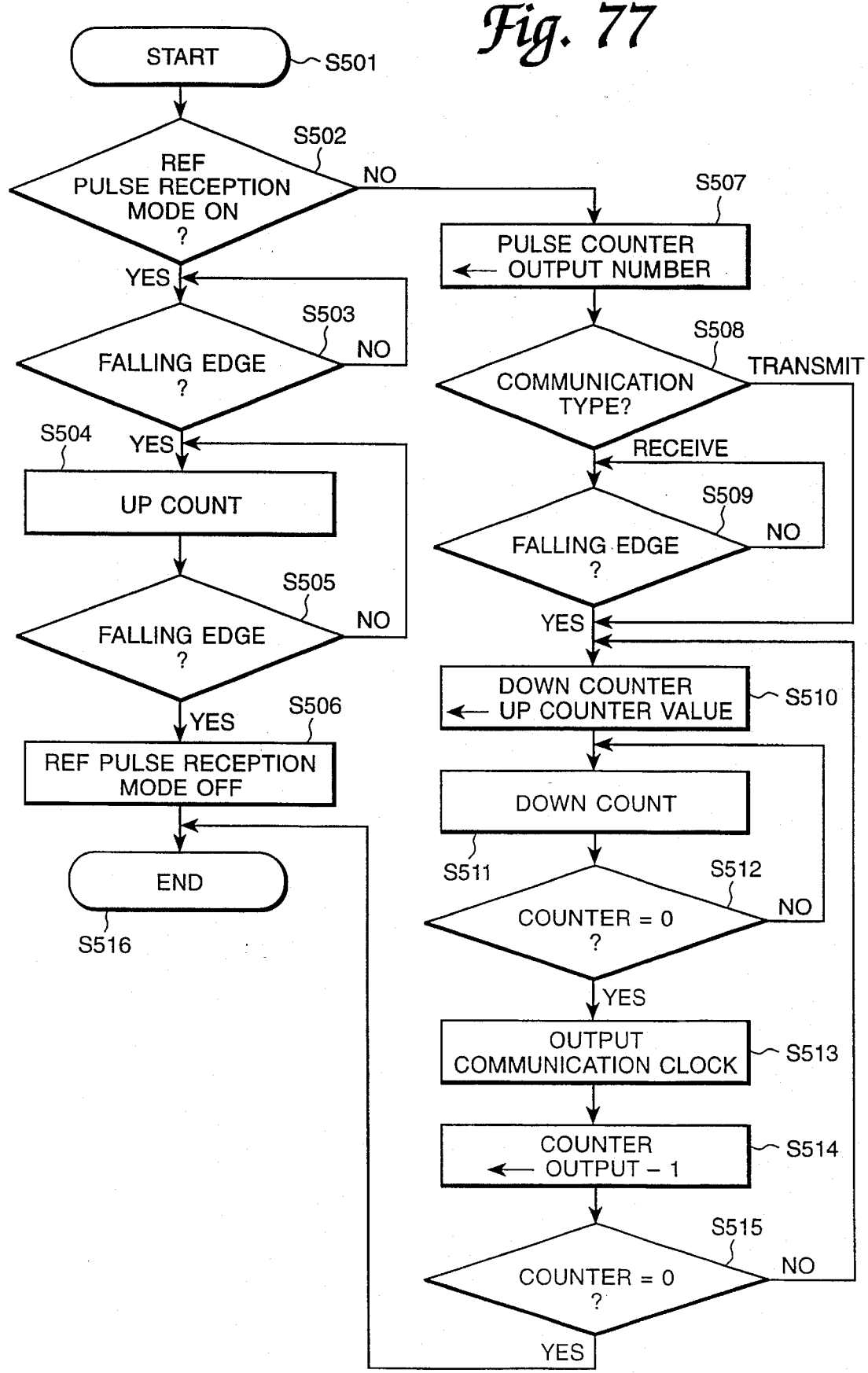
FIG. 77 is a flow diagram of operation of the communication clock signal generator in the seventeenth embodiment.

With reference to FIG. 77, the communication clock signal generator 6023 starts to operate at a stage S501. The counter controller 6237 includes a signal processor which operates in accordance with a program stored in a ROM. At the operation start, the counter controller 6237 receives information of a reference pulse reception mode via the control terminal 6240. The counter controller 6237 determines whether or not the reception mode is in an ON state at a stage S502. In the case where the reception mode is in the ON state, a waiting process is executed until a falling edge occurs in the received data fed via the data input terminal 6238 (a stage S503).

When the counter controller 6237 receives a falling edge in the received data (see the part (d) and the part (e) of FIG. 78), the counter controller 6237 sets the up counter 6231 into an enabled state so that the up counter 6231 executes a counting-up process at a stage S504. When the counter controller 6237 receives a next falling edge in the received data (see the part (d) and the part (e) of FIG. 78), the counter controller 6237 moves the up counter 6231 out of the enabled state so that the up counter 6231 suspends the counting-up process at a stage S506. In addition, the reference pulse reception mode is changed to an OFF state. Thereby, the up counter 6231 counts pulses in the basic clock signal during an interval from the timing of a first falling edge to the timing of a second falling edge in the received data (see the part (f) of FIG. 78).

In the case where the reception mode is in the OFF state at the operation start, the counter controller 6237 sets data of a communication pulse number in the pulse counter 6237a at a stage S507. Then, the counter controller 6237 determines whether a communication clock signal to be generated is used for transmission or reception at a stage S508. When the communication clock signal is used for reception, the counter controller 6237 waits a falling edge in the received data to provide synchronization of the communication clock signal (a stage S509).

When the counter controller 6237 receives a falling edge in the received data (see the part (g) of FIG. 78), the counter controller 6237 outputs a loading command to the down counter 6234 at a stage S510 so that the down counter 6234 is loaded with the counted pulse number data held in the up counter 6231. Then, the number represented by the data in the down counter 6234 is decremented by one each time the down counter 6234 receives a pulse of the basic clock signal. When the number represented by the data in the down counter 6234 reaches zero (a stage S512), the down counter 6234 outputs a pulse of a communication clock signal (see the part (h) of FIG. 78) which is transmitted via the communication clock output terminal 6236 at a stage S513. Then, the number represented by the data in the pulse counter 6237a is decremented by one at a stage S514, and a determination is given at a stage S515 as to whether or not the number represented by the data in the pulse counter 6237a is equal to zero. In the case where the number represented by the data in the pulse counter 6237a is not equal to zero, the down counter 6234 is again loaded with the counted pulse number data held in the up counter 6231. Then, the counting-down process is started again. In the case where the number represented by the data in the pulse counter 6237a decreases to zero, the operation of the communication clock signal generator 6023 terminates at a stage S516.

FIG. 78 shows examples of the time-domain conditions (waveforms) of various signals in the responder 6016 which occur when the operation of the responder 6016 is set in the reference pulse reception mode. As shown in FIG. 78, a communication reference pulse is provided in a head of transmission data. The transmission data includes 4-bit serial data which follows the communication reference pulse. Four pulses of the communication clock signal are outputted in correspondence with the 4-bit serial data.

An allowable error range of the period TRXC of the communication clock signal is expressed as:

$$3.5 Tcom < 4 TRXC < 4.5 Tcom$$

where Tcom denotes a 1-bit data length. Thus, the allowable error range is within ±12.5%. The period TRXC of the communication clock signal has the following relation with the period Tclk of the basic clock signal.

$$TRXC = n \cdot Tckl$$

where "n" denotes a natural number. An error which occurs during the reception of a communication reference pulse is determined by the following relation.

$$(n-1)Tclk < Tcom < (n+1)Tclk$$

Thus, the maximum error corresponds to 1/n. When the maximum error is smaller than allowable error range limits of ±12.5%, the natural number "n" is given as:

n>8

Accordingly, stable and reliable communication is ensured provided that the following relation is satisfied.

8Tclk<Tcom

In other words, when the oscillation frequency of the clock oscillator 6022 is set equal to or higher than eight times the communication frequency (communication bit rate), an error or a fluctuation in the frequency of the basic clock signal is prevented from adversely affecting communication. Thus, the frequency of the basic clock signal is preferably 153.6 kHz or higher when the communication frequency is 19.2 kbps. In the case where a design frequency of the basic clock signal is 400 kHz, an error of 0.614 (=1-(153.6 kHz/400 kHz)) is allowed. Accordingly, it is easy to design and make a clock oscillator 6022.

In the case where data is of a 1-bit asynchronous communication format as shown in FIG. 79, the frequency of the basic clock signal is preferably equal to or higher than four times the communication frequency.

As previously described, the time length of the communication reference pulse in the received data is measured by counting pulses of the basic clock signal. The counted pulse number which represents the measured time length of the communication reference pulse is referred to as a reference pulse number. During a subsequent period, pulses of the basic clock signal are counted. Each time the counted pulse number reaches the reference pulse number, a timing signal (a pulse of the communication clock signal) is outputted and the counted pulse number is reset. The timing signal determines a timing at which the received data is decoded. Thus, a fluctuation in the frequency of the basic clock signal is prevented from adversely affecting the decoding of the received data, and the decoding of the received data can be accurate and reliable.

As previously described, in the interrogation signal S1 transmitted from the interrogator 6011, the communication reference pulse is followed by the data and the check code. The check code is used in determining whether or not the data is correct. When the data is determined to be correct, it is known that the time length of the communication reference pulse has been accurately measured. Accordingly, during a subsequent period, the interrogation signal S1 can be accurately decoded at a timing determined by the measured time length of the communication reference pulse.

In the first interrogation signal S1 transmitted from the interrogator 6011, the communication reference pulse is followed by the data of the ID number. Thus, the ID number can be surely registered in the responder 6016.

The main power supply circuit 6029 may be omitted, and electric power for driving the portions of the responder 6016 may be derived from a received interrogation signal S1.

In the communication clock signal generator 6023, the down counter 6234 may be replaced by an up counter.

While the responder 6016 transmits the stored ID information and data after the communication reference pulse is received in this embodiment, the responder 6016 may transmit the stored ID information and data before the reception of the communication reference pulse.

The interrogator 6011 may add a communication reference pulse to the head of each interrogation signal S1. In this case, backing up the data in the up counter 6231 in the responder 6016 is unnecessary. This is advantageous in reducing consumed electric power and in preventing a fluctuation of the frequency of the basic clock signal from adversely affecting communication.

While the reference time length of the generation of data is set equal to the time length of the communication reference pulse in this embodiment, the reference time length of the generation of data may be set equal to, for example, twice the time length of the communication reference pulse.

DESCRIPTION OF THE EIGHTEENTH PREFERRED EMBODIMENT

An eighteenth embodiment of this invention is similar to the embodiment of FIGS. 73–78 except for design changed indicated hereinafter. In the eighteenth embodiment, an interrogator subjects a carrier to frequency modulation (FM) responsive to data to be transmitted, and thereby converts the carrier into an interrogation radio wave signal S1 representing the data. The frequency modulation is accorded with the "FM0(F2F)" standards.

With reference to FIG. 80, in the "FM0" standards, a short pulse and a long pulse are transmitted when data is "0" and "1" respectively. The interrogator adds "0" to the head of transmitted data as a communication reference pulse. The period of the transmission of "0" as a communication reference pulse determines a communication reference time length Tcom.

A responder extracts falling edges in a received waveform (see the part (d) and the part (e) of FIG. 80). During the interval between the occurrence of a first falling edge to the occurrence of a second falling edge in the received waveform, clocks of a basic clock signal are counted by an up counter to measure the time length of the communication reference pulse (see the part (c) and the part (f) of FIG. 80). The resultant counted pulse number "n" indicates the communication reference time length Tcom.

In the responder, as shown in the part (h) of FIG. 80, an edge hold output signal is set to a high level and a down counter is loaded with a count data from the up counter in synchronism with the falling edge in the received waveform which occurs when the setting of the communication reference time length is finished. Thus, the down counter starts to count pulses of the basis clock signal (see the part (i) of FIG. 80). The count data loaded into the down counter represents a value equal to the previously-mentioned counted pulse number "n" (the communication reference time length Tcom) multiplied by ¾.

Generally, the down counter continues to count pulses of the basic clock signal until the counted pulse number reaches the value represented by the loaded count data. In the case where an edge is extracted from the received waveform before the counted pulse number reaches the value represented by the loaded count data in the down counter, the edge hold output signal is reset to a low level. Otherwise, the edge hold output signal remains in the high level.

Each time the counted pulse number reaches the value represented by the loaded count data in the down counter, a pulse of a communication clock signal is generated as shown in the part (j) of FIG. 80. The recovery of data from the received waveform is performed by referring to the level of the edge hold output signal at the output timing of each pulse of the communication clock signal. Transmitted data of "1" corresponds to the fact that the received waveform does not contain any edge during the communication reference time length from the edge extraction timing. On the other hand, transmitted data of "0" corresponds to the fact that the received waveform contains an edge during the communication reference time length from the edge extraction timing.

Accordingly, in the case where the level of the edge hold output signal is high at the output timing of a pulse of the communication clock signal, the recovered data is determined to be "1". In the case where the level of the edge hold output signal is low at the output timing of a pulse of the communication clock signal, the recovered data is determined to be "0". These processes are reiterated to complete the data recovery.

What is claimed is:

1. A communication system comprising:

an interrogator for transmitting an interrogation signal representing a communication reference time length, and communication serial data that is generated based on the communication reference time length; and a responder for receiving the interrogating signal from the interrogator and for responding to the interrogation signal, the responder including:

a clock oscillator for outputting clock pulses;

measuring means for measuring the communication reference time length represented by the interrogation signal, the measuring means comprising first counting means for counting the clock pulses output from the clock oscillator during the communication reference time length represented by the received interrogation signal;

setting means for setting a time length based on the communication reference time length measured by the measuring means, the setting means comprising pulse number setting means for setting a pulse number based on a number of clock pulses counted by the first counting means;

generating means for generating a plurality of timing signals based on the time length set by the setting means, the generating means comprising second counting means for counting clock pulses output by the clock oscillator, and for generating one of the timing signals when a number of clock pulses counted by the second counting means reach the pulses number set by the pulse number setting means; and demodulating means for receiving the interrogating signal from the interrogator and for demodulating the communication serial data represented by the received interrogation signal in response to the timing signals generated by the generating means.

2. The communication system of claim 1, wherein the generating means further comprise count control means for detecting an occurrence of a specified change in the communication serial data represented by the received interrogation signal, and for starting the counting of the second counting means in response to the detecting occurrence.

3. The communication system of claim 1, wherein the clock oscillator comprises a CR oscillator having a capacitor and a resistor.

4. A communication system comprising:

a) an interrogator for transmitting an interrogation signal representing a communication reference time length, and communication serial data that is generated based on the communication reference time length; and b) a responder for receiving the interrogation signal from the interrogator and for responding to the interrogation signal, the responder including:

b1) measuring means for measuring the communication reference time length represented by the interrogation signal;

b2) setting means for setting a time length based on the communication reference time length measured by the measuring means;

b3) first generating means for generating a plurality of timing signals based on the time length set by the setting means;

b4) demodulating means for receiving the interrogation signal from the interrogator and for demodulating the communication serial data represented by the received interrogation signal in response to the timing signals generated by the first generating means;

b5) holding means for holding the communication reference time length measured by the measuring means;

b6) second generating means for generating transmission serial data when the responder responds to the interrogation signal from the interrogator; and b7) feeding means for feeding the communication reference time length from the holding means to the second generating means when transmission serial data is to be generated, the communication reference time being used by the second generating means as a transmission reference to generate the transmission serial data when the responder responds.

5. A communication system comprising:

a) an interrogator for transmitting an interrogation signal representing a communication reference time length, and communication serial data that is generated based on the communication reference time length; and b) a responder for receiving the interrogation signal from the interrogator and for responding to the interrogation signal, the responder including:

b1) measuring means for measuring the communication reference time length represented by the interrogation signal;

b2) setting means for setting a time length based on the communication reference time length measured by the measuring means;

b3) first generating means for generating a plurality of timing signals based on the time length set by the setting means;

b4) demodulating means for receiving the interrogation signal from the interrogator and for demodulating the communication serial data represented by the received interrogation signal in response to the timing signals generated by the first generating means;

b5) second generating means for generating transmission serial data when the responder responds to the interrogation signal from the interrogator;

b6) encoding means for encoding the transmission serial data generated by the second generating means in response to the timing signals generated by the first generating means;

b7) holding means for holding the communication reference time length measured by the measuring means until the transmission serial data is generated; and b8) feeding means for feeding the communication reference time length from the holding means to the second generating means when the transmission serial data is generated.

6. The communication system of claim 5, wherein the communication serial data transmitted by the interrogator contains communication data and a check code, the responder enabling the holding means to hold the communication reference time length measured by the measuring means when determining whether communication is correct based on the check code.

7. The communication system of claim 6, wherein the interrogator transmits an identification number for identifying each responder in the interrogation signal, the responder registering the identification number in a memory and storing the communication reference time length into the holding means when the communication is determined to be correct based on the check code.

* * * * *

UNITED STATES PATENT AND TRADEMARK OFFICE
CERTIFICATE OF CORRECTION

PATENT NO. : 5,532,692
DATED : July 2, 1996
INVENTOR(S) : Hirata

It is certified that error appears in the above-identified patent and that said Letters Patent is hereby corrected as shown below:

Title page,
Item [75] Inventor: should read -- "Tatsuya Hirata" --.

Signed and Sealed this

Ninth Day of October, 2001

*Attest:*

NICHOLAS P. GODICI
*Attesting Officer*  *Acting Director of the United States Patent and Trademark Office*